(12) United States Patent
Leggette et al.

(10) Patent No.: US 10,133,609 B2
(45) Date of Patent: Nov. 20, 2018

(54) DISPERSED STORAGE NETWORK SECURE HIERARCHICAL FILE DIRECTORY

(71) Applicant: International Business Machines Corporation, Armonk, NY (US)

(72) Inventors: Wesley Leggette, Chicago, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/794,865

(22) Filed: Oct. 26, 2017

(65) Prior Publication Data
US 2018/0046519 A1    Feb. 15, 2018

Related U.S. Application Data

(63) Continuation of application No. 13/865,641, filed on Apr. 18, 2013, now abandoned, which is a
(Continued)

(51) Int. Cl.
*G07B 15/02*    (2011.01)
*G06F 9/50*    (2006.01)
(Continued)

(52) U.S. Cl.
CPC .......... *G06F 9/5083* (2013.01); *G06F 9/5077* (2013.01); *G06F 11/1008* (2013.01);
(Continued)

(58) Field of Classification Search
CPC .................................................... G06F 9/5083
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

FOREIGN PATENT DOCUMENTS

EP    1903750 A1    3/2008

OTHER PUBLICATIONS

Chung; An Automatic Data Segmentation Method for 3D Measured Data Points; National Taiwan University; pp. 1-8; 1998.
(Continued)

*Primary Examiner* — Simon P Kanaan
(74) *Attorney, Agent, or Firm* — Garlick & Markison; Timothy W. Markison; Bruce E. Stuckman

(57) ABSTRACT

A method includes creating a file directory entry in a directory file of a secure hierarchical file directory system for a file. The file directory entry includes a path name, an encryption access control list, and a source name. The file is encrypted with a key and the key is encrypted with each public key of user devices authorized to access the file. The encryption access control list includes identities of the set of user devices and the set of object content keys. The method further includes encrypting the directory file using a second key. The method further includes generating second object content keys based on the second key and public keys of second user devices authorized to access the directory file. The method further includes creating a next level directory file entry in a next higher directory file of the secure hierarchical file directory system for the directory file.

8 Claims, 61 Drawing Sheets

Related U.S. Application Data continuation-in-part of application No. 13/707,490, filed on Dec. 6, 2012, now Pat. No. 9,304,857.

(60) Provisional application No. 61/569,387, filed on Dec. 12, 2011.

(51) Int. Cl.

| | | |
|---|---|---|
| *G06F 21/60* | (2013.01) | |
| *G06F 11/20* | (2006.01) | |
| *G06F 11/14* | (2006.01) | |
| *G06F 11/10* | (2006.01) | |
| *H04L 29/08* | (2006.01) | |
| *G06F 21/62* | (2013.01) | |
| *H04L 29/06* | (2006.01) | |
| *G06F 3/06* | (2006.01) | |
| *H03M 13/15* | (2006.01) | |
| *H03M 13/09* | (2006.01) | |

(52) U.S. Cl.
CPC ...... *G06F 11/1076* (2013.01); *G06F 11/1092* (2013.01); *G06F 11/1451* (2013.01); *G06F 11/2058* (2013.01); *G06F 11/2069* (2013.01); *G06F 21/602* (2013.01); *G06F 21/6218* (2013.01); *H04L 63/0428* (2013.01); *H04L 63/06* (2013.01); *H04L 67/10* (2013.01); *H04L 67/1017* (2013.01); *H04L 67/1097* (2013.01); *G06F 3/064* (2013.01); *G06F 3/067* (2013.01); *G06F 3/0619* (2013.01); *G06F 2211/1028* (2013.01); *H03M 13/09* (2013.01); *H03M 13/1515* (2013.01); *H04L 63/08* (2013.01); *H04L 63/10* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,480,909 B2 | 1/2009 | McKean et al. |
| 7,636,724 B2 | 12/2009 | de la Torre et al. |
| 8,468,368 B2 | 6/2013 | Gladwin et al. |
| 8,819,011 B2 | 8/2014 | Motwani et al. |
| 8,832,234 B1 | 9/2014 | Brooker et al. |
| 9,338,140 B2 | 5/2016 | OHare et al. |
| 2001/0033296 A1 | 10/2001 | Fullerton et al. |
| 2002/0044657 A1 | 4/2002 | Asano et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2003/0163507 A1 | 8/2003 | Chang et al. |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0018853 A1 | 1/2005 | Lain et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2008/0256183 A1 | 10/2008 | Flynn et al. |
| 2009/0094251 A1 | 4/2009 | Gladwin et al. |
| 2009/0094318 A1 | 4/2009 | Gladwin et al. |
| 2009/0150605 A1 | 6/2009 | Flynn et al. |
| 2010/0023524 A1 | 1/2010 | Gladwin et al. |
| 2010/0332751 A1 | 12/2010 | Quigley et al. |
| 2011/0071988 A1 | 3/2011 | Resch et al. |
| 2011/0185258 A1 | 7/2011 | Grube et al. |
| 2011/0264717 A1 | 10/2011 | Grube et al. |
| 2011/0307645 A1 | 12/2011 | Hall |
| 2014/0040662 A1 | 2/2014 | Dhuse et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

International Search Report and Written Opinion; International Search Authority; International Application No. PCT/US12/68883; dated Feb. 26, 2013; 12 pgs.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

(56) References Cited

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

International Business Machines; Response to EP communication dated May 26, 2017; Nov. 1, 2017; 5 pgs.

Communication pursuant to Article 94(3) EPC; EP Application No. 12856963.9; dated May 26, 2017; 9 pages.

DST allocation info 242; data partition info 320; [X]data ID; No. of partitions; Addr. info for each partition; format conversion indication task execution info 322

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

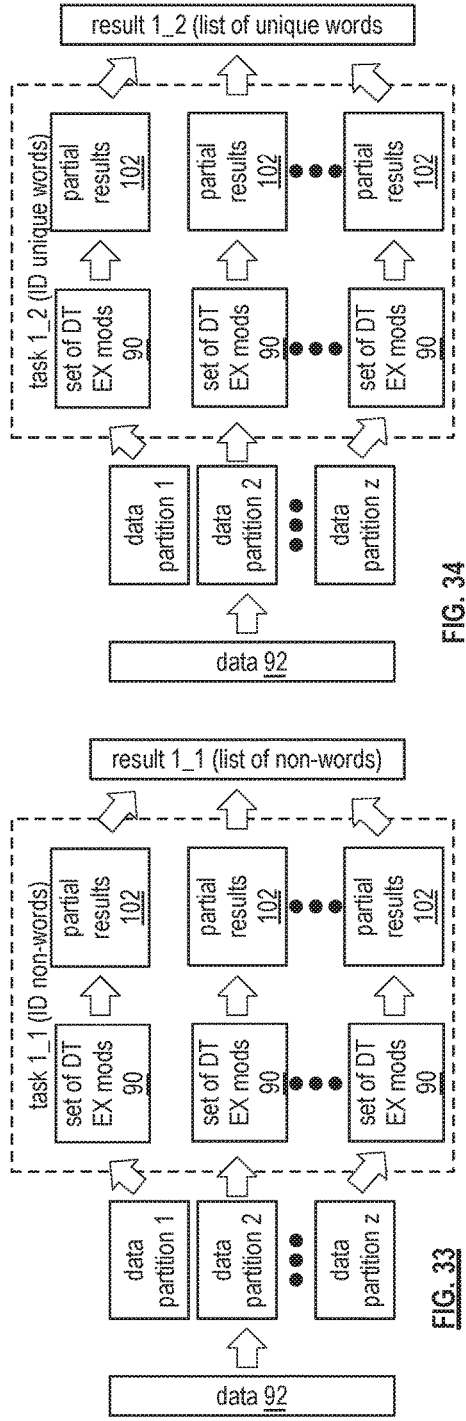
FIG. 33
FIG. 34
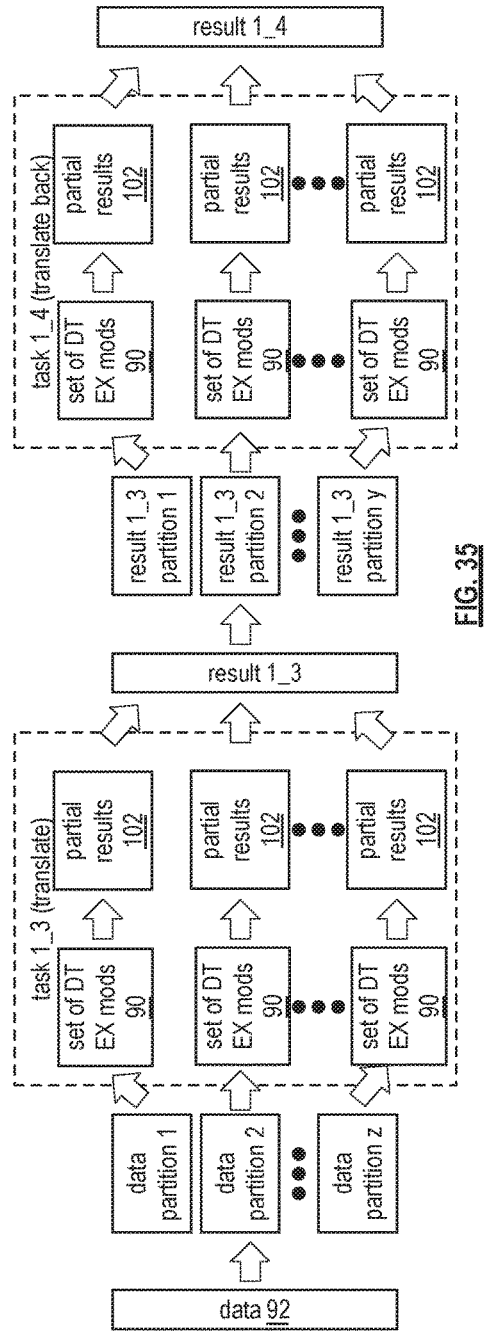
FIG. 35

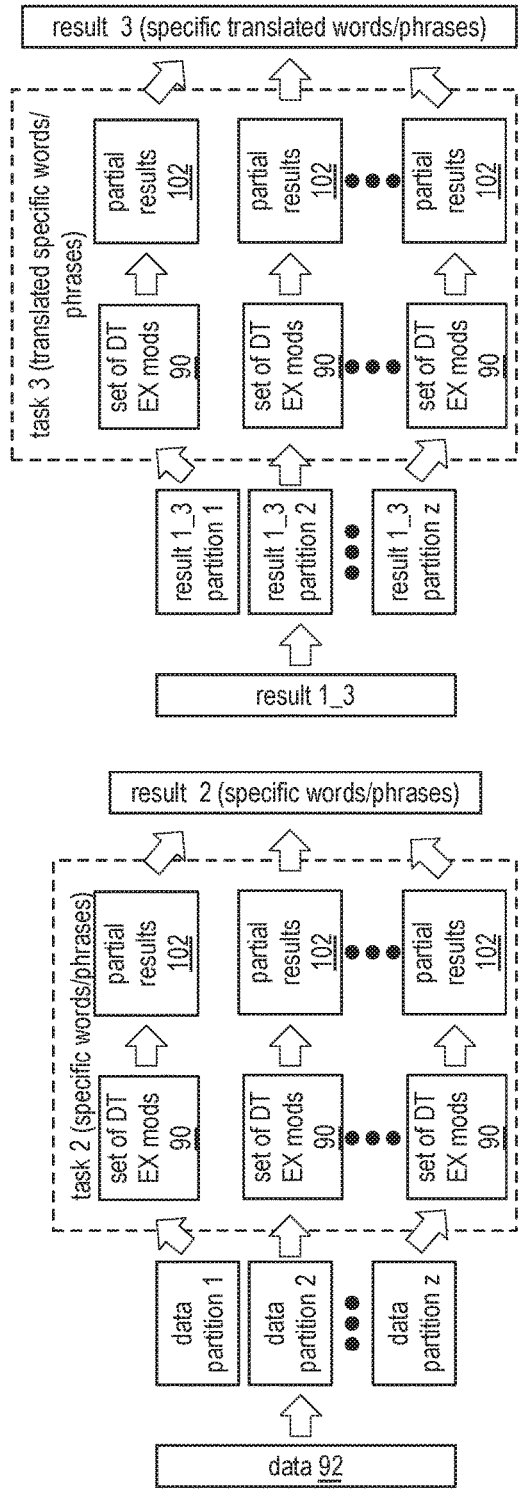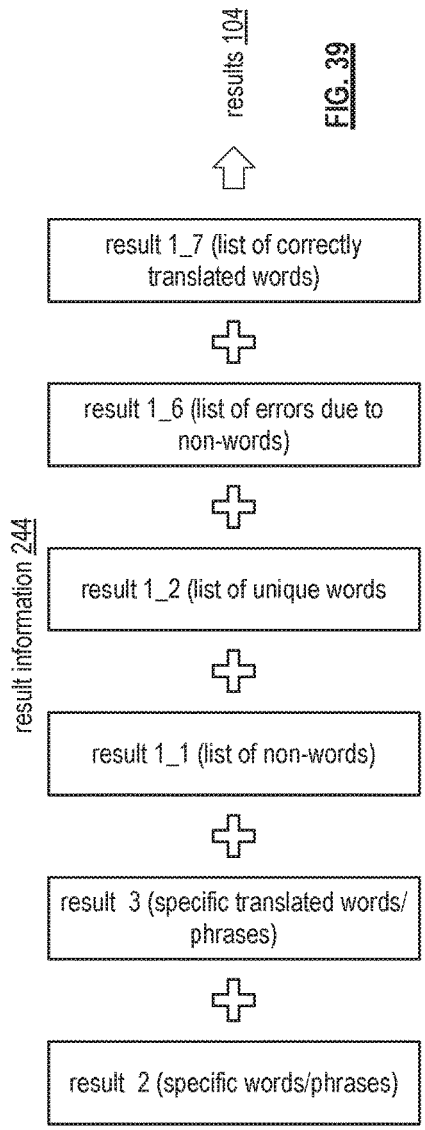

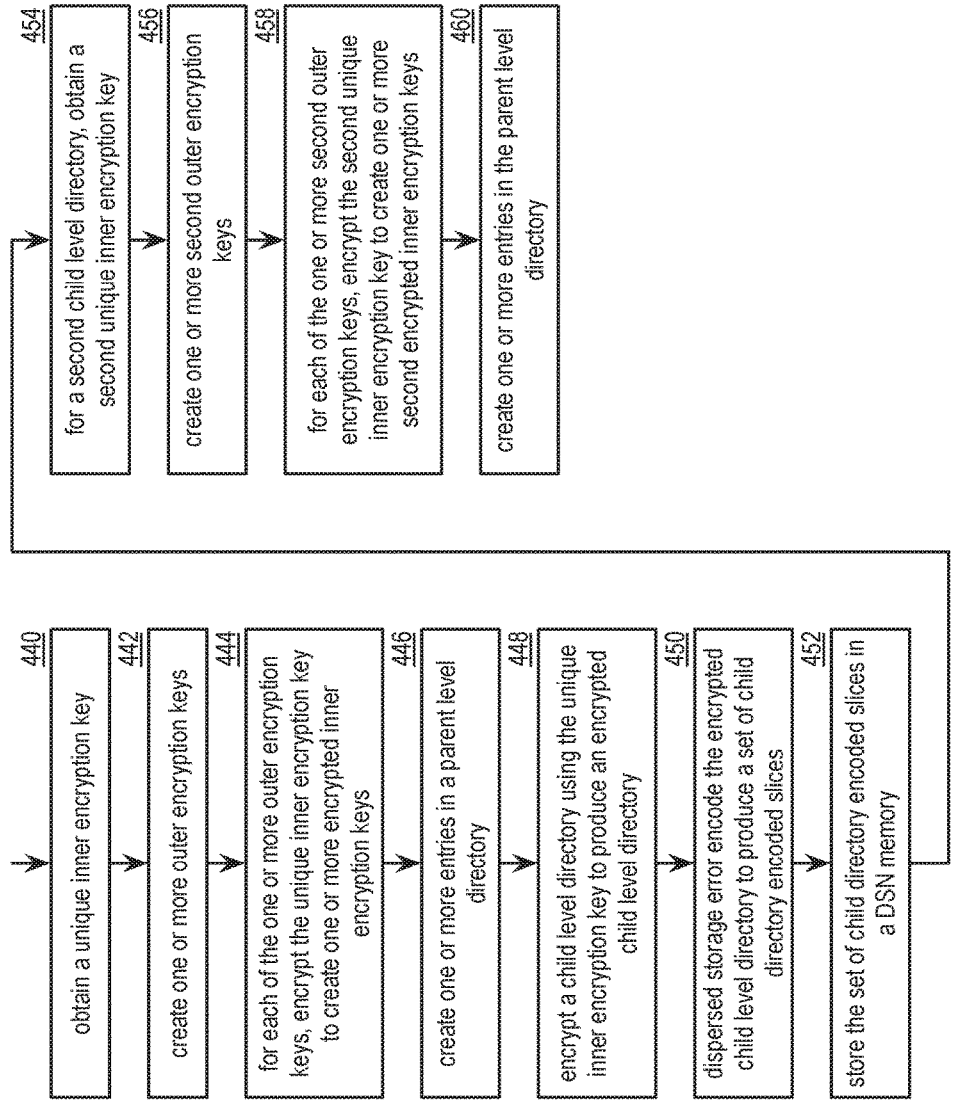

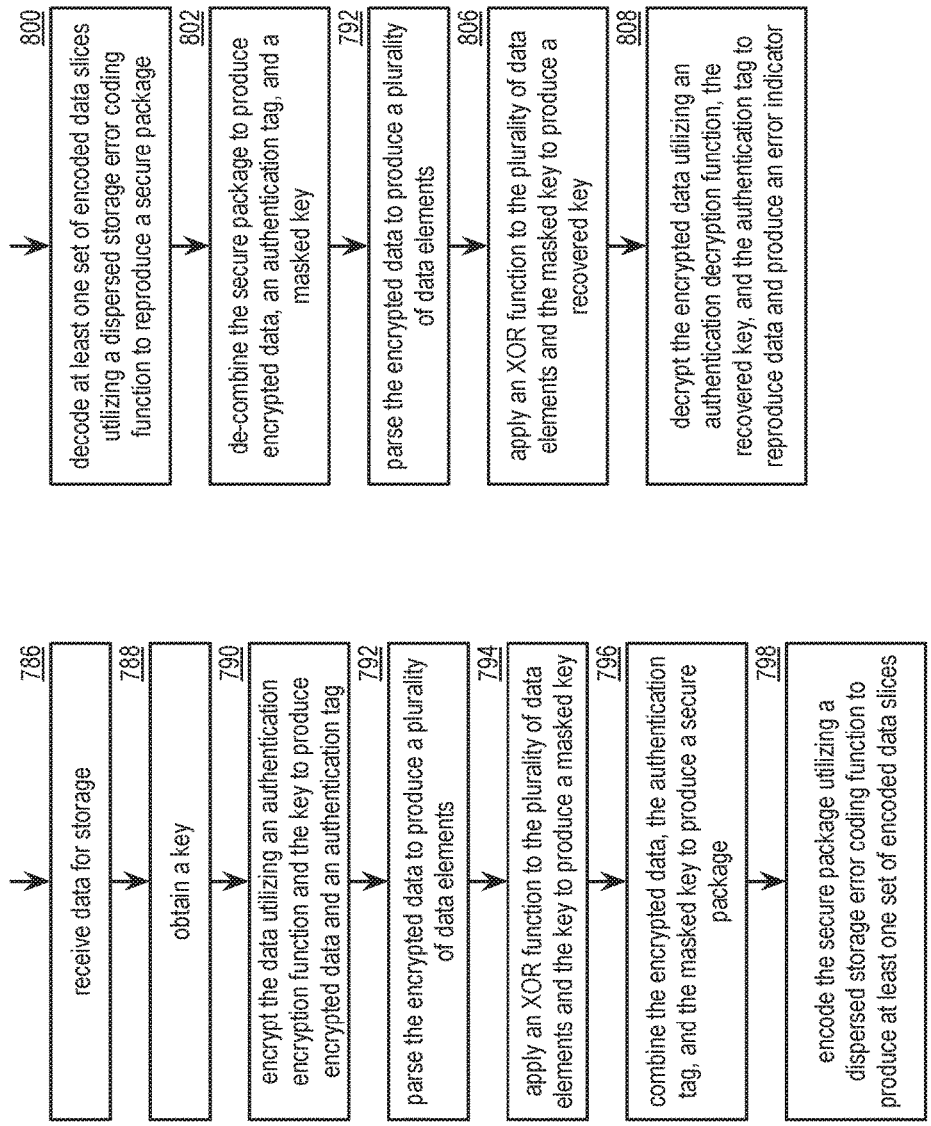

DISPERSED STORAGE NETWORK SECURE HIERARCHICAL FILE DIRECTORY

CROSS REFERENCE TO RELATED PATENTS

The present U.S. Utility Patent Application claims priority pursuant to 35 U.S.C. § 120 as a continuation of U.S. Utility application Ser. No. 13/865,641, entitled "DISPERSED STORAGE NETWORK SECURE HIERARCHICAL FILE DIRECTORY", filed Apr. 18, 2013, which is a continuation-in-part of U.S. Utility application Ser. No. 13/707,490, entitled "RETRIEVING DATA FROM A DISTRIBUTED STORAGE NETWORK", filed Dec. 6, 2012, now U.S. Pat. No. 9,304,857 issued on Apr. 5, 2016, which claims priority pursuant to 35 U.S.C. § 119(e) to U.S. Provisional Application No. 61/569,387, entitled "DISTRIBUTED STORAGE AND TASK PROCESSING", filed Dec. 12, 2011, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 41C is a flowchart illustrating an example of generating a secure hierarchical file directory system in accordance with the present invention;

FIG. 50C is a flowchart illustrating an example of encoding data in accordance with the present invention;

FIG. 50D is a flowchart illustrating an example of decoding data in accordance with the present invention.

DETAILED DESCRIPTION OF THE INVENTION

Figure 1:
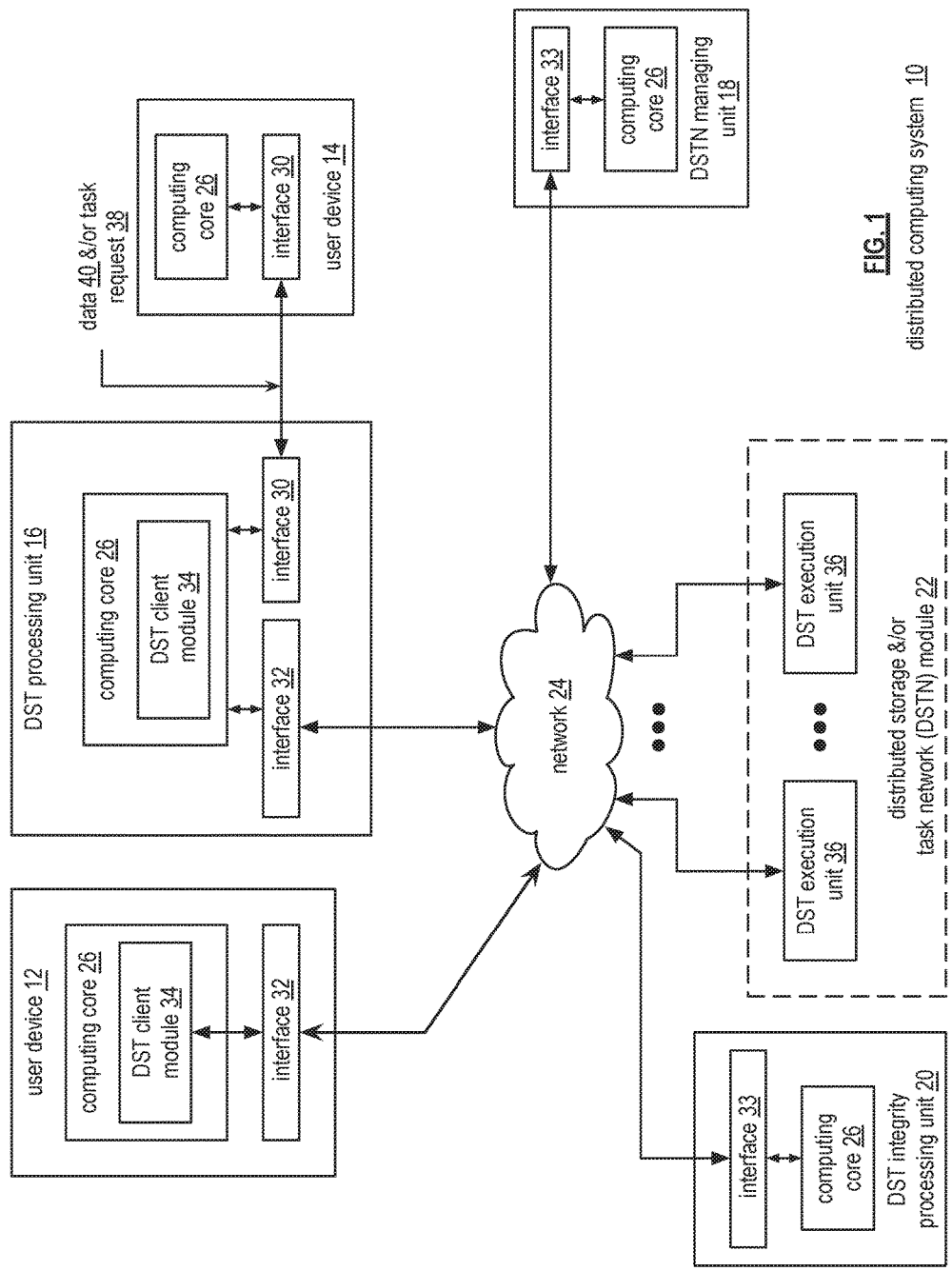
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public interne systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), interne small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
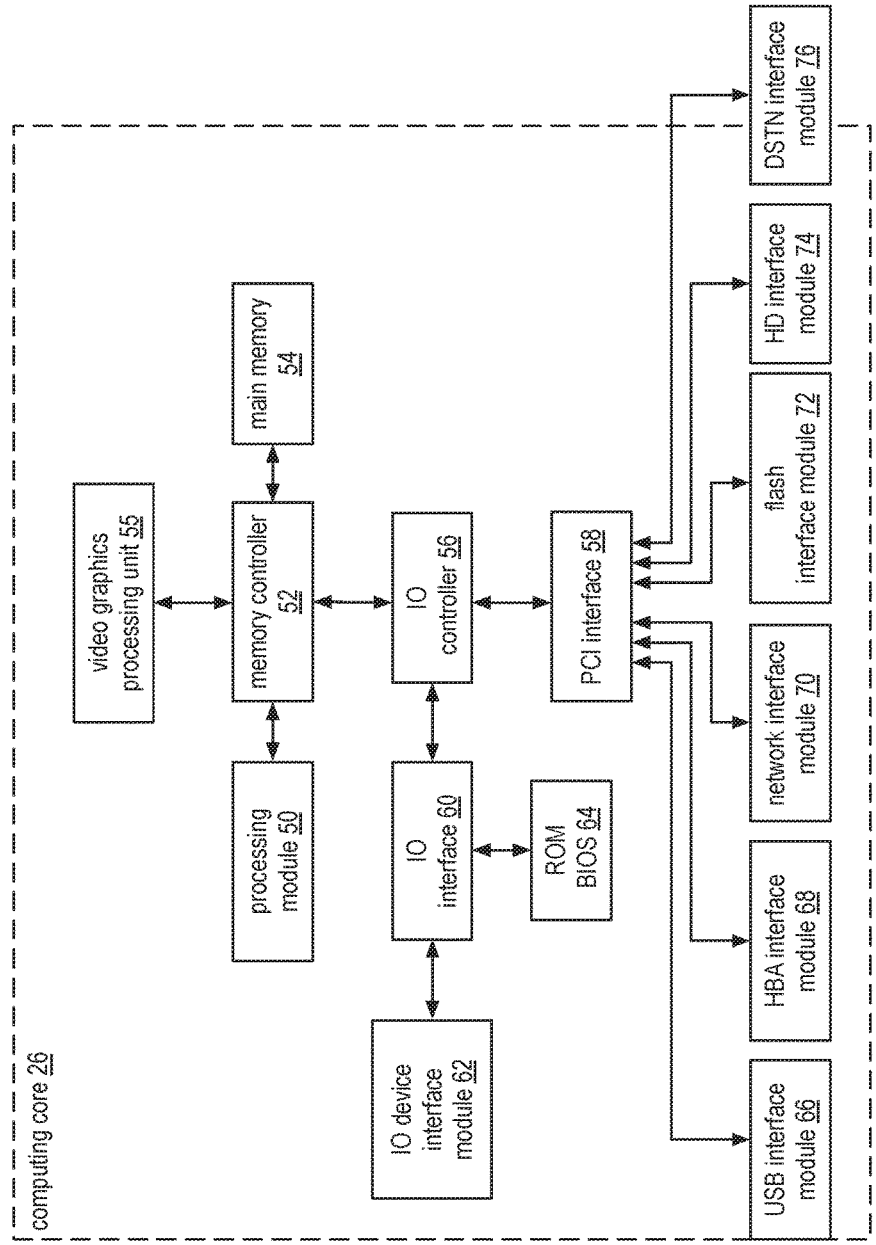
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), interne small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
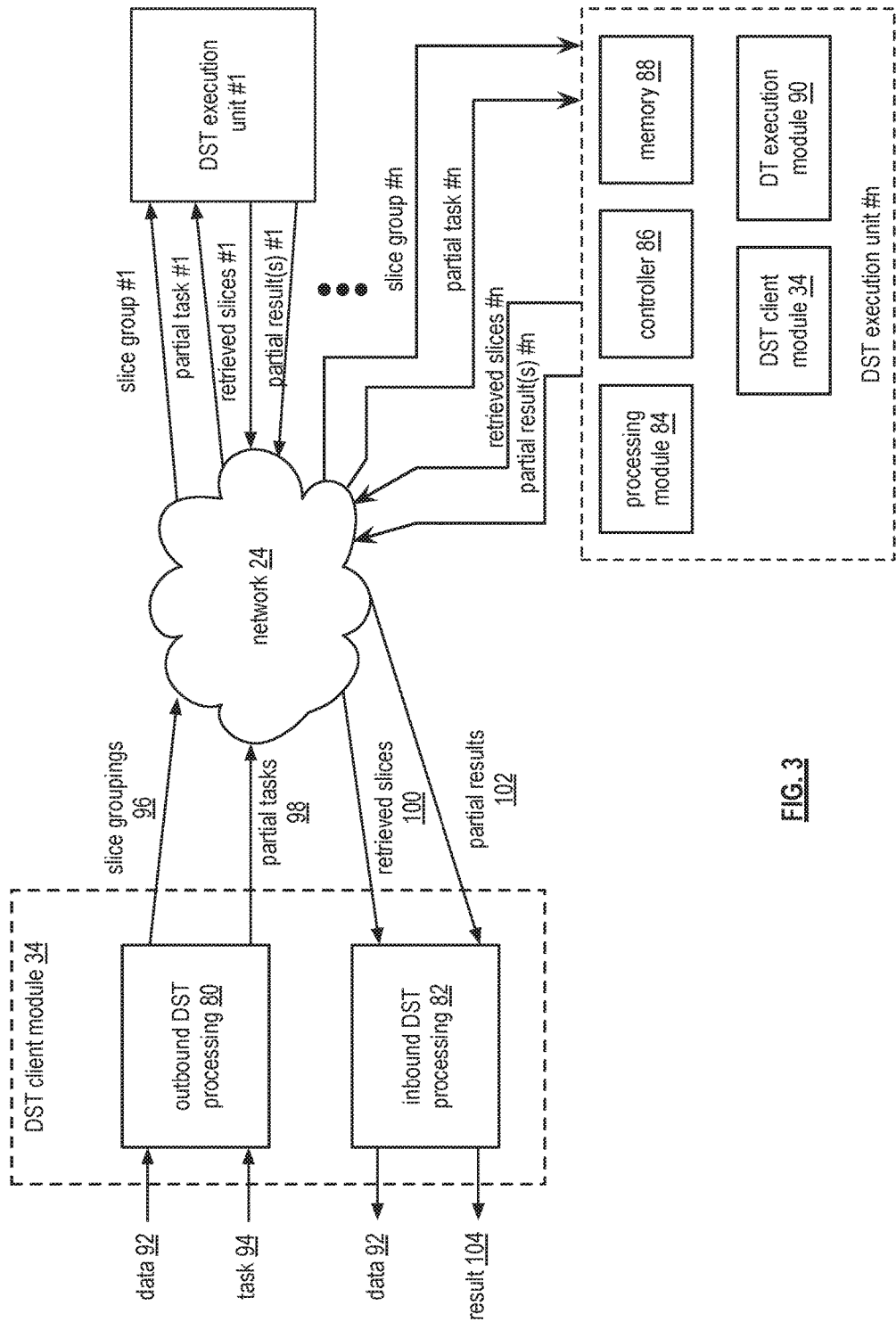
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
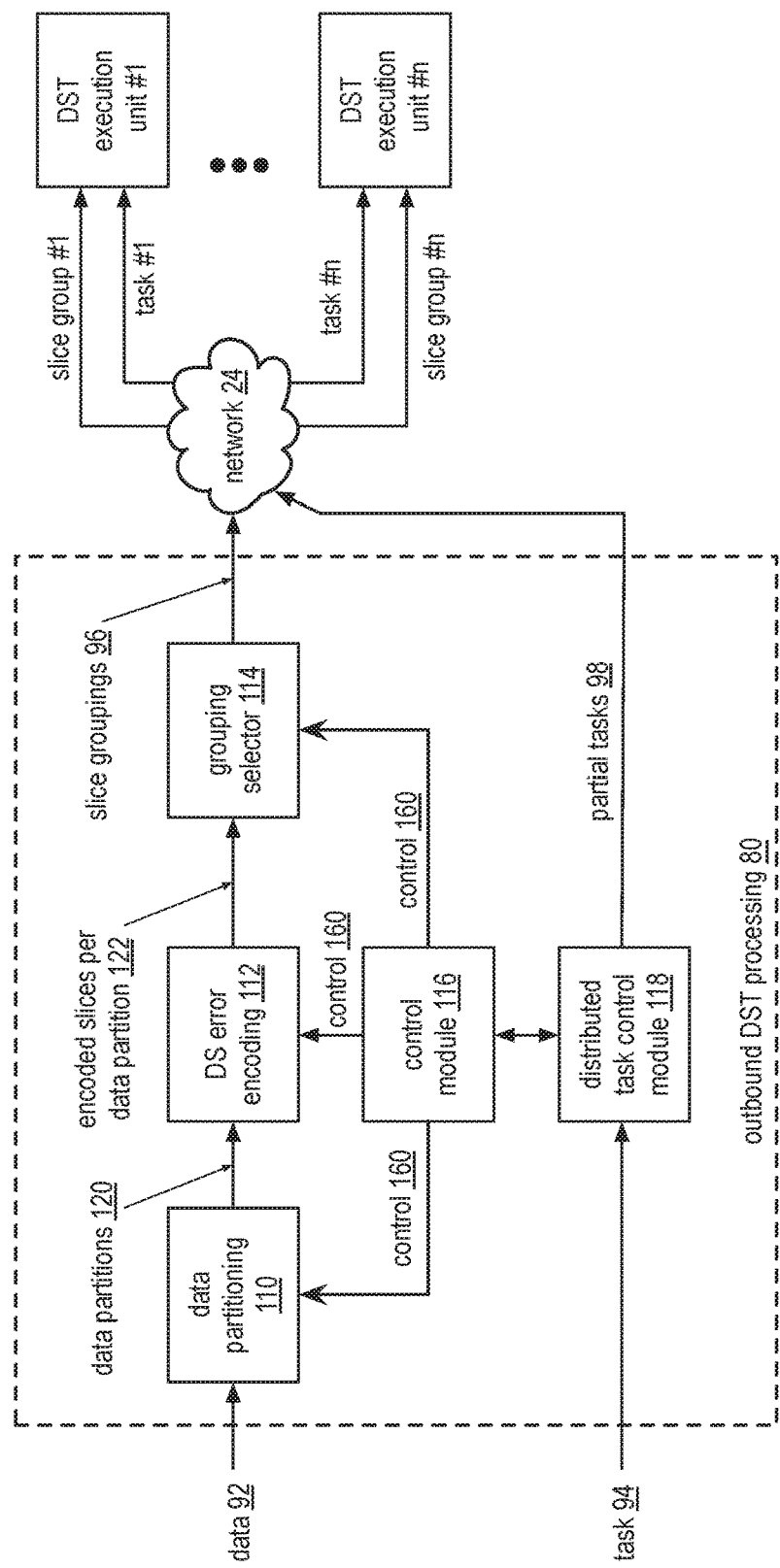
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
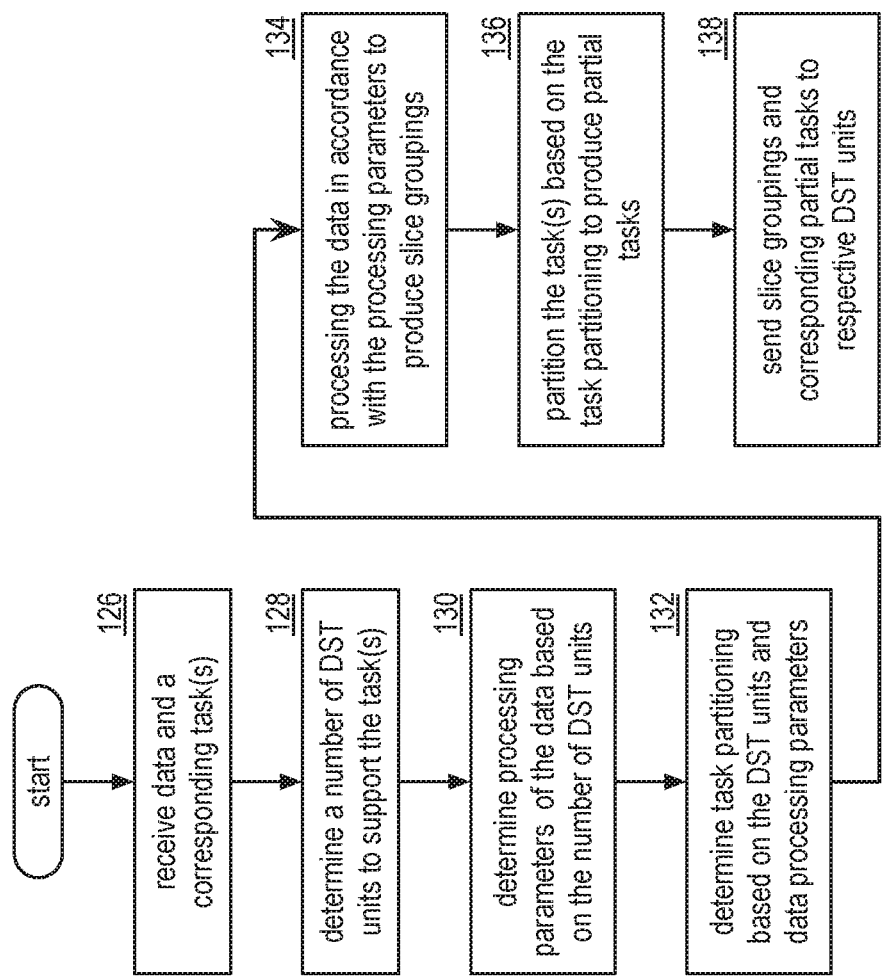
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
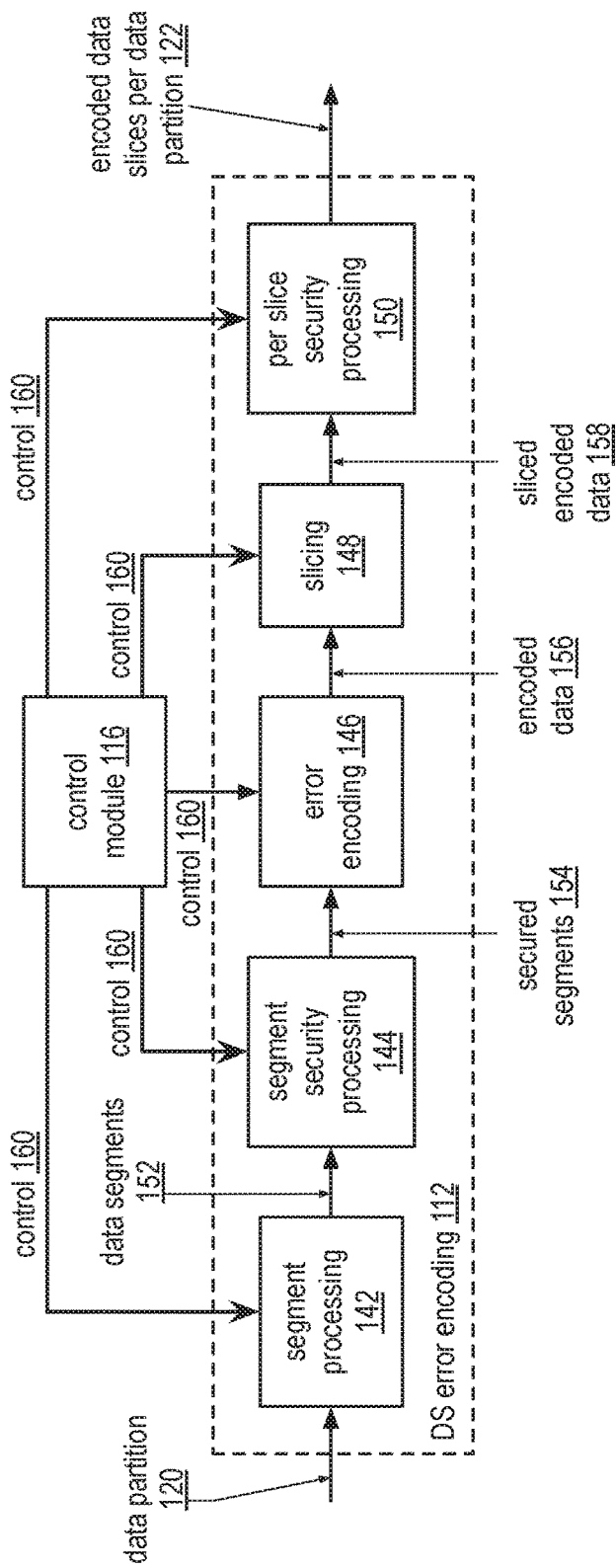
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
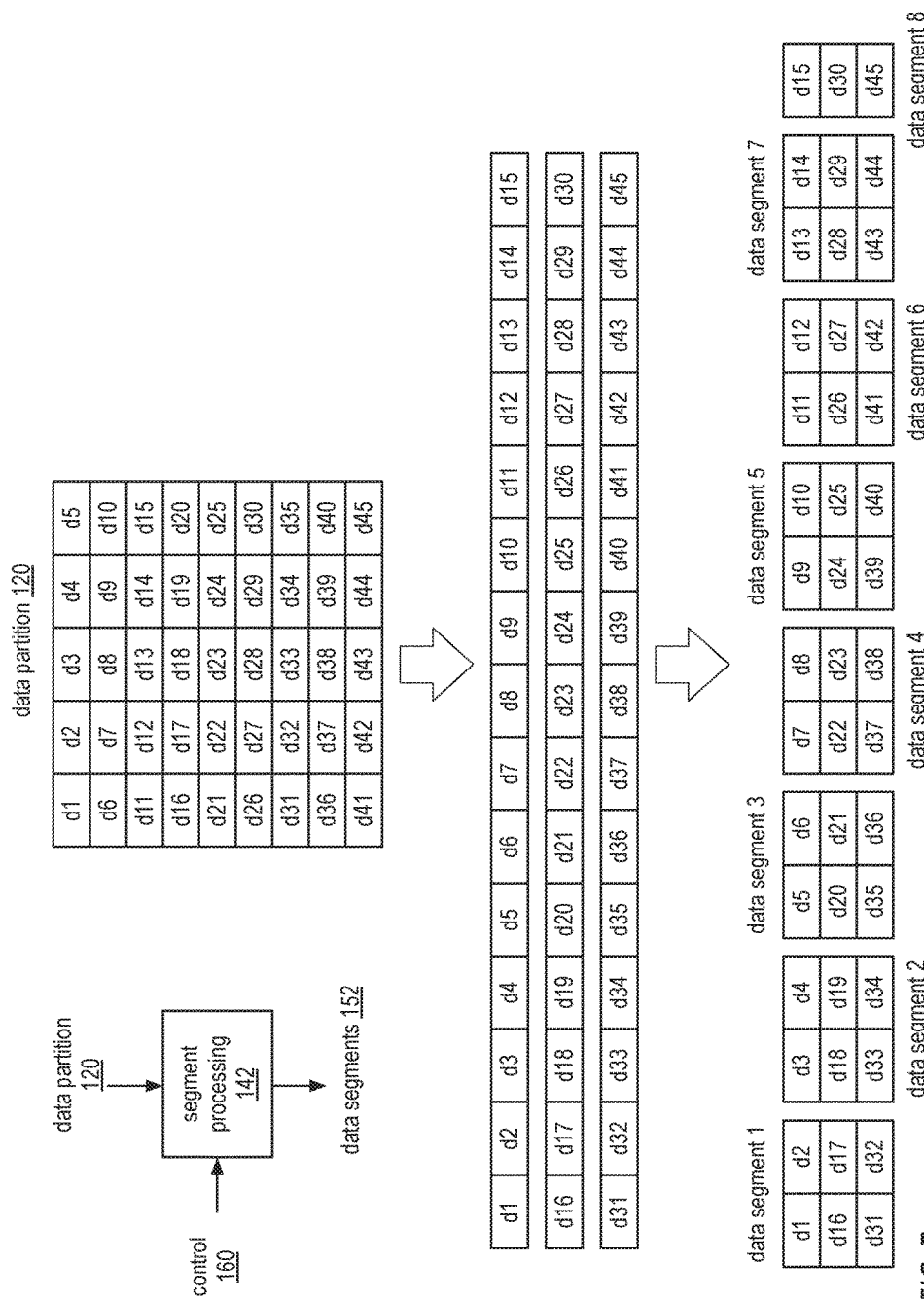
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
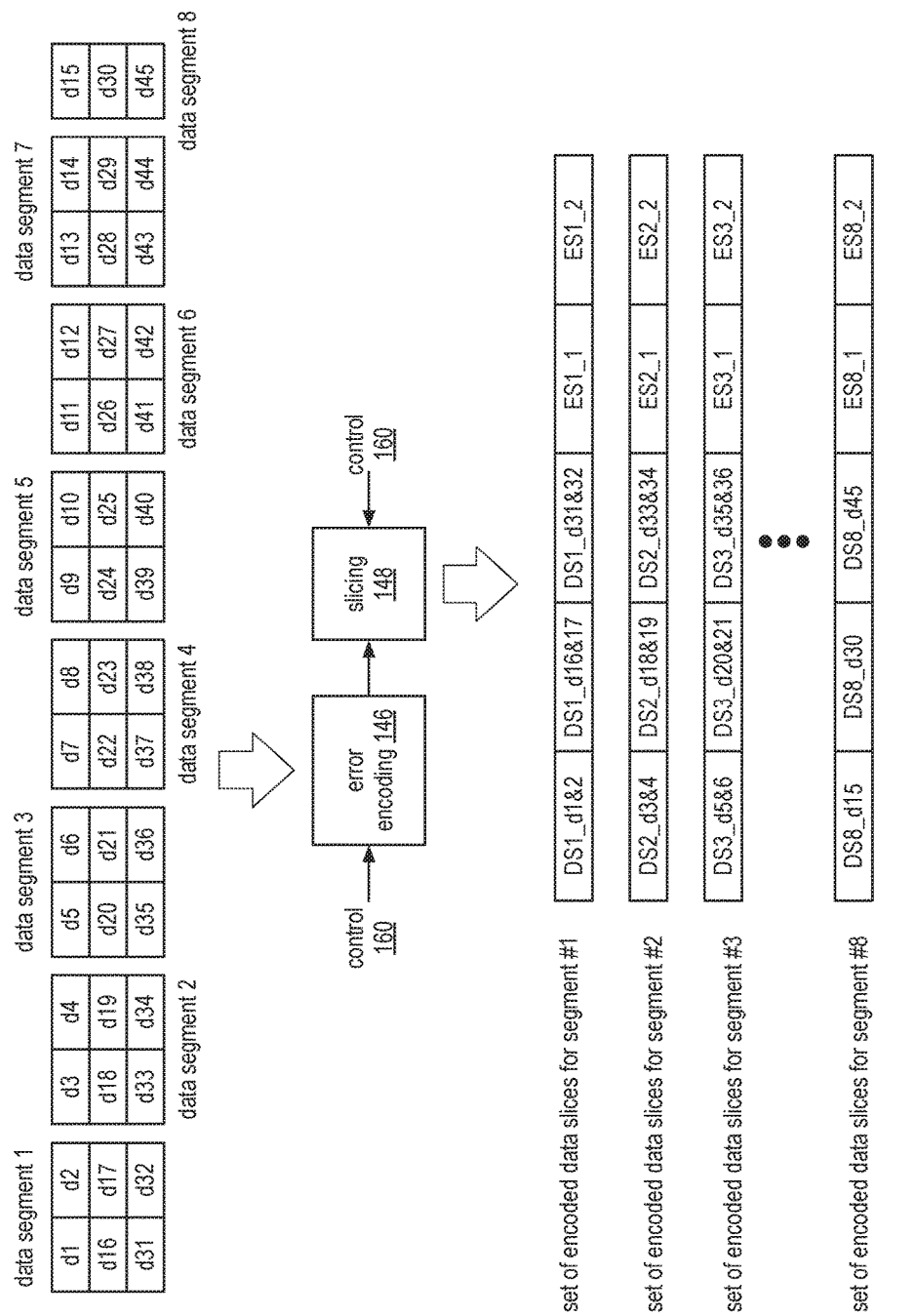
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first—third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first—third words of the second data segment.

Figure 9:
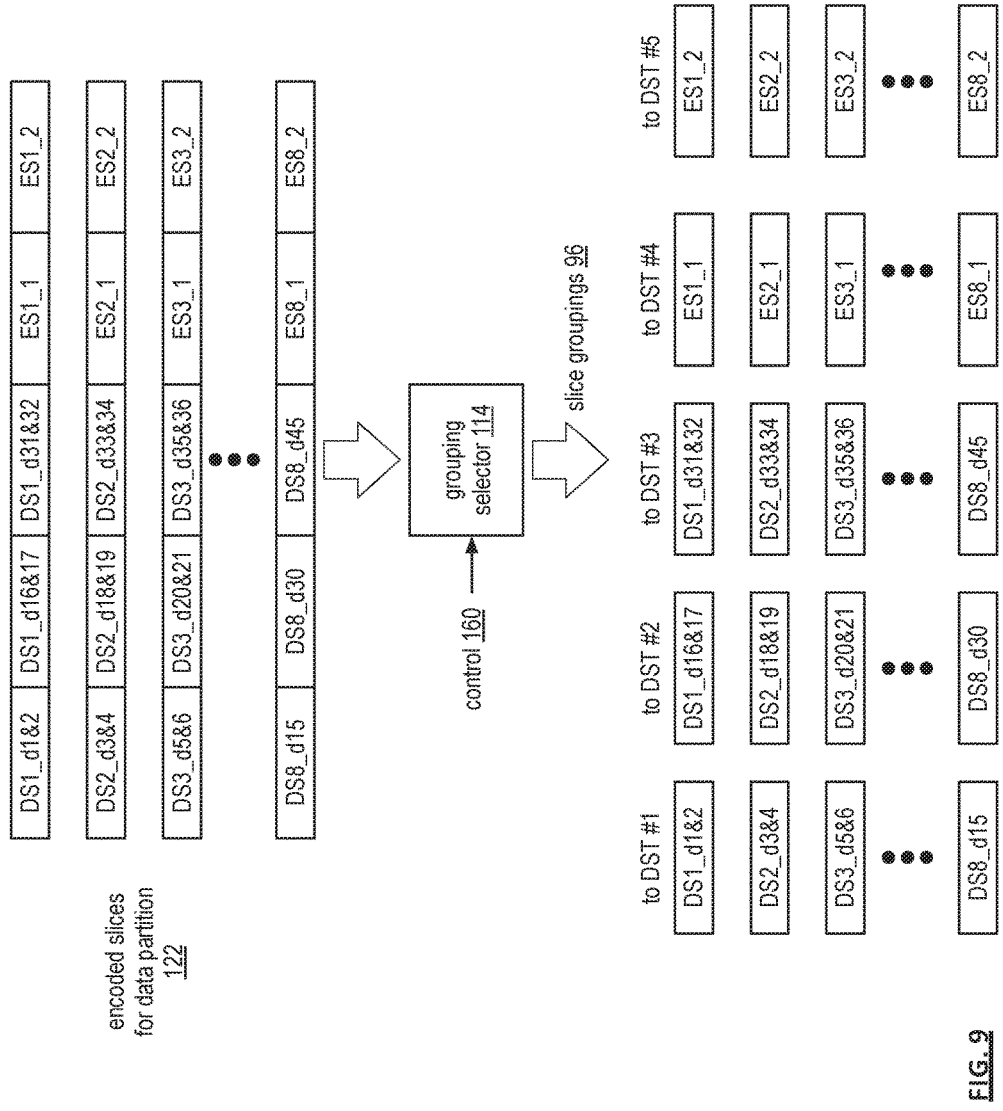
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
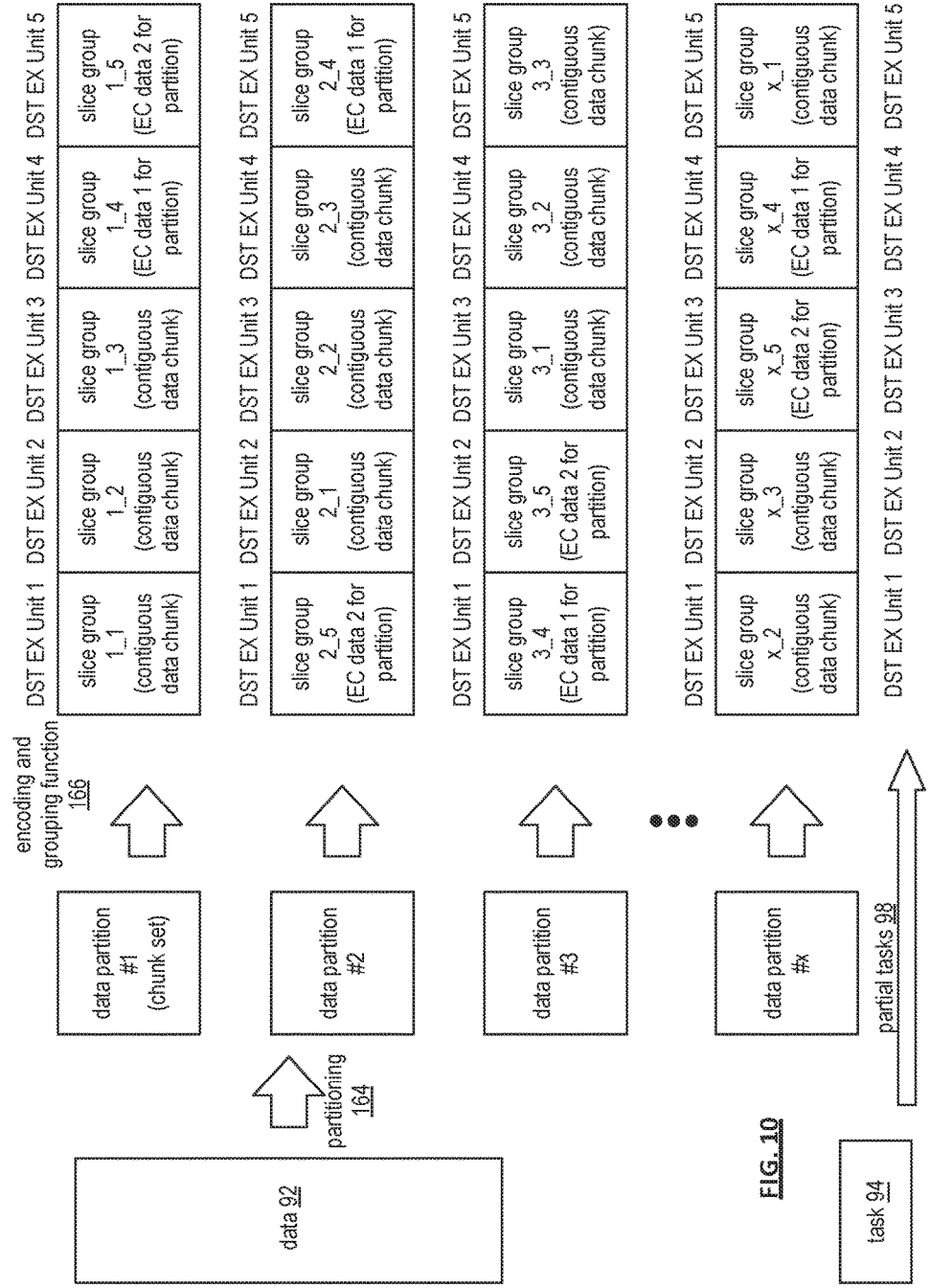
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary. For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc. For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
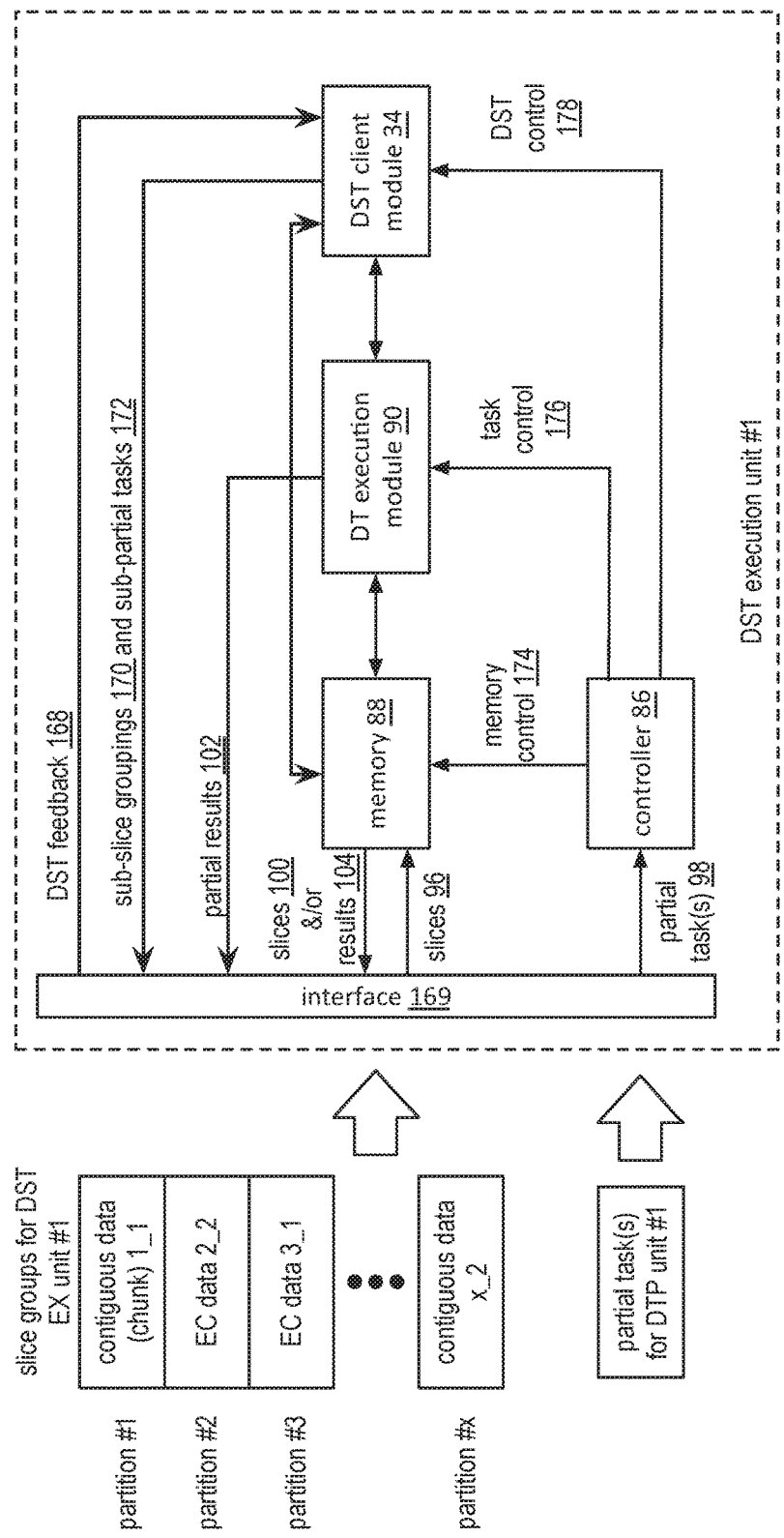
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
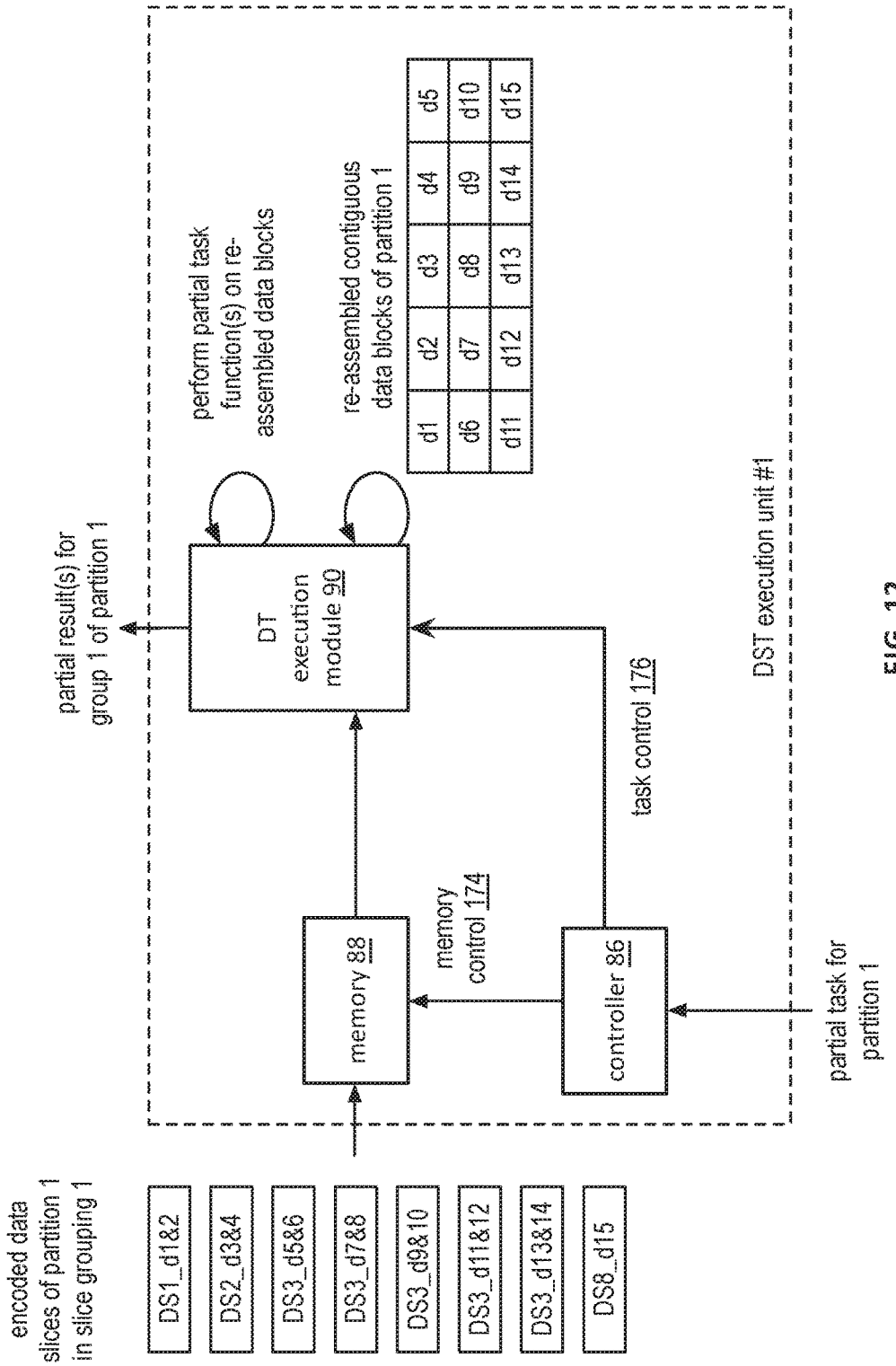
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
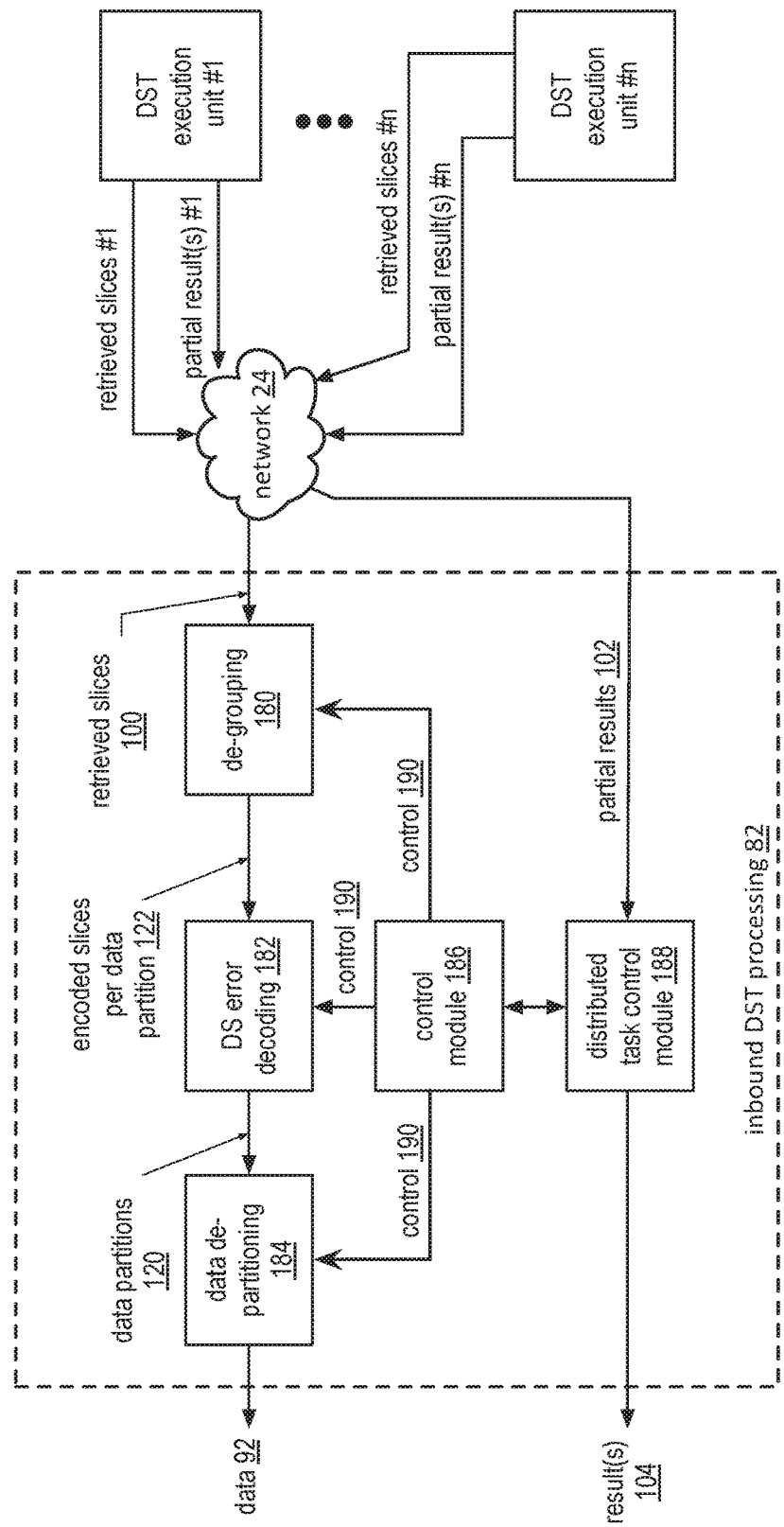
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
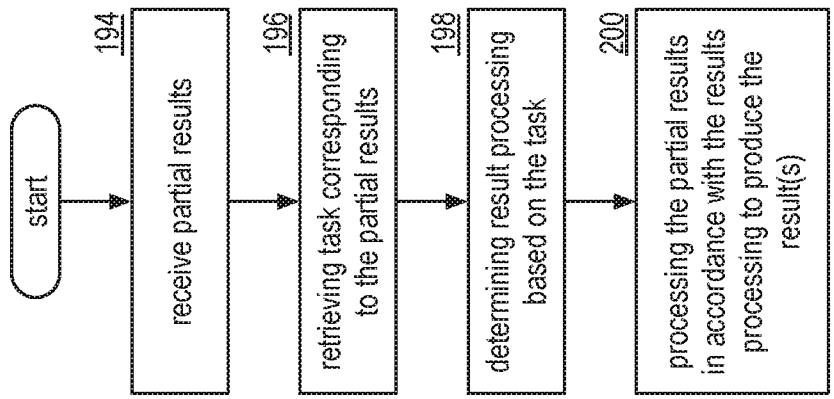
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
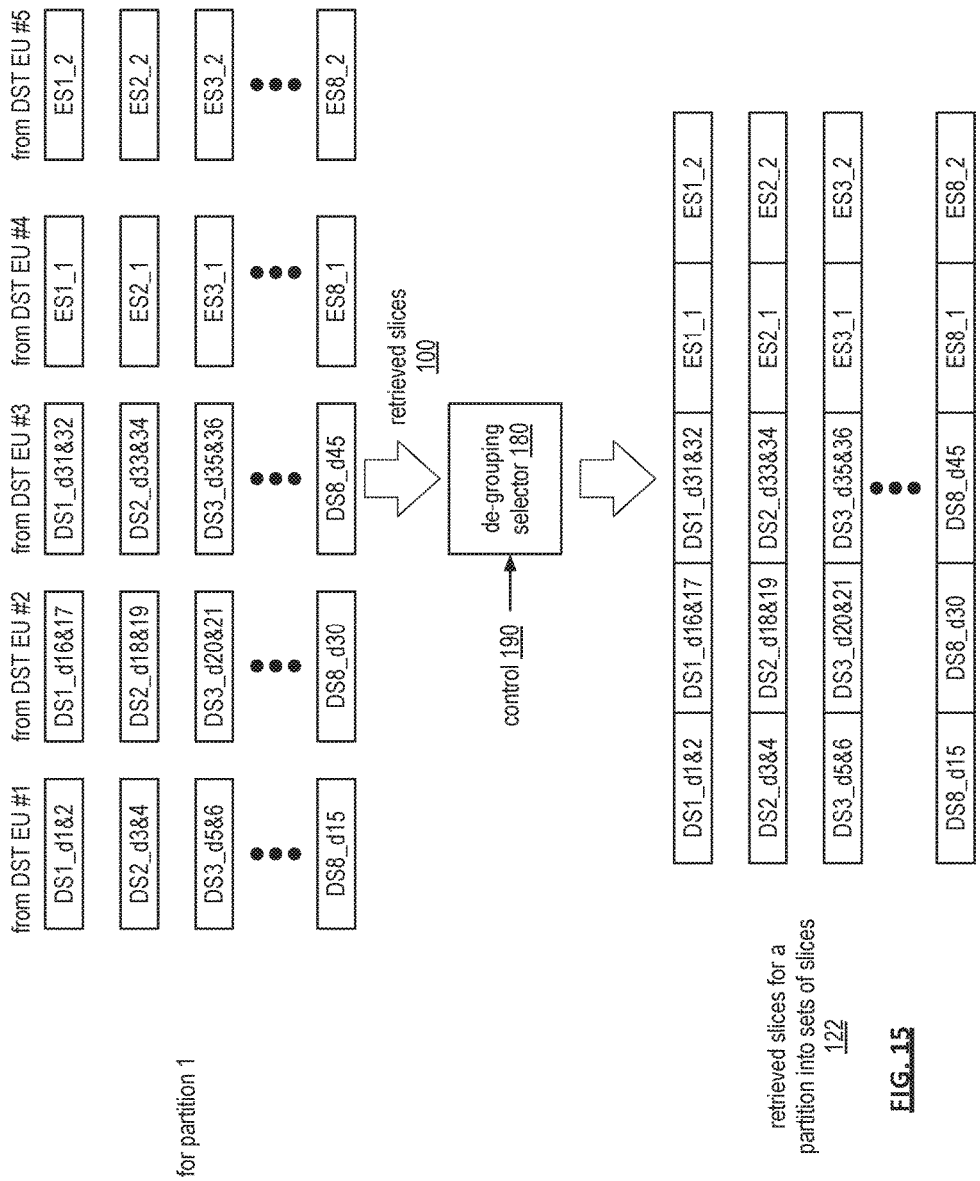
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
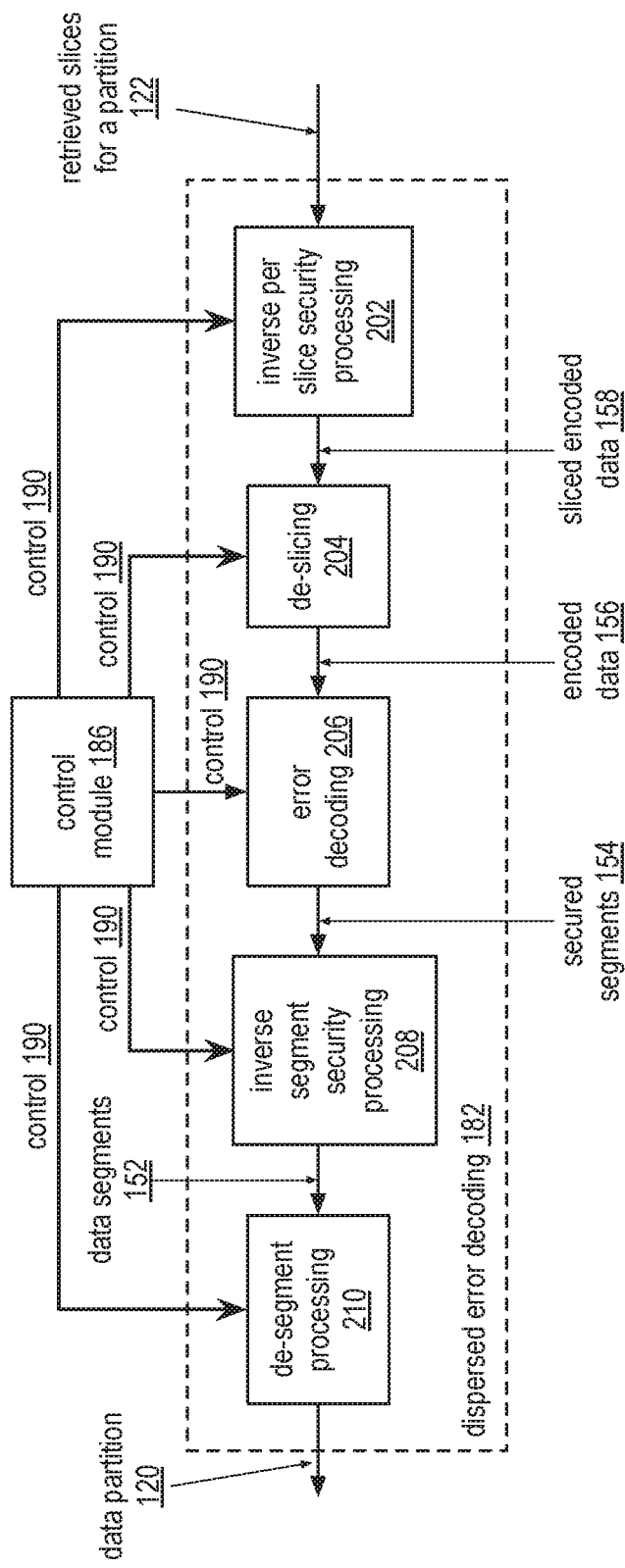
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
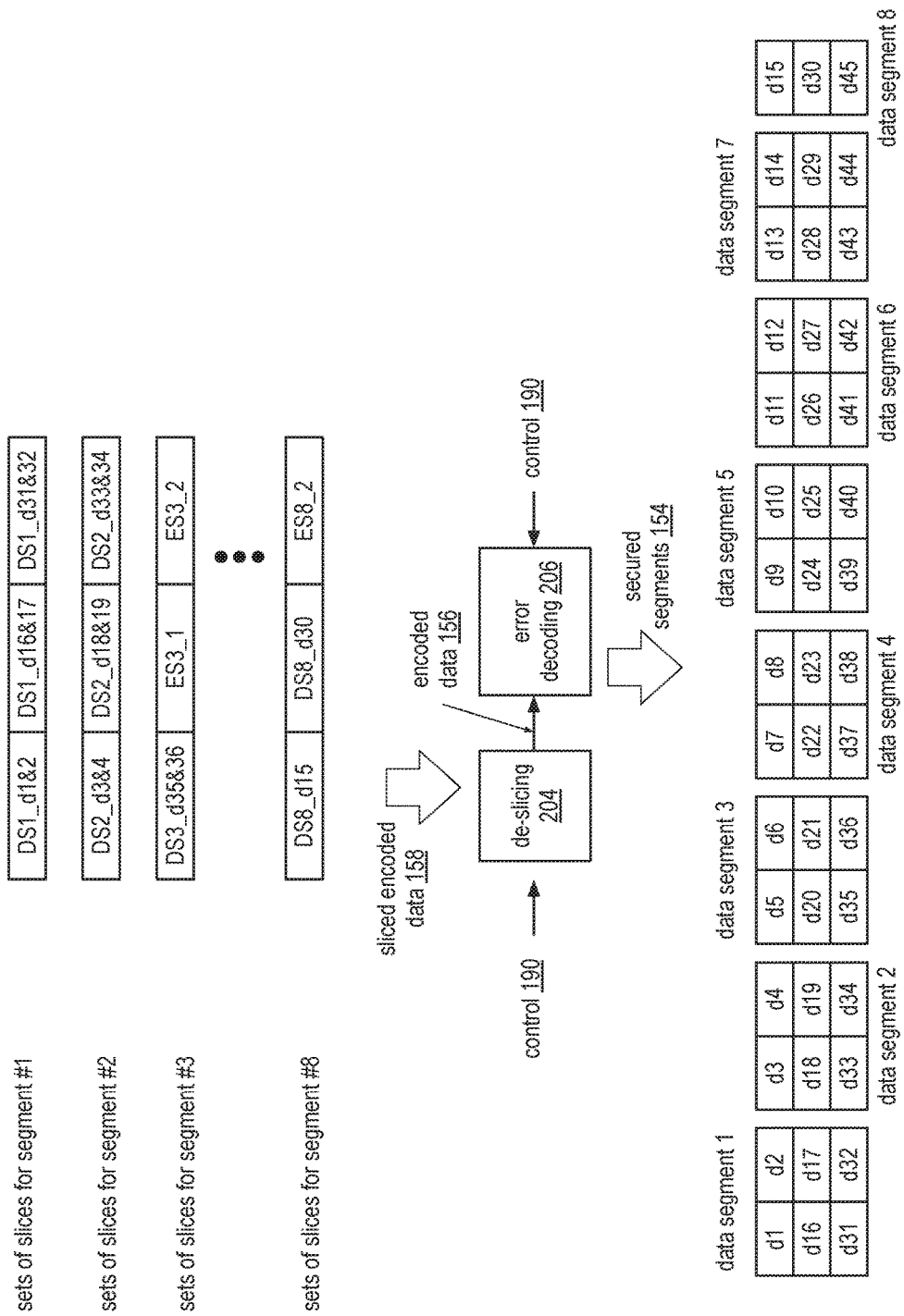
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1 d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
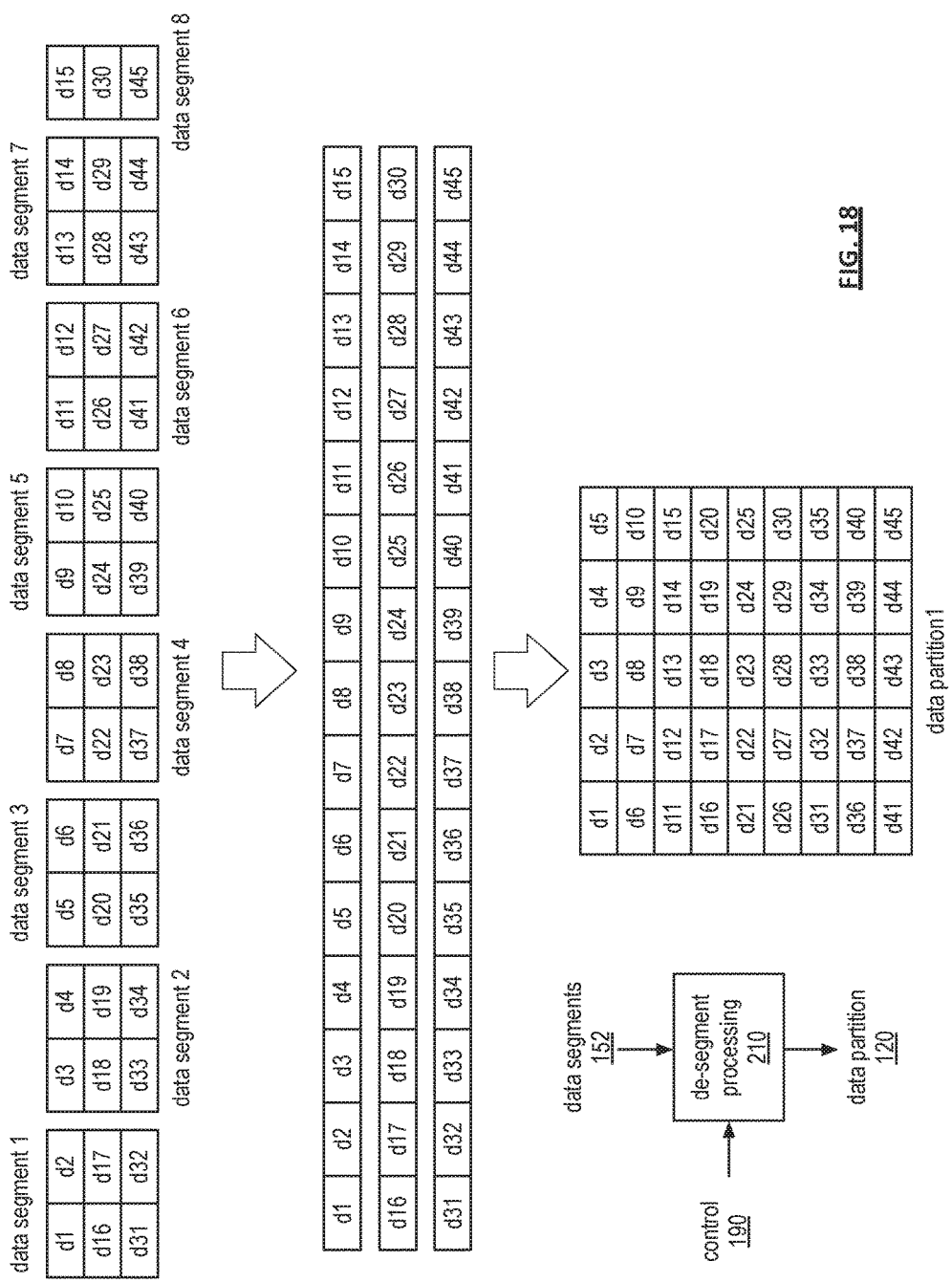
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

Figure 19:
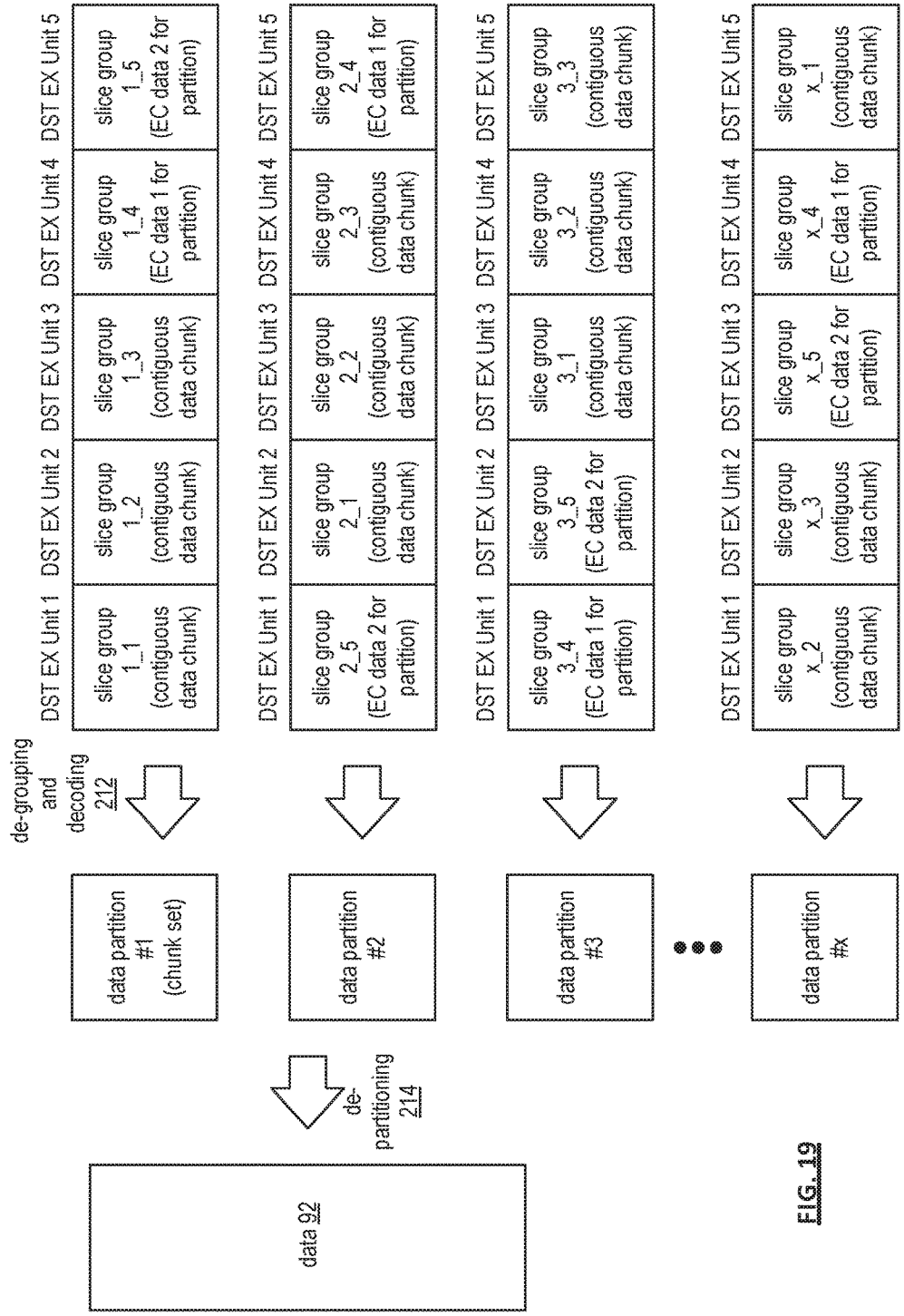
FIG. 19 is a diagram of an example of converting slice groups into data in accordance with the present invention.

The de-segmenting module 210 converts the rows and columns of data blocks into the data partition 120. Note that each data block may be of the same size as other data blocks or of a different size. In addition, the size of each data block may be a few bytes to megabytes of data. FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
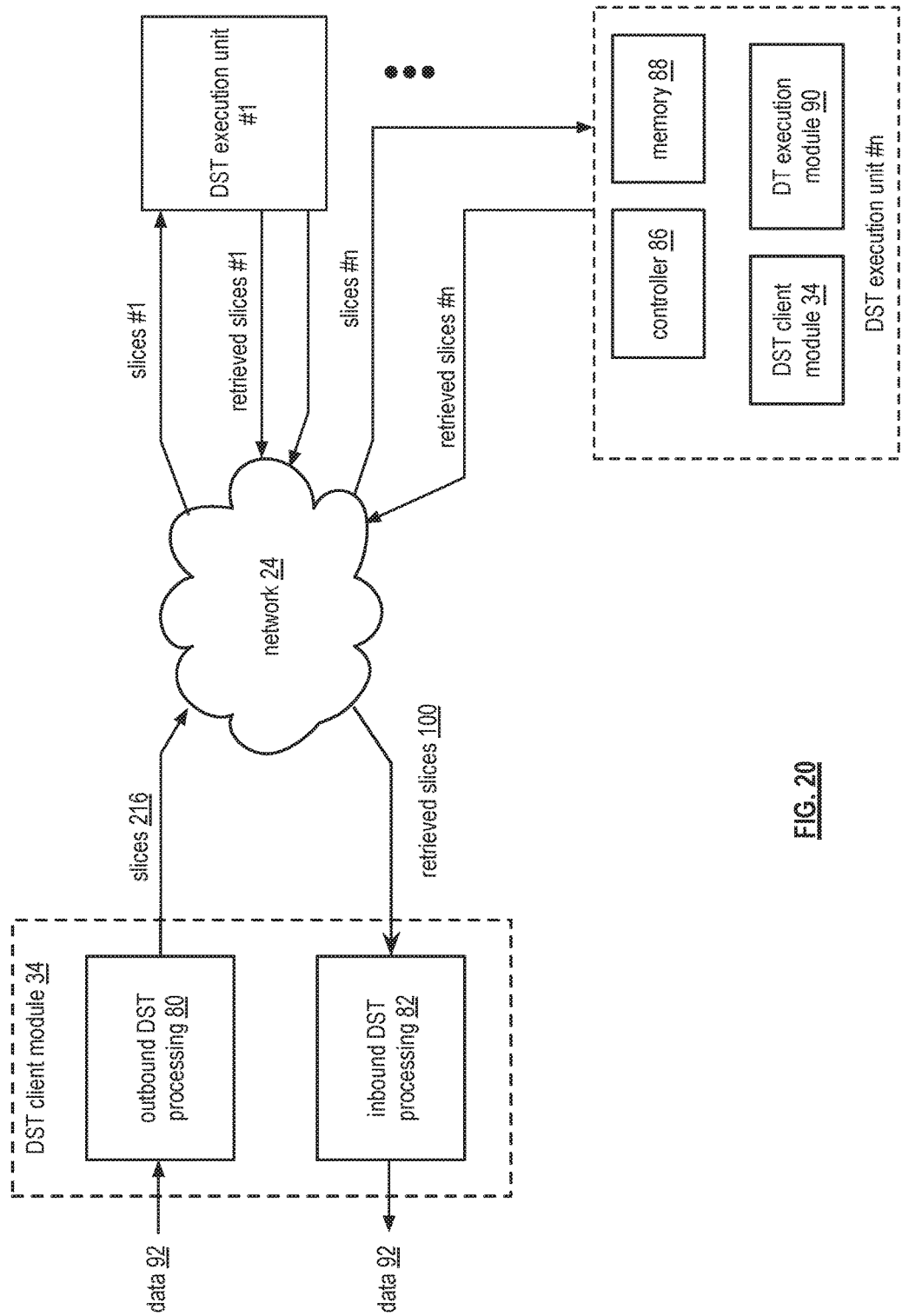
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
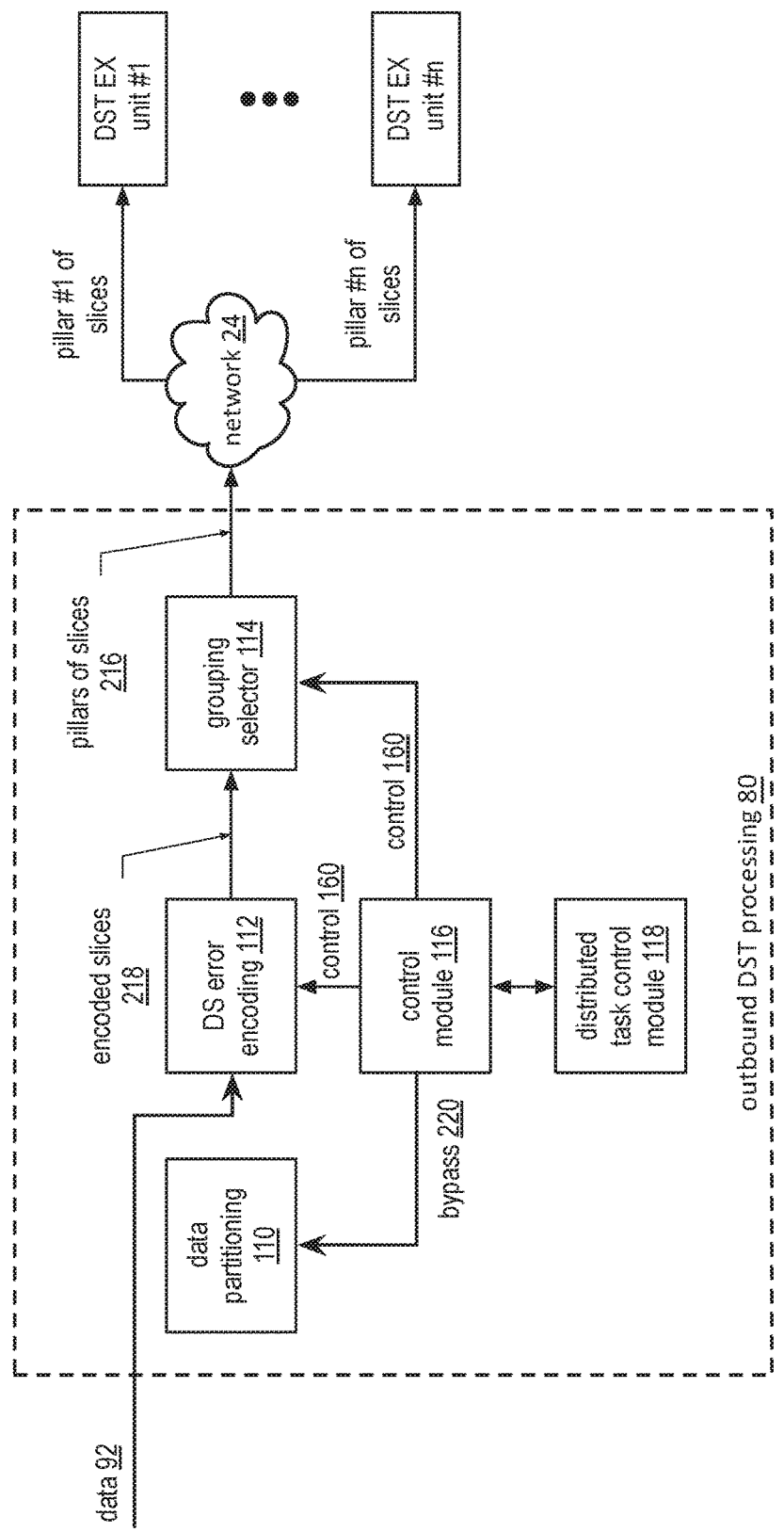
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The group selecting module 114 groups the encoded slices 218 of the data segments into pillars of slices 216. The number of pillars corresponds to the pillar width of the DS error encoding parameters. In this example, the distributed task control module 118 facilitates the storage request.

Figure 22:
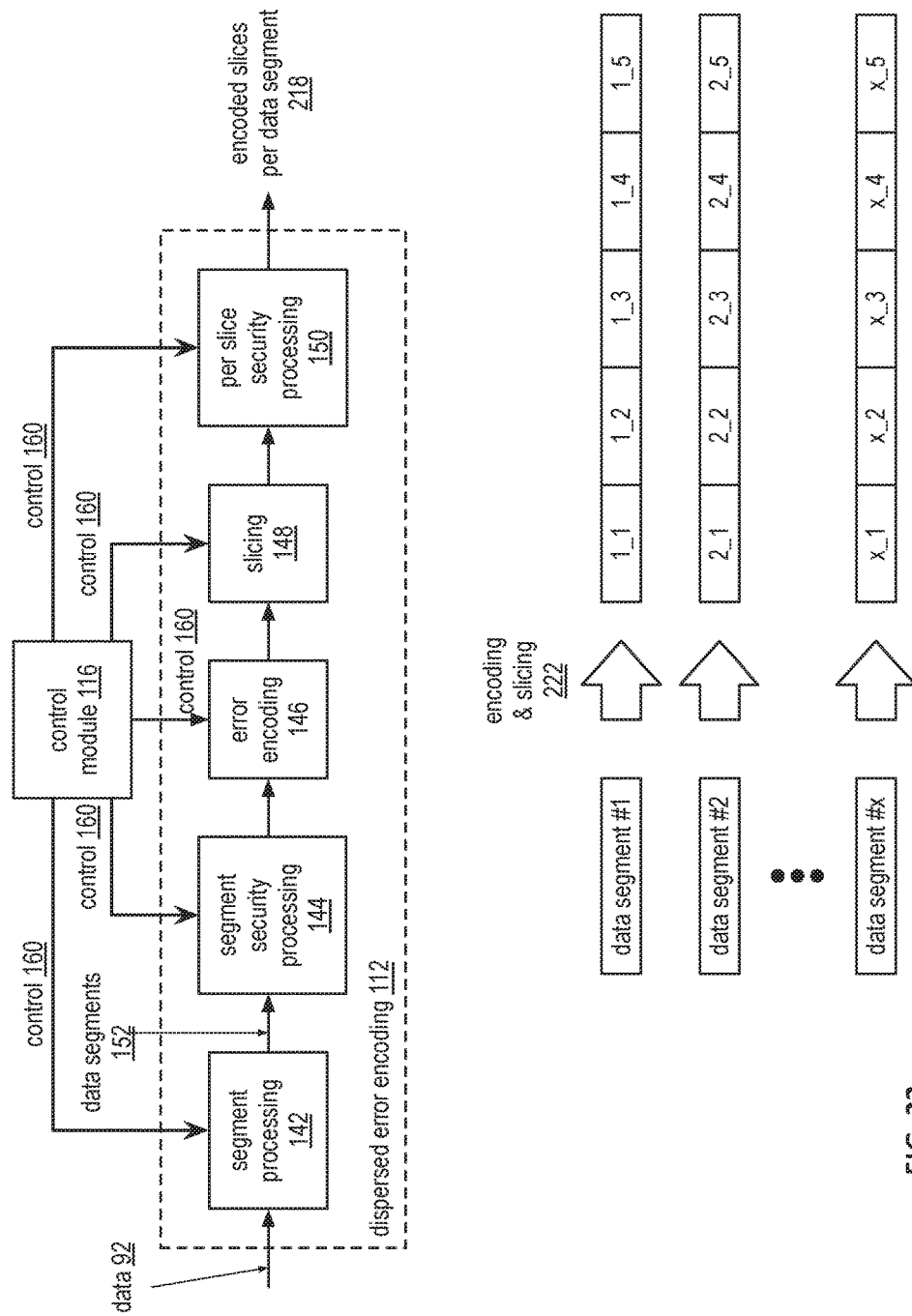
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
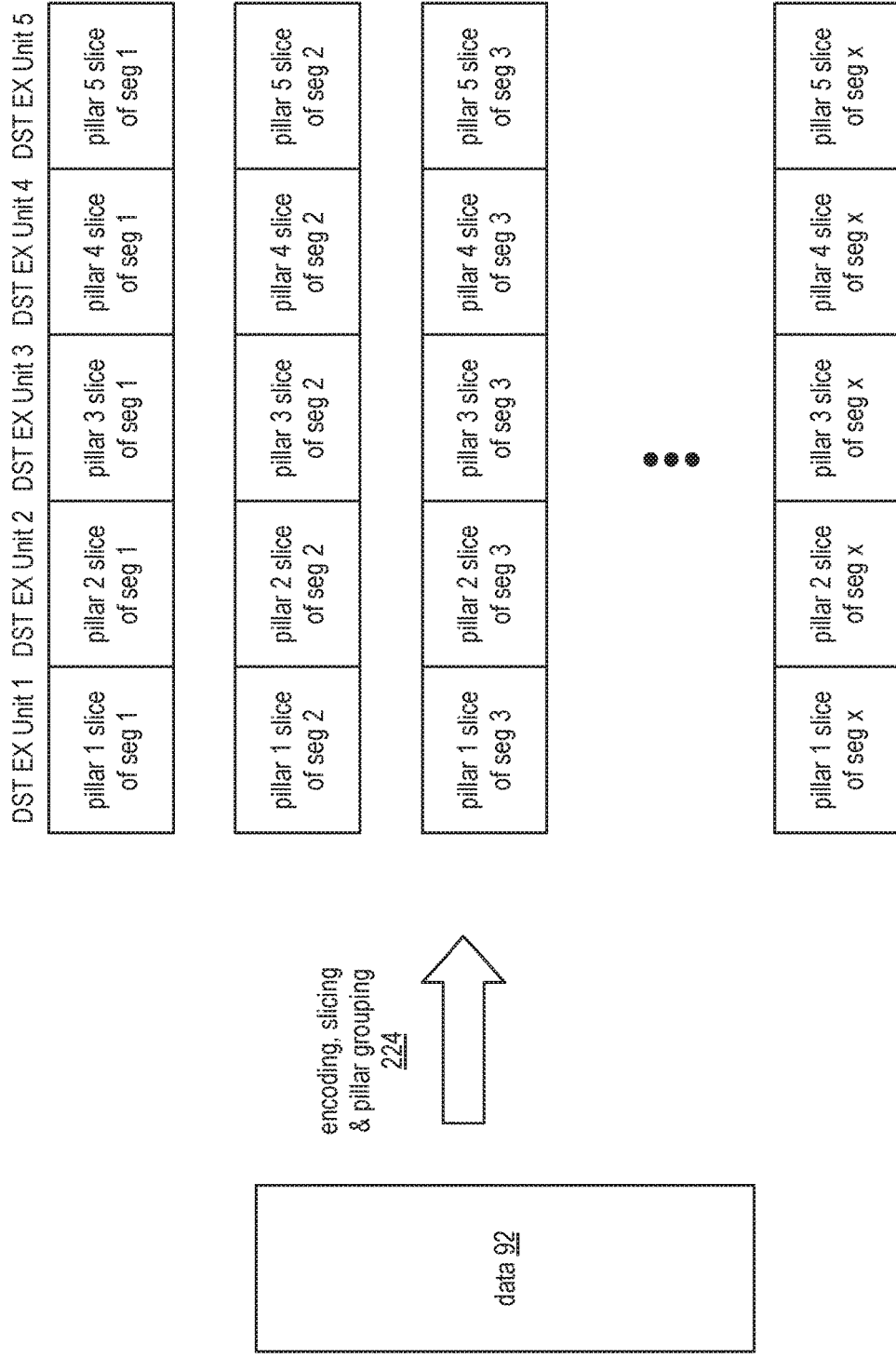
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

Figure 24:
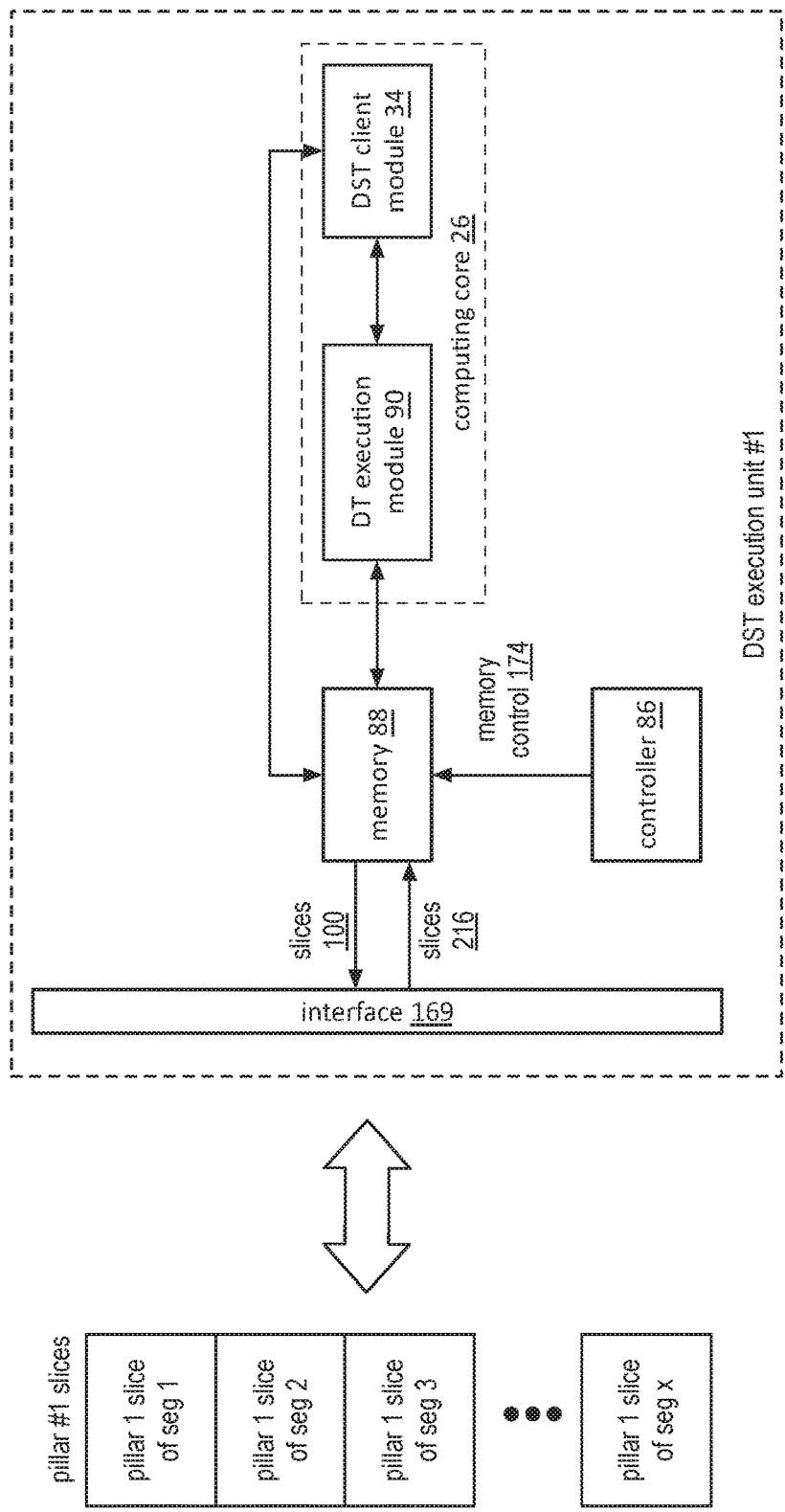
FIG. 24 is a schematic block diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
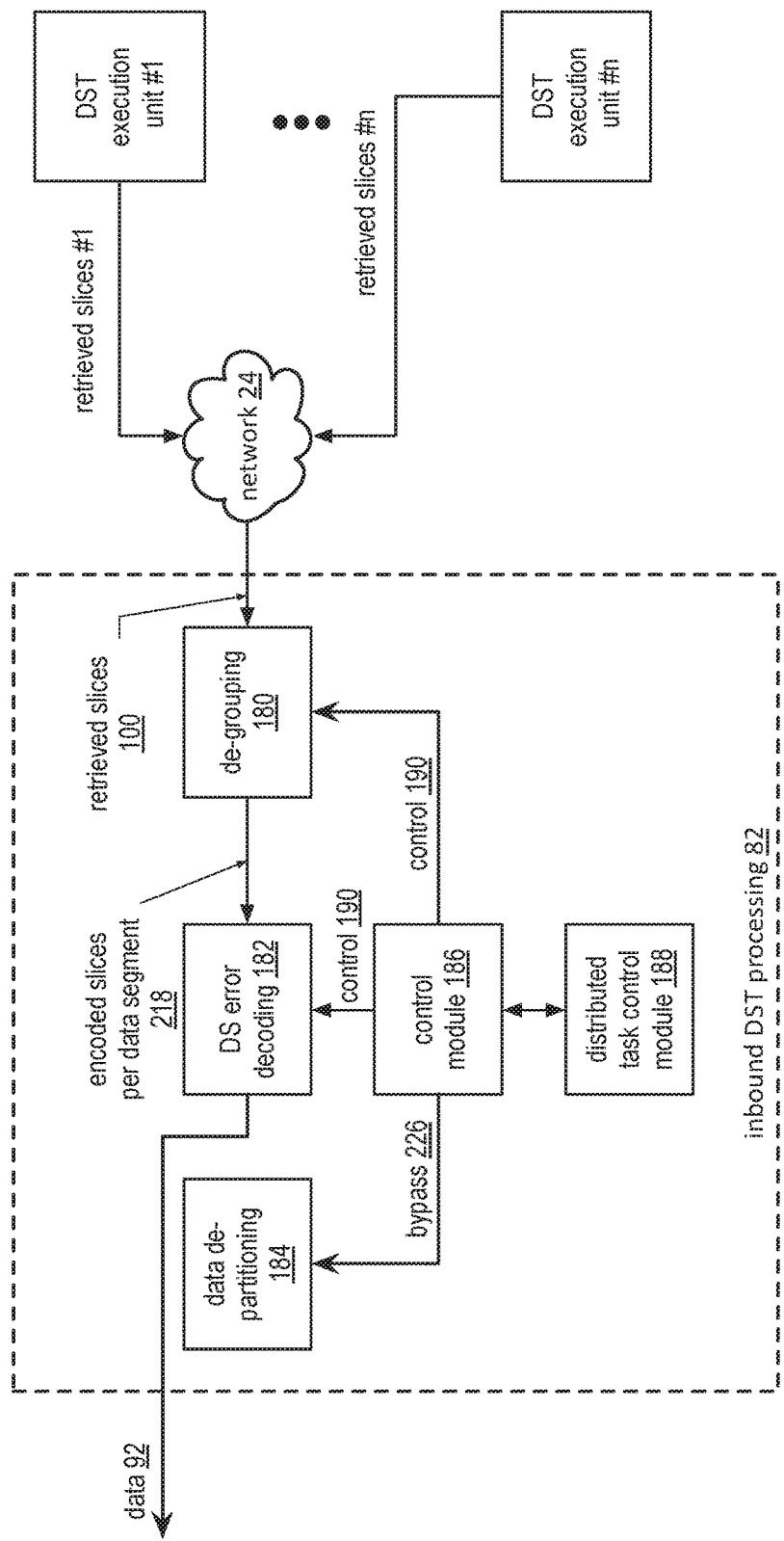
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
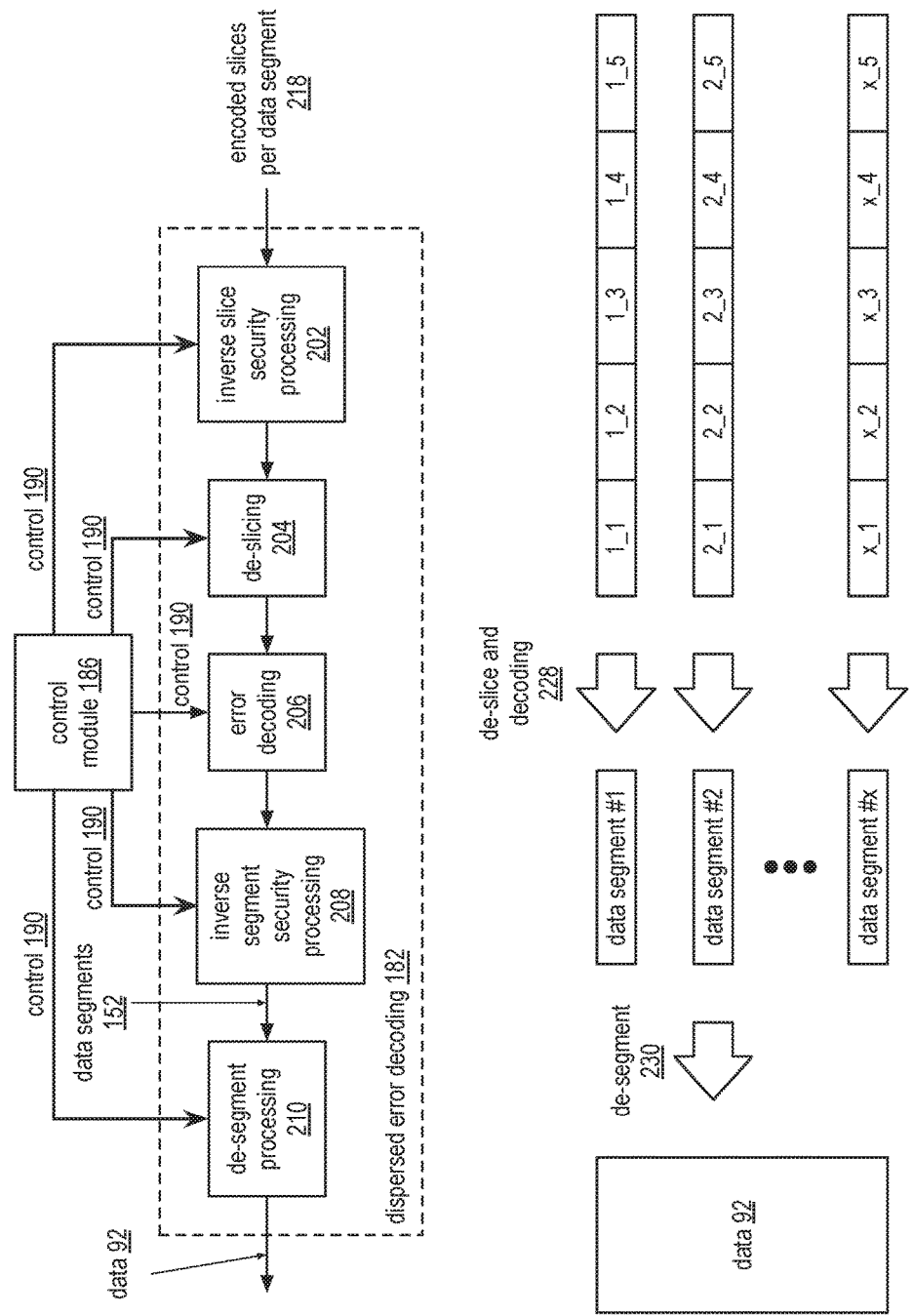
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
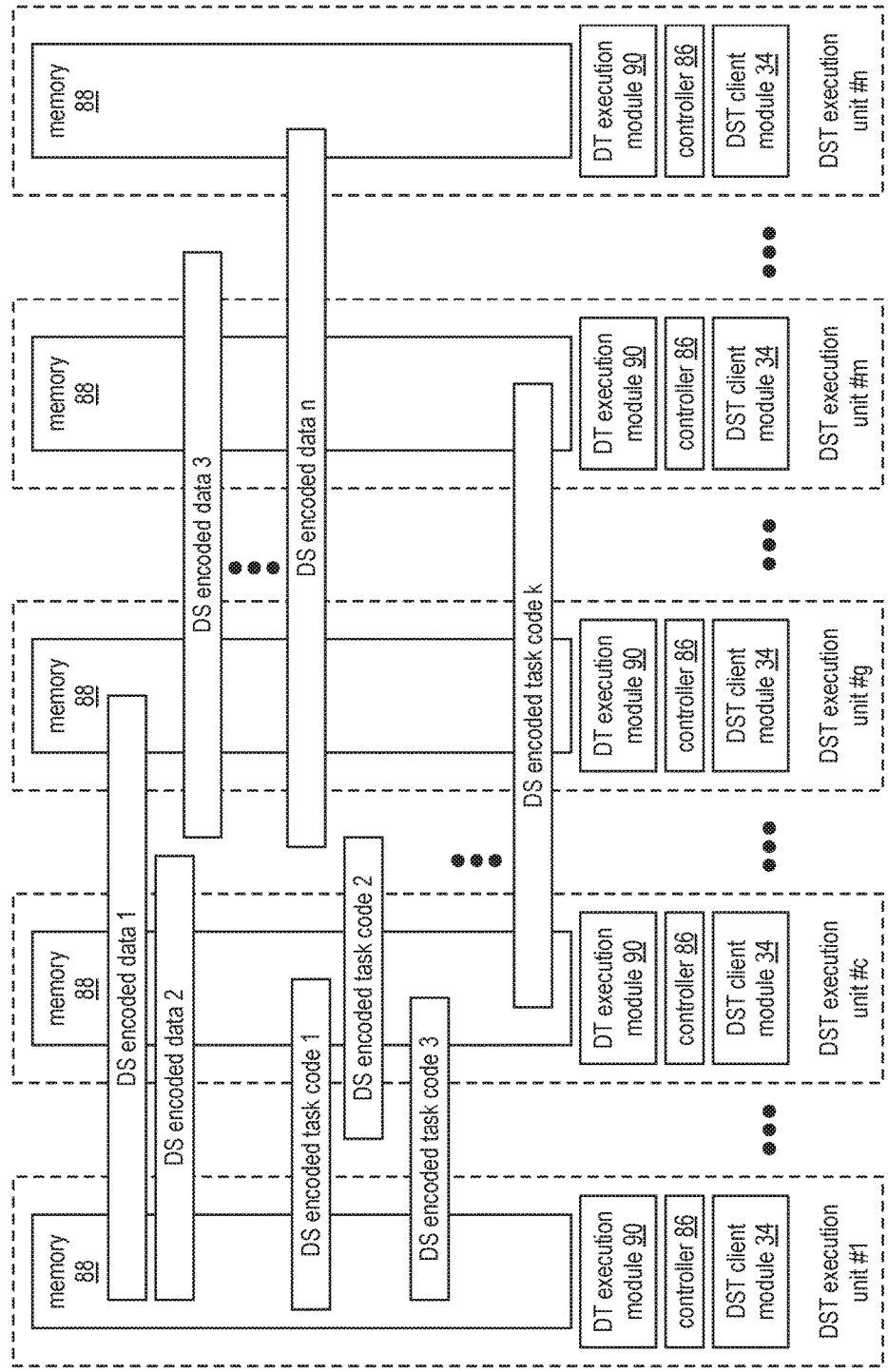
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
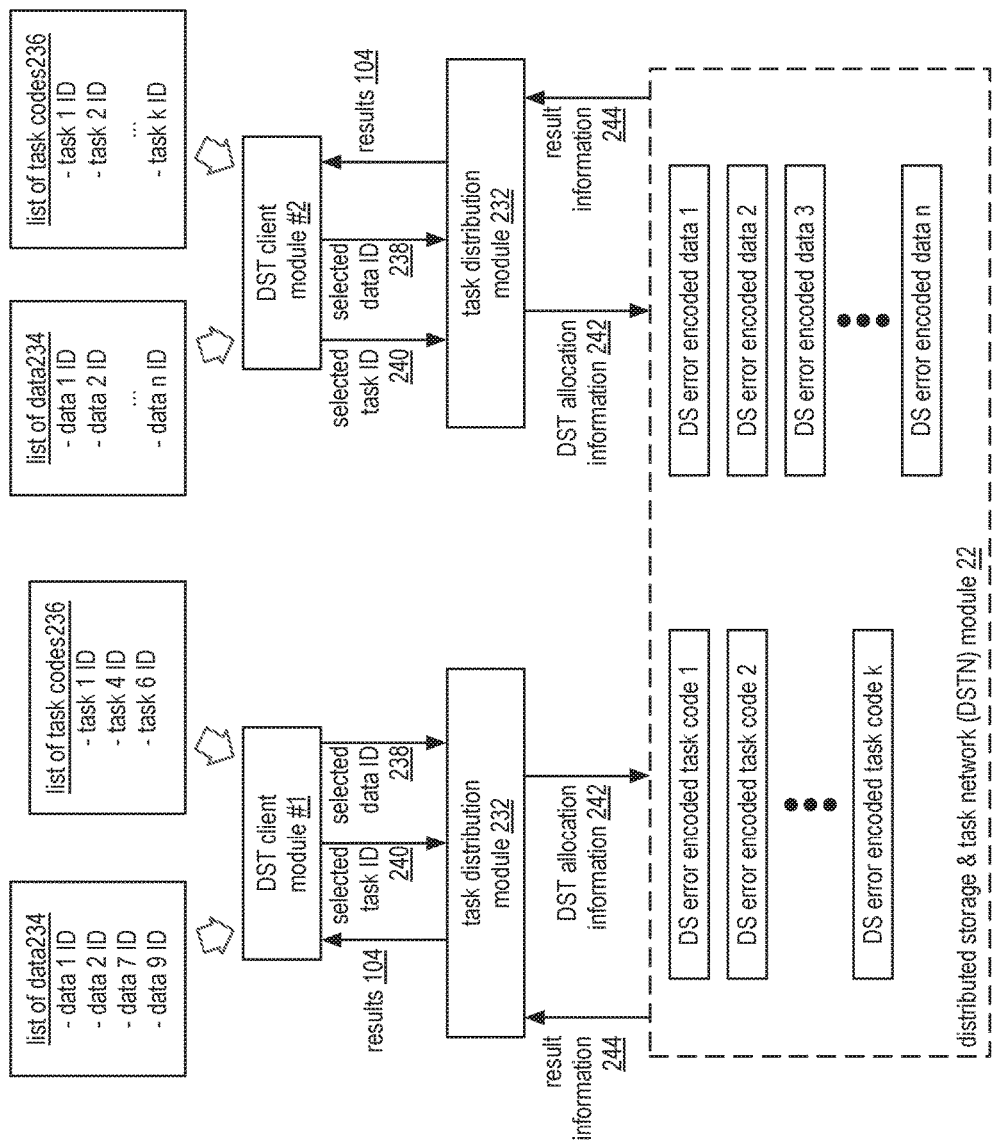
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
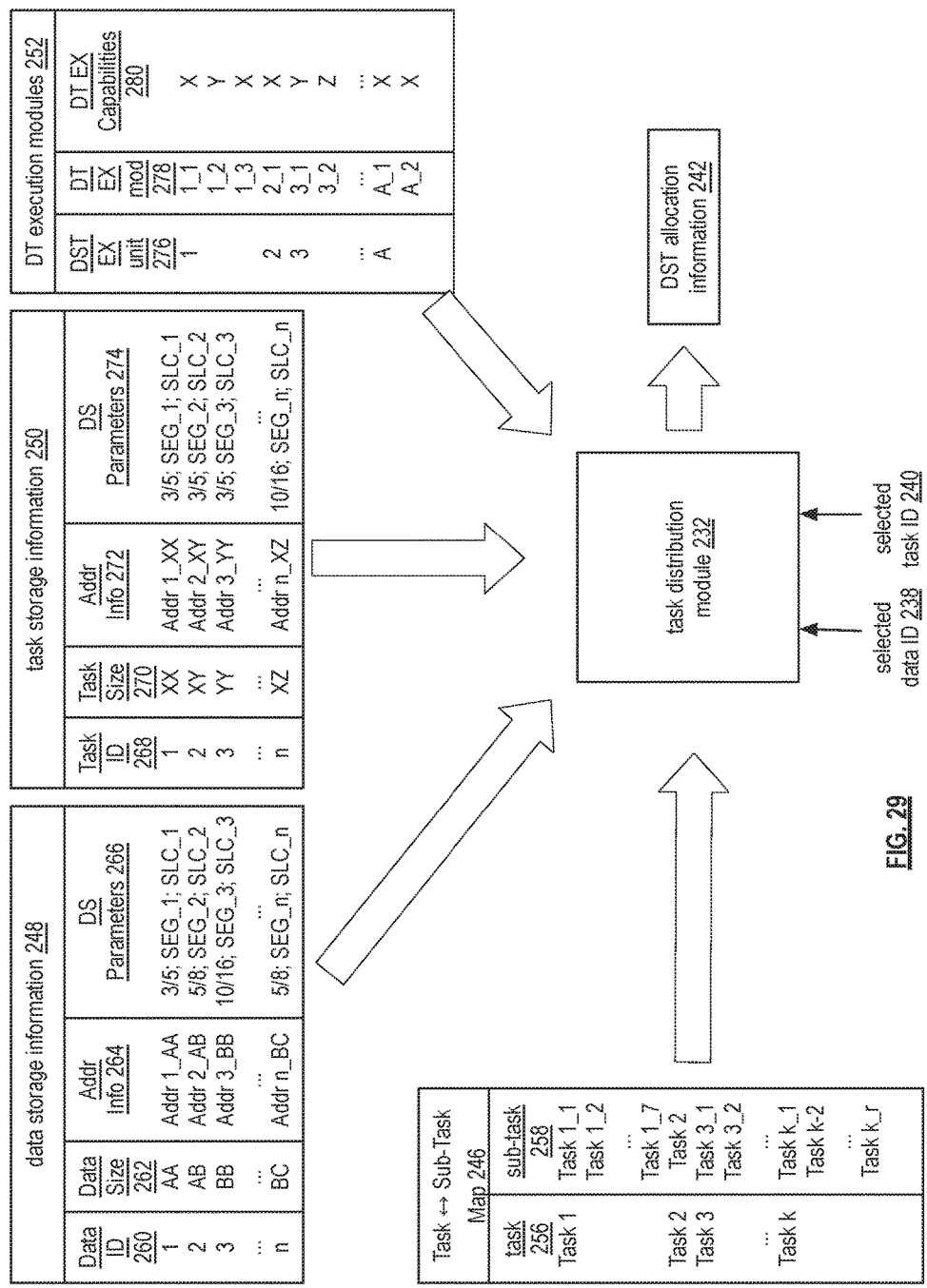
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG 1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG 2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG 2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
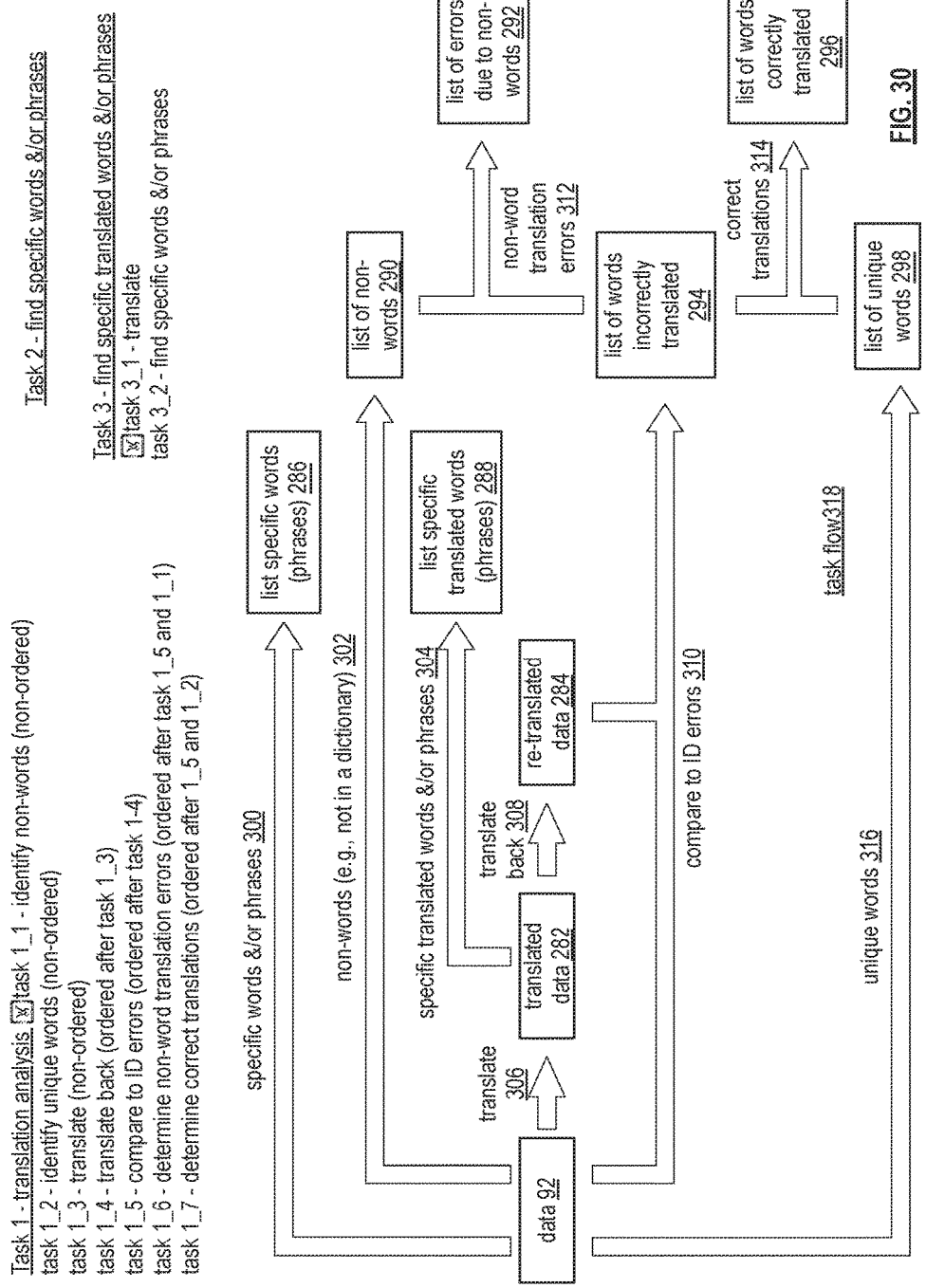
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1-identify non-words (non-ordered); task 1_2-identify unique words (non-ordered); task 1_3-translate (non-ordered); task 1_4-translate back (ordered after task 1_3); task 1_5-compare to ID errors (ordered after task 1-4); task 1_6-determine non-word translation errors (ordered after task 1_5 and 1_1); and task 1_7 -determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
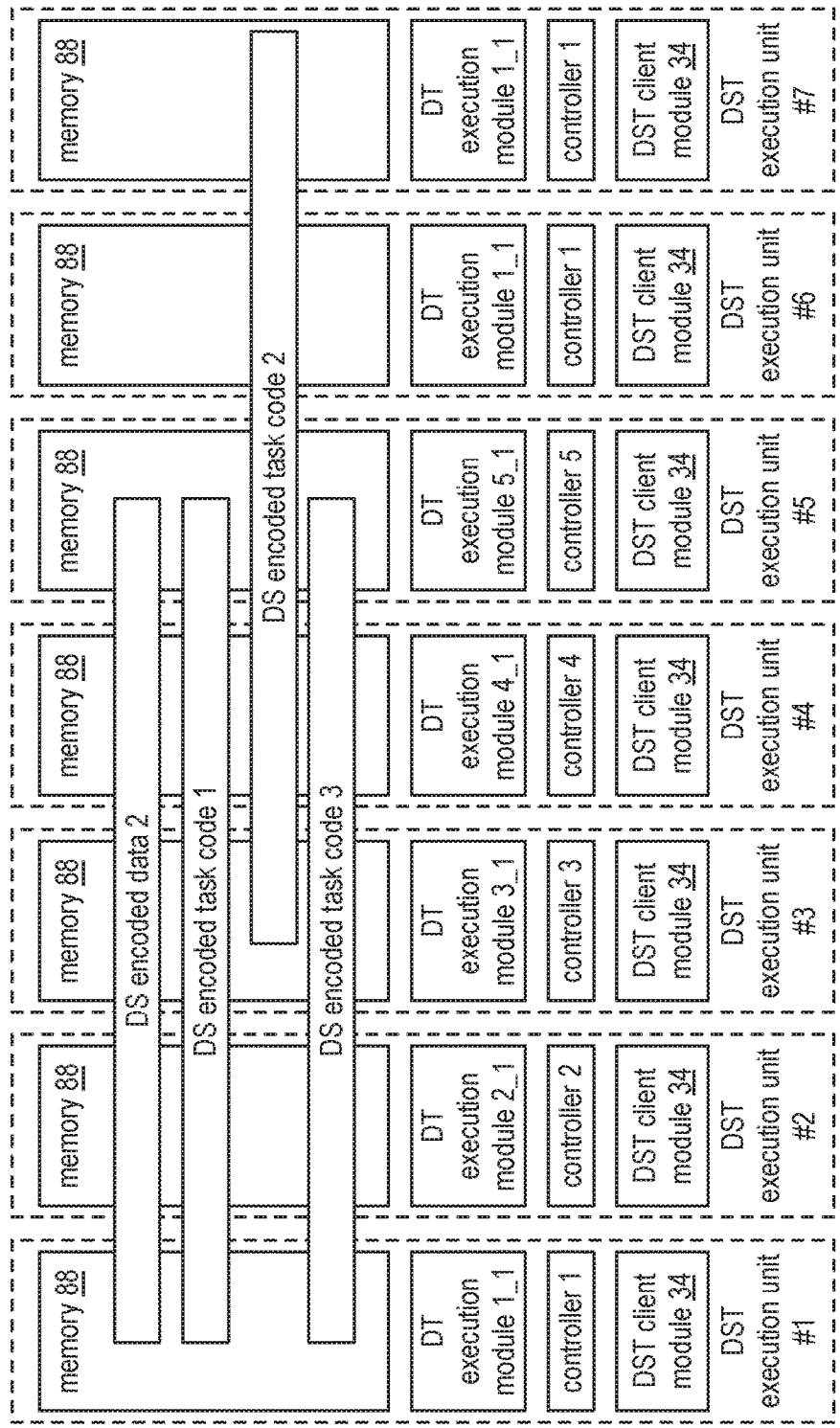
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1$^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
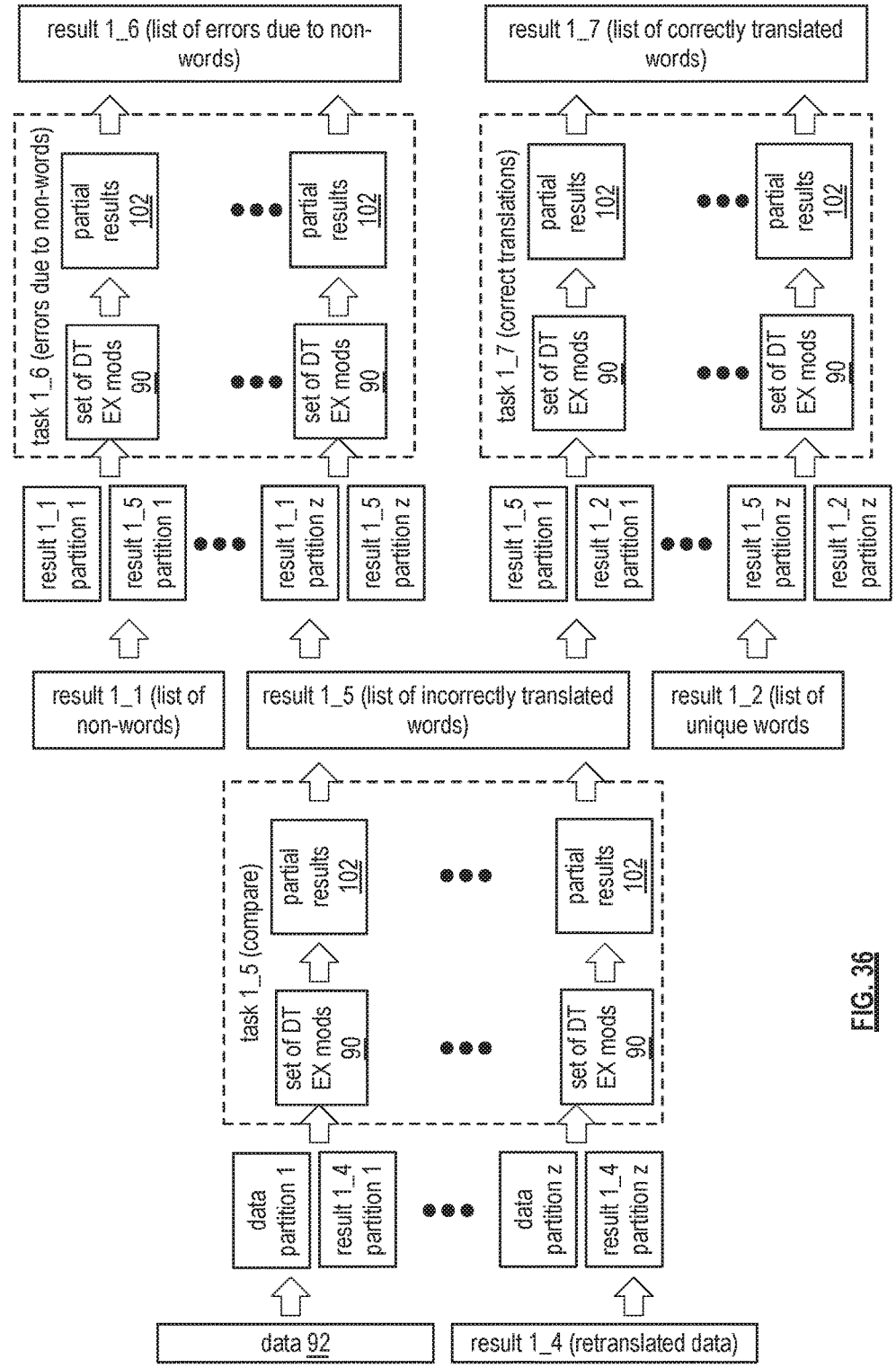

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., 1$^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., 1$^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., 1$^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
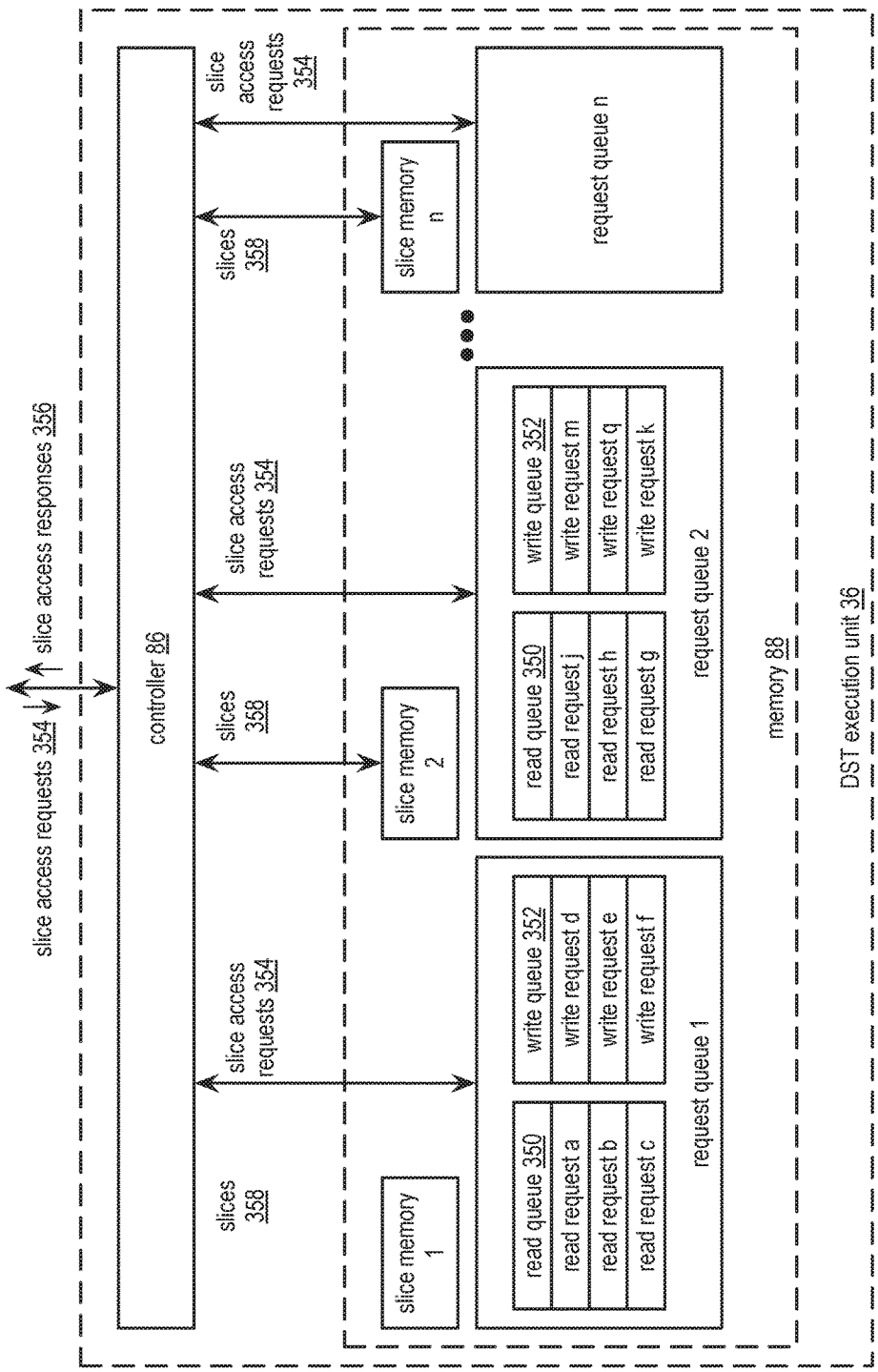
FIG. 40A is a schematic block diagram of another DST execution unit in accordance with the present invention.

FIG. 40A is a schematic block diagram of another distributed storage and task (DST) execution unit 36 that includes a controller 86 and a memory 88. The memory 88 includes a set of request queues 1-n and a corresponding set of slice memories 1-n. The controller 86 is operational to receive slice access requests 354, determine an execution ordering for the slice access requests 354, and facilitate execution of the slice access requests 354 in accordance with the execution ordering to produce slice access responses 356. Slice access requests 354 includes one or more read requests and one or more write requests. Slice access responses 356 includes one or more read responses and one or more write responses. Each request queue of the set of request queues 1-n includes a read queue 350 and a write queue 352. The set of request queues 1-n are operational to store slice access requests 354 in accordance with the execution ordering. For example, a read queue 350 of request queue 1 is utilized to store a read request a, a read request b, and a read request c, wherein read request a is prioritized for execution prior to execution of read request b and read request c. As another example, a write queue 352 of request queue 1 is utilized to store a write request d, a write request e, and a write request f, wherein write request d is prioritized for execution prior to execution of write request e and write request f.

In an example of operation, the controller 86 receives the read request c and determines an associated slice memory and associated request queue based on the request. For example, the controller 86 utilizes a slice name of the request as an index into a memory assignment table to identify slice memory 1 as an assigned memory for a slice 358 of the request. Next, the controller stores the read request c in the read queue 350 of request queue 1. The controller 86 determines the execution ordering based on a time of arrival for the one or more read requests stored in the read queue 350 of request queue 1 when an execution ordering approach indicates to utilize a first in first out approach. The controller 86 may further prioritize the execution ordering between the read queue 350 and the write queue 352. For example, the controller 86 determines the execution ordering such that a sequence of contiguous read requests are executed ahead of write requests to provide an improved read access performance level. As another example, the controller 86 determines execution ordering such that a sequence of contiguous write requests are executed ahead of read requests to provide an improved write bandwidth efficiency level. When the controller 86 has executed slice access requests that are scheduled for execution ahead of the read request c, the controller 86 executes read request c by retrieving a slice 358 from slice memory 1 and outputting the slice 358 in the slice access response 356. The method of operation to determine the execution ordering is discussed in greater detail with reference to FIG. 40B.

Figure 40B:
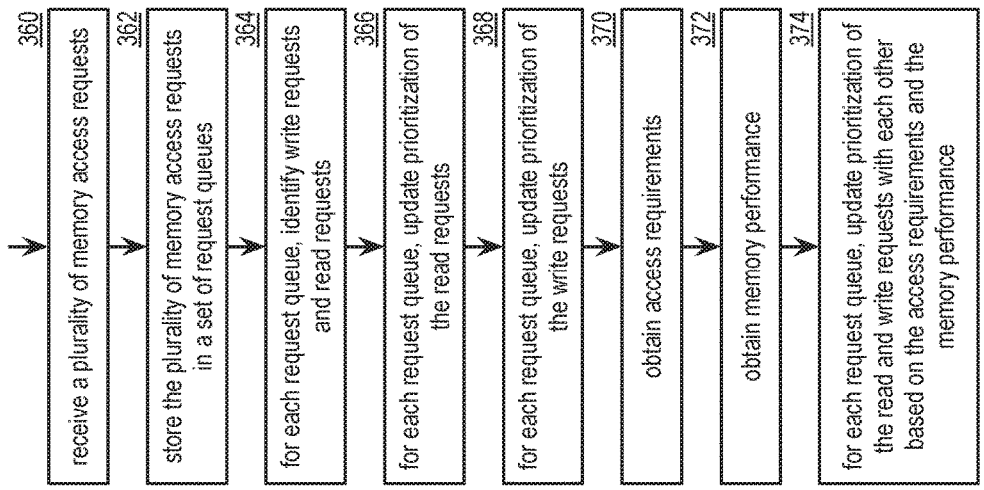
FIG. 40B is a flowchart illustrating an example of prioritizing memory access requests in accordance with the present invention.

FIG. 40B is a flowchart illustrating an example of prioritizing memory access requests. The method begins at step 360 where a processing module (e.g., of a distributed storage and task (DST) client module, of a DST execution unit controller) receives a plurality of memory access requests. Each memory access request includes one or more of a request type indicator (e.g., write, read), a slice, a slice name, an access requirement (e.g., performance, availability), a priority level indicator, a data type indicator (e.g., video, text, music, speech), and a requesting unit identifier (ID).

The method continues at step 362 where the processing module stores the plurality of memory access requests in a set of request queues. The storing includes, for each request, identifying an associated request queue of the set of request queues, appending the request to pre-existing requests within the identified request queue to produce an updated request queue, and storing the updated request queue. For example, the processing module receives a read access request for a slice corresponding to a slice name, identifies request queue 4 based on a slice location table lookup utilizing the slice name as an index, appends the read access request to a read request queue 4 of request queue 4 to produce an updated read request queue 4, and stores the updated read request queue 4 in request queue 4 (e.g., within a local memory).

The method continues at step 364 where the processing module, for each request queue, identifies write requests and read requests. For example, the processing module extracts a request type indicator from each request to identify the write requests and the read requests. As another example, the processing module identifies write requests as requests stored within a write access queue and identifies read requests as requests stored within a read access queue. The identifying may include sorting the requests by request type and storing the sorted requests in corresponding write request queues and read request queues of the request queues.

The method continues at step 366 where the processing module, for each request queue, updates prioritization of the read requests. The updating may be based on one or more of a previous prioritization, an access requirement, a priority level indicator, and a data type indicator. For example, the processing module updates the prioritization of the requests such that a set of associated read requests that correspond to accessing a common data file are prioritized together to provide an improved access latency performance level.

The method continues at step 368 where the processing module, for each request queue, updates prioritization of the write requests. The updating may be based on one or more of the read requests prioritization, a previous prioritization, an access requirement, a priority level indicator, and a data type indicator. For example, the processing module updates the prioritization of the requests such that a set of associated write requests that correspond to writing a common data file are prioritized together to provide an improved write sequence performance level.

The method continues at step 370 where the processing module obtains access requirements. The obtaining may include one or more of a lookup, retrieving a predetermination, and extracting an access requirement from a memory access request. The method continues at step 372 where the processing module obtains memory performance. The obtaining may include one or more of initiating a query, performing a test, a lookup, and receiving an error message.

The method continues at step 374 where the processing module, for each request queue, updates prioritization of the read access requests and the write access requests with each other based on one or more of a prioritization scheme, the access requirements and the memory performance. For example, the processing module prioritizes a sequence of read access requests that are associated with retrieving a video file ahead of write requests to provide a retrieve video stream without interruptions. As another example, the processing module prioritizes a sequence of write access requests ahead of read requests to improve efficiency of memory access when a memory device is a disk drive and an access requirement indicates to group write access requests together to improve write bandwidth.

Figure 41A:
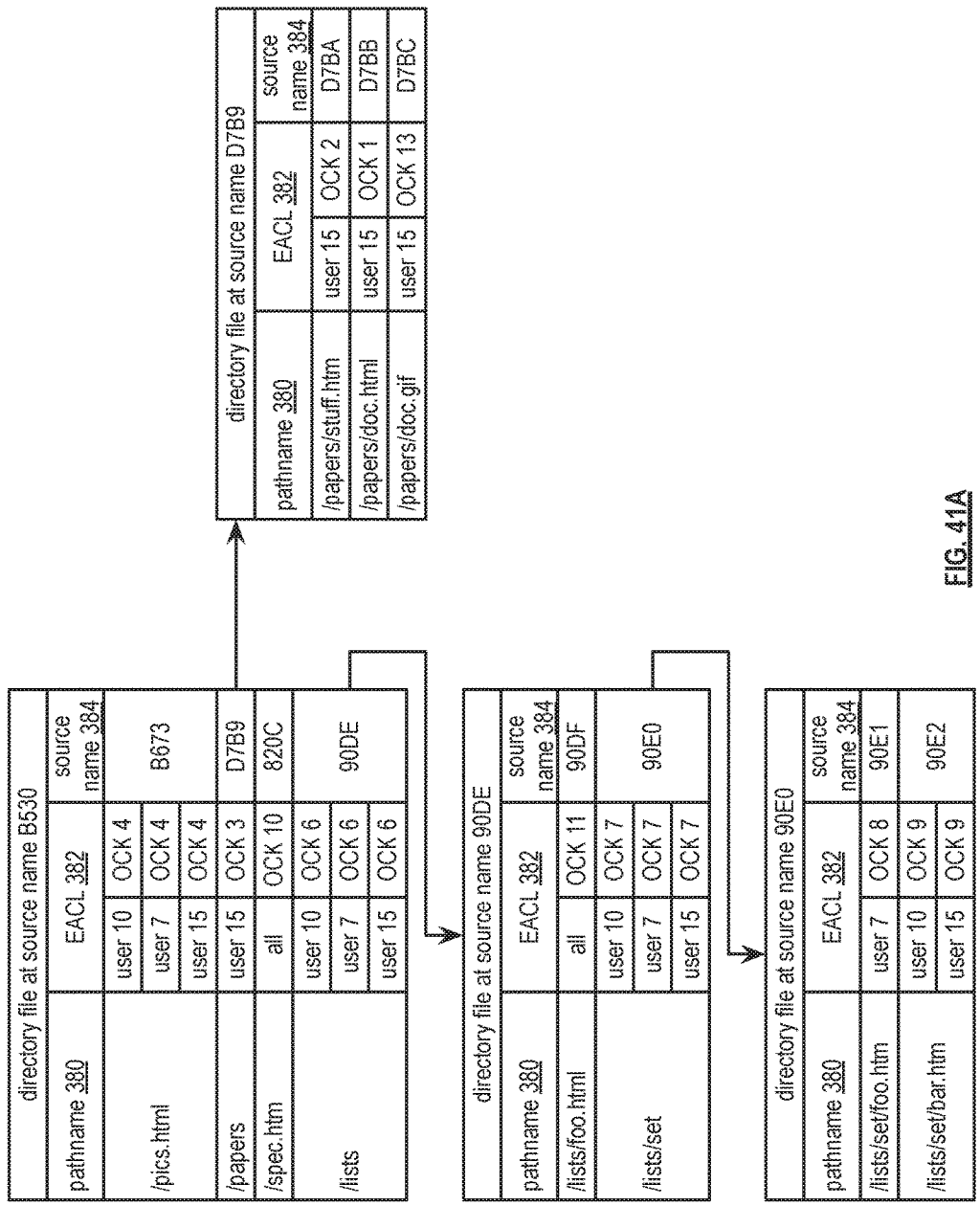
FIG. 41A is a diagram of an example of a directory structure in accordance with the present invention.

FIG. 41A is a diagram of an example of a directory structure that includes a plurality of linked directory files including a directory file stored at source name B530, a directory file stored at source name D7B9, a directory file stored at source name 90DE, and a directory file stored at source name 90E0. Each directory file includes one or more directory file entries such that each directory file entry includes a pathname field 380, an encryption access control list (EACL) field 382, and a source name field 384. The pathname field 380 includes a pathname entry of the directory file entry that includes one of a portion of a directory path and a file name. For example, the pathname field 380 may include a pathname entry of/papers when the pathname entry is a portion of a directory path. As another example, the pathname field 380 may include a pathname entry of/spec.htm when the pathname entry is a filename.

The EACL field 382 includes a EACL entry of the directory file entry that includes one or more of a user identifier (ID) and a key fingerprint (e.g., a hash of a key), and an object content key (OCK). The user ID corresponds to a unique user identifier associated with a user device and/or user of a distributed storage and task network (DSTN). The key fingerprint corresponds to a hash of a key, wherein the key is associated with a user and/or user device of the DSTN. The OCK includes a key that is utilized to decrypt a file associated with a corresponding source name field entry. The OCK may be encrypted with an access key that includes at least one of a public key associated with a user ID of a corresponding EACL field entry, a key retrieved from another directory file (e.g., a parent), and a stored key. The source name field 384 includes a source name entry of the directory file that includes a source name that is utilized to access the DSTN to retrieve one of a data file and another directory file. The source name may include one or more of a vault ID (e.g., a virtual storage container of a DSTN associated with one or more users of the DSTN), a vault generation ID (e.g., a sub-vault), and an object number (e.g., a random number assigned to a file stored in the DSTN).

For example, a data file pics.html is encrypted utilizing key 4 and stored in the DSTN at source name B673. Next, key 4 is encrypted utilizing a public key of user 10 to produce an OCK 4 corresponding to user 10 when user 10 is identified as authorized to access the data file pics.html, key 4 is encrypted utilizing a public key of user 7 to produce an OCK 4 corresponding to user 7 when user 7 is identified as authorized to access the data file pics.html, and key 4 is encrypted utilizing a public key of user 15 to produce an OCK 4 corresponding to user 15 when user 15 is identified as authorized to access the data file pics.html. A directory file entry is generated to include pics.html in the pathname field, three entries in the EACL field including user 10 and OCK4 for user 10, user 7 and OCK 4 for user 7, and user 15 and OCK 4 for user 15, and B673 in the source name field. The directory file entry is added to a directory file at source name B530. The directory file may be encrypted utilizing a key specified in a parent directory.

As another example, a directory file associated with a pathname of/papers/* is encrypted utilizing key 3 and stored in the DSTN at source name D7B9. Next, key 3 is encrypted utilizing a public key of user 15 to produce an OCK 3 corresponding to user 15 when user 15 is identified as authorized to access the directory file stored at source name D7B9. A directory file entry is generated to include/papers in the pathname field, an EACL field entry including user 15 and OCK 3 for user 15, and D7B9 in the source name field. The directory file entry is added to the directory file at source name B530. The directory file may be encrypted utilizing the key specified in the parent directory.

Figure 41B:
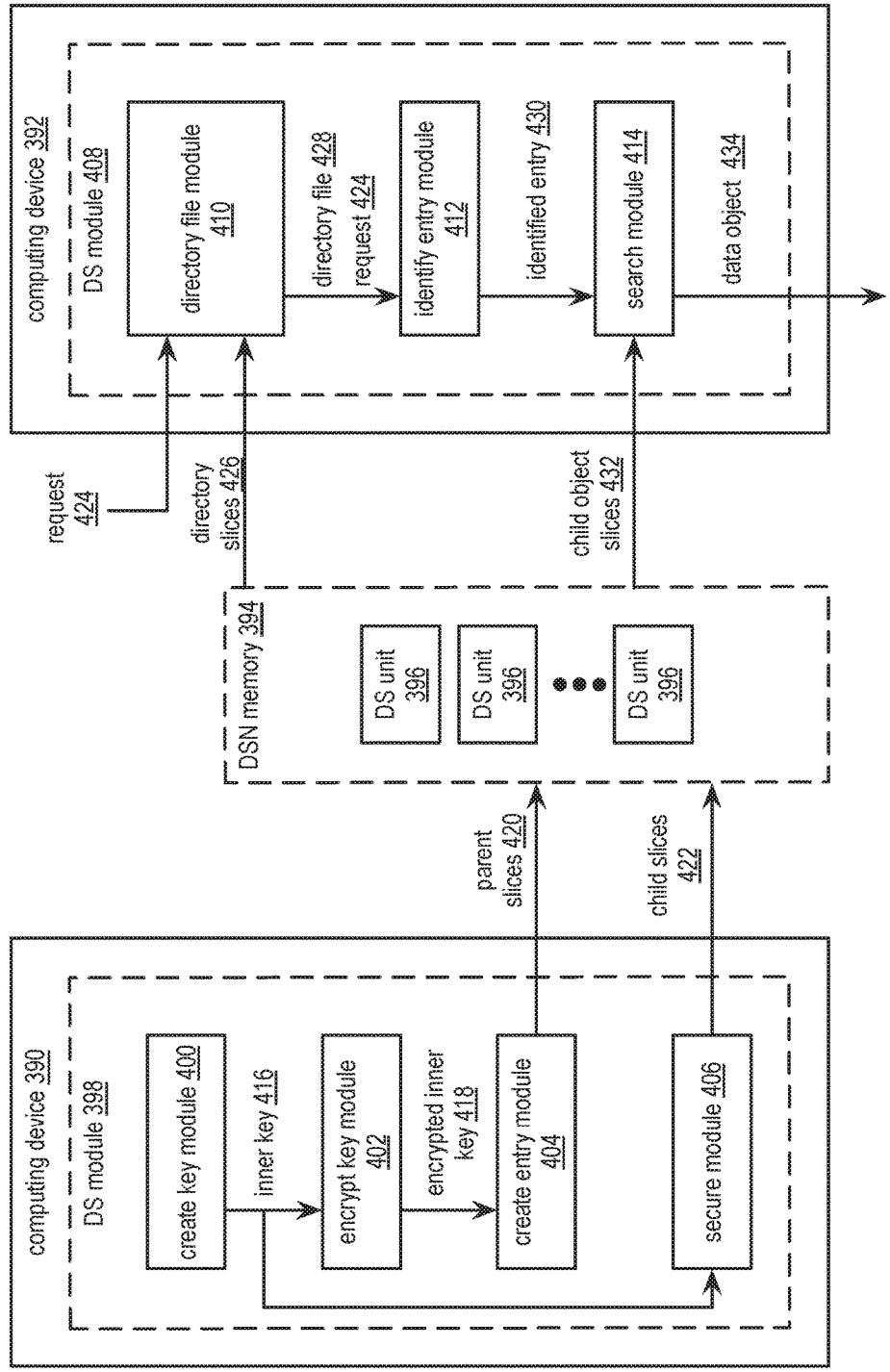
FIG. 41B is a schematic block diagram of a dispersed storage network (DSN) in accordance with the present invention.

FIG. 41B is a schematic block diagram of a dispersed storage network (DSN) that includes computing devices 390-392 and a dispersed storage network (DSN) memory 394. The DSN memory 394 may be implemented utilizing one or more of a distributed storage and task network (DSTN), a DSTN module, a plurality of storage nodes, and a plurality of dispersed storage (DS) units 396. When the DSN memory 394 is implemented using the plurality of DS units 396, the plurality of dispersed storage units 396 includes at least one set of DS units 396. Each DS unit 396 of the plurality of DS units 396 may be implemented utilizing at least one of a storage server, a storage unit, a storage module, a memory device, a memory, a distributed storage and task (DST) execution unit, a user device, a DST processing unit, and a DST processing module. The computing devices 390-392 may be implemented utilizing at least one of a server, a storage unit, a DSTN managing unit, a DSN managing unit, a DS unit 396, a storage server, a storage module, a DS processing unit, a DST execution unit, a user device, a DST processing unit, and a DST processing module. For example, computing device 392 is implemented as a DST processing unit when computing device 390 is implemented as a DSTN managing unit. The computing device 390 includes a dispersed storage (DS) module 398. The DS module 398 includes a create key module 400, an encrypt key module 402, a create entry module 404, and a secure module 406. The computing device 392 includes a DS module 408. The DS module 408 includes an obtain directory file module 410, an identify entry module 412, and a search module 414.

The system functions to generate a secure hierarchical file directory system and to access the secure hierarchical file directory system. The generating the secure hierarchical file directory system includes obtaining a key, encrypting the key to produce an encrypted key, creating an entry in the secure hierarchical file directory system using the encrypted key, and securing the secure hierarchical file directory system using the key. With regards to obtaining the key, the create key module 400, for a child level directory of the secure hierarchical file directory system, obtains a unique inner encryption key 416 for encrypting the child level directory. For example, the create key module 400 retrieves the unique inner encryption key 416 when the unique inner encryption key 416 was previously created for the child level directory. As another example, the create key module 400 generates the unique inner encryption key 416 (e.g., based on a random number) when the unique inner encryption key 416 was not previously created (e.g., the child level directory is new).

With regards to encrypting the key to produce the encrypted key, the encrypt key module 402 creates one or more outer encryption keys for encrypting the unique inner encryption key 416 based on an access security level for accessing the child level directory and for each of the one or more outer encryption keys, encrypts the unique inner encryption key 416 to create one or more encrypted inner encryption keys 418. The encrypt key module 402 functions to create the one or more outer encryption keys by at least one of a plurality of approaches. A first approach includes the encrypt key module 402 creating one of the one or more outer encryption keys based on a user identification code. A second approach includes the encrypt key module 402 creating the one of the one or more outer encryption keys based on a password associated with a user device or a group of user devices. A third approach includes the encrypt key module 402 creating the one of the one or more outer encryption keys based on a public key of a public/private key associated with the user device. The encrypt key module 402 further functions to create the one or more outer encryption keys by a series of creating steps. A first creating step includes the encrypt key module 402 determining the access security level to be one of each valid user device having an individual outer encryption key, a group of user devices having a common group outer encryption key, and valid user devices using a common outer encryption key. A second creating step includes the encrypt key module 402 creating the one or more outer encryption keys in accordance with access security level.

With regards to creating the entry in the secure hierarchical file directory system using the encrypted key, the create entry module 404 creates one or more entries in a parent level directory of the secure hierarchical file directory system. Each of the one or more entries includes a path name, a DSN address of the child level directory, a corresponding one of the one or more encrypted inner encryption keys 418, and an indicator for a corresponding one of the one or more outer encryption keys (e.g., a user identification code, a group identification code, etc). The create entry module 404 updates the parent level directory in the secure hierarchical file directory system by a series of updating steps. In a first updating step, the create entry module 404 encrypts the parent level directory using a unique inner encryption key associated with the parent level directory to produce an encrypted parent level directory. In a second updating step, the create entry module 404 dispersed storage error encodes the encrypted parent level directory to produce a set of parent directory encoded slices 420. In a third updating step, the create entry module 404 stores the set of parent directory encoded slices 420 in the DSN memory 394 in accordance with a DSN address for the parent level directory (e.g., issuing write slice requests to the DSN memory 394 that includes the set of parent directory encoded slices 420 and a set of slice names based on the DSN address for the parent level directory).

With regards to securing the secure hierarchical file directory system using the key, the secure module 406 functions to perform a series of steps. In a first step, the secure module 406 encrypts the child level directory using the unique inner encryption key 416 to produce an encrypted child level directory. In a second step, the secure module 406 dispersed storage error encodes the encrypted child level directory to produce a set of child directory encoded slices 422. In a third step, the secure module 406 stores the set of child directory encoded slices 422 in the DSN memory 394 in accordance with the DSN address (e.g., issuing write slice requests to the DSN memory 394 that includes the set of child directory encoded slices 422 and a set of slice names based on the DSN address for the child level directory).

The system may function to further generate more entries for the secure hierarchical file directory system. When generating more entries, the create key module 400, for a second child level directory of the secure hierarchical file directory system, obtains a second unique inner encryption key for encrypting the second child level directory. The encrypt key module 402 creates one or more second outer encryption keys for encrypting the second unique inner encryption key based on a second access security level for accessing the second child level directory and for each of the one or more second outer encryption keys, the encrypt key module 402 encrypts the second unique inner encryption key to create one or more second encrypted inner encryption keys. The create entry module 404 creates one or more new entries in the parent level directory of the secure hierarchical file directory system. Each of the one or more new entries includes a second path name, a second DSN address of the second child level directory, a corresponding one of the one or more second encrypted inner encryption keys, and a second indicator for a corresponding one of the one or more second outer encryption keys.

The accessing the secure hierarchical file directory system includes obtaining a directory file 428, identifying a directory entry, and using the identified directory entry to search the hierarchical file directory system to locate a desired data object 434 stored in the DSN memory 394. With regards to obtaining the directory file, the obtain directory file module 410 receives a request 424 (e.g., the request includes one or more of a data object identifier, a pathname, and a requesting entity identifier) to retrieve a data object stored in the DSN memory 394 and obtains the directory file 428 associated with the data object from the DSN memory 394. The directory file module 410 obtains the directory file 428 associated with the data object 434 from the DSN memory 394 by a series of obtaining steps. A first obtaining step includes the directory file module 410 identifying a DSN address of the directory file 428 based on the request 424 to retrieve the data object. For example, the directory file module 410 accesses a list of directory DSN addresses based on a requesting entity identifier of the request 424 to receive the data object. A second obtaining step includes the directory file module 410 retrieving at least a decode threshold number of encoded directory slices 426 from the DSN memory 394 utilizing the DSN address of the directory file 428. For example, the directory file module 410 issues a set of read slice requests to the DSN memory 394 that includes a set of slice names based on the DSN address of the directory file 428. A third obtaining step includes the directory file module 410 decoding the at least the decode threshold number of encoded directory slices 426 using a dispersed storage error coding function to produce an encrypted directory file. A fourth obtaining step includes the directory file module 410 decrypting the encrypted directory file to produce the directory file 428. The directory file module 410 may decrypt the encrypted directory file using a common key.

With regards to identifying the directory entry, the identify entry module 412 identifies a directory entry of the directory file 428 based on the request 424 to access the data object to produce an identified directory entry 430. The identify entry module 412 identifies the directory entry of the directory file 428 by comparing a pathname of the request 424 to retrieve the data object to one or more pathnames of the directory file 428 and identifying the directory entry associated with a favorably comparing pathname of the one or more pathnames of the directory file 428 to produce the identified directory entry 430.

With regards to using the identified directory entry 430 to search the hierarchical file directory system to locate the desired data object 434 stored in the DSN memory 394, the search module 414 performs a series of loop steps. In a first loop step, the search module 414 extracts a DSN address of an encrypted child object from the identified directory entry 430. In a second loop step, the search module 414 extracts an encrypted content key from the identified directory entry 430 based on a requesting entity identifier (ID) of the request 424 to access the data object. For example, the search module 414 extracts the encrypted content key that is associated with the requesting entity ID. In a third loop step, the search module 414 decrypts the encrypted content key utilizing an affinity key associated with the requesting entity ID to produce a content key. The affinity key includes at least one of a private key of a public-private key pair associated with the requesting entity ID, an access key obtained from a parent directory, a common group key associated with a group of requesting entity identifiers, where the group of requesting identifiers includes the requesting entity ID, and a stored key. In a fourth loop step, the search module 414 retrieves the encrypted child object from the DSN memory 394 using the DSN address of the child object. For example, the search module 414 issues a set of retrieve slice requests, receives at least a decode threshold number of child object slices 432, and decodes the decode threshold number of child object slices 432 to reproduce the encrypted child object.

In a fifth loop step to search the hierarchical file directory system to locate the desired data object 434, the search module 414 decrypts the encrypted child object using the content key to produce a child object. In a sixth loop step, the search module 414 determines whether the child object is the data object 434. For example, the search module 414 indicates that the child object is the data object 434 when the child object does not include another directory file. When the child object is the data object 434, the loop is exited. When the child object is not the data object 434, in a sixth loop step, the search module 414 identifies a next directory entry of the child object as the identified directory entry 430 and repeat the loop. The search module 414 identifies the next directory entry of the child object as the identified directory entry 430 by comparing a pathname of the request 424 to retrieve the data object to one or more pathnames of the child object and identifying the directory entry associated with a favorably comparing pathname of the one or more pathnames of the child object to produce the identified next directory entry.

FIG. 41C is a flowchart illustrating an example of generating a secure hierarchical file directory system. The method begins at step 440, for a child level directory of the secure hierarchical file directory system, where a processing module obtains (e.g., create a new key if new child level directory otherwise use a previously created key) a unique inner encryption key for encrypting the child level directory. The method continues at step 442 where the processing module creates one or more outer encryption keys for encrypting the unique inner encryption key based on an access security level for accessing the child level directory. The creating the one or more outer encryption keys includes at least one of a variety of creating approaches. A first creating approach includes creating one of the one or more outer encryption keys based on a user identification code. A second creating approach includes creating the one of the one or more outer encryption keys based on a password associated with a user device or a group of user devices. A third creating approach includes creating the one of the one or more outer encryption keys based on a public key of a public/private key associated with the user device. The creating the one or more outer encryption keys may further include a series of creating steps. A first creating step includes determining the access security level to be one of each valid user device having an individual outer encryption key, a group of user devices having a common group outer encryption key, and valid user devices using a common outer encryption key. A second creating step includes creating the one or more outer encryption keys in accordance with access security level.

The method continues at step 444, for each of the one or more outer encryption keys, where the processing module encrypts the unique inner encryption key to create one or more encrypted inner encryption keys. The method continues at step 446 where the processing module creates one or more entries in a parent level directory of the secure hierarchical file directory system, where each of the one or more entries includes a path name, a dispersed storage network (DSN) address of the child level directory, a corresponding one of the one or more encrypted inner encryption keys, and an indicator for a corresponding one of the one or more outer encryption keys.

The method continues at step 448 where the processing module encrypts the child level directory using the unique inner encryption key to produce an encrypted child level directory. The method continues at step 450 where the processing module dispersed storage error encodes the encrypted child level directory to produce a set of child directory encoded slices. The method continues at step 452 where the processing module stores the set of child directory encoded slices in a DSN memory in accordance with the DSN address. The method continues at step 454, for a second child level directory of the secure hierarchical file directory system, where the processing module obtains a second unique inner encryption key for encrypting the second child level directory. The method continues at step 456 where the processing module creates one or more second outer encryption keys for encrypting the second unique inner encryption key based on a second access security level for accessing the second child level directory.

The method continues at step 458, for each of the one or more second outer encryption keys, where the processing module encrypts the second unique inner encryption key to create one or more second encrypted inner encryption keys.

The method continues at step 460 where the processing module creates one or more new entries in the parent level directory of the secure hierarchical file directory system, wherein each of the one or more new entries includes a second path name, a second DSN address of the second child level directory, a corresponding one of the one or more second encrypted inner encryption keys, and a second indicator for a corresponding one of the one or more second outer encryption keys.

Figure 41D:
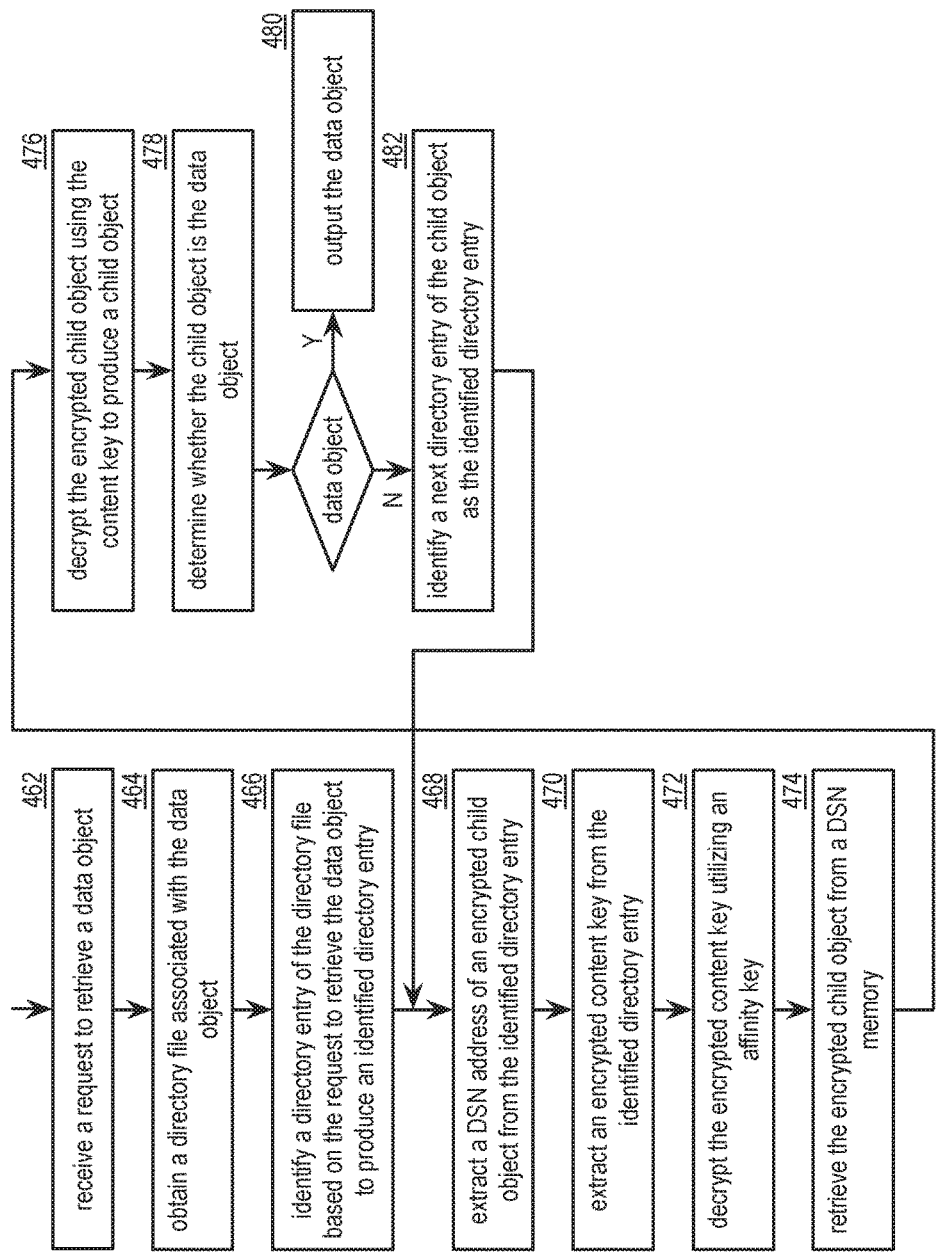
FIG. 41D is a flowchart illustrating an example of retrieving a data object in accordance with the present invention.

FIG. 41D is a flowchart illustrating an example of retrieving a data object. The method begins at step 462 where a processing module receives a request to retrieve a data object stored in a dispersed storage network (DSN) memory. The method continues at step 464 where the processing module obtains a directory file associated with the data object from the DSN memory. The obtaining the directory file associated with the data object from the DSN memory includes a series of obtaining steps. A first obtaining step includes identifying a DSN address of the directory file based on the request to retrieve the data object. For example, the processing module retrieves the DSN address from registry information associated with the data object. A second obtaining step includes retrieving at least a decode threshold number of encoded directory slices from the DSN memory utilizing the DSN address of the directory file. For example, the processing module issues a set of read slice requests to the DSN memory where the set of read slice requests includes a set of slice names based on the DSN address and receives the at least the decode threshold number of encoded directory slices from the DSN memory. A third obtaining step includes decoding the at least the decode threshold number of encoded directory slices using a dispersed storage error coding function to produce an encrypted directory file. A fourth obtaining step includes decrypting the encrypted directory file to produce the directory file. For example, the processing module decrypts the encrypted directory file using a common encryption key obtained from registry information associated with a secure hierarchical file directory system. Alternatively, the processing module may obtain the directory file from a local cache memory or retrieve a root directory file as the directory file where the root directory file is associated with the data object.

The method continues at step 466 where the processing module identifies a directory entry of the directory file based on the request to access the data object to produce an identified directory entry. The identifying the directory entry of the directory file includes comparing a pathname of the request to retrieve the data object to one or more pathnames of the directory file and identifying the directory entry associated with a favorably comparing pathname of the one or more pathnames of the directory file to produce the identified directory entry.

The method continues at step 468 where the processing module extracts a DSN address of an encrypted child object from the identified directory entry. The method continues at step 470 where the processing module extracts an encrypted content key from the identified directory entry based on a requesting entity identifier (ID) of the request to access the data object. For example, the processing module identifies the encrypted content key associated with the requesting entity ID associated with the request to retrieve the data object. As another example, the processing module identifies the encrypted content key associated with a group ID associated with the requesting entity ID.

The method continues at step 472 where the processing module decrypts the encrypted content key utilizing an affinity key associated with the requesting entity ID to produce a content key. The decrypting includes obtaining the affinity key. The obtaining includes at least one of generating the affinity key based on performing a deterministic function on the requesting entity ID, retrieving a private key of a public/private key pair associated with the requesting entity ID, and retrieving a common group key associated with the group ID that is associated with the requesting entity ID.

The method continues at step 474 where the processing module retrieves the encrypted child object from the DSN memory using the DSN address of the child object. For example, the processing module issues a set of read slice requests that includes a set of slice names based on the DSN address of the child object, receives at least a decode threshold number of encoded child object slices, and decodes the at least the decode threshold number of encoded child object slices to produce the encrypted child object. The method continues at step 476 where the processing module decrypts the encrypted child object using the content key to produce a child object.

The method continues at step 478 where the processing module determines whether the child object is the data object. For example, the processing module indicates that the child object is not the data object when the child object includes another directory file. The method branches to step 482 when the processing module determines that the child object is not the data object. The method continues to step 480 when the processing module determines that the child object is the data object. The method continues at step 480 where the processing module outputs the data object to the requesting entity (e.g., exiting the loop). When the processing module determines that the child object is not the data object, the method continues at step 482 where the processing module identifies a next directory entry of the child object as the identified directory entry. The method loops back to step 468 to repeat the loop. The identifying the next directory entry of the child object as the identified directory entry includes comparing a pathname of the request to retrieve the data object to one or more pathnames of the child object and identifying the directory entry associated with a favorably comparing pathname of the one or more pathnames of the child object to produce the identified next directory entry.

Figure 42:
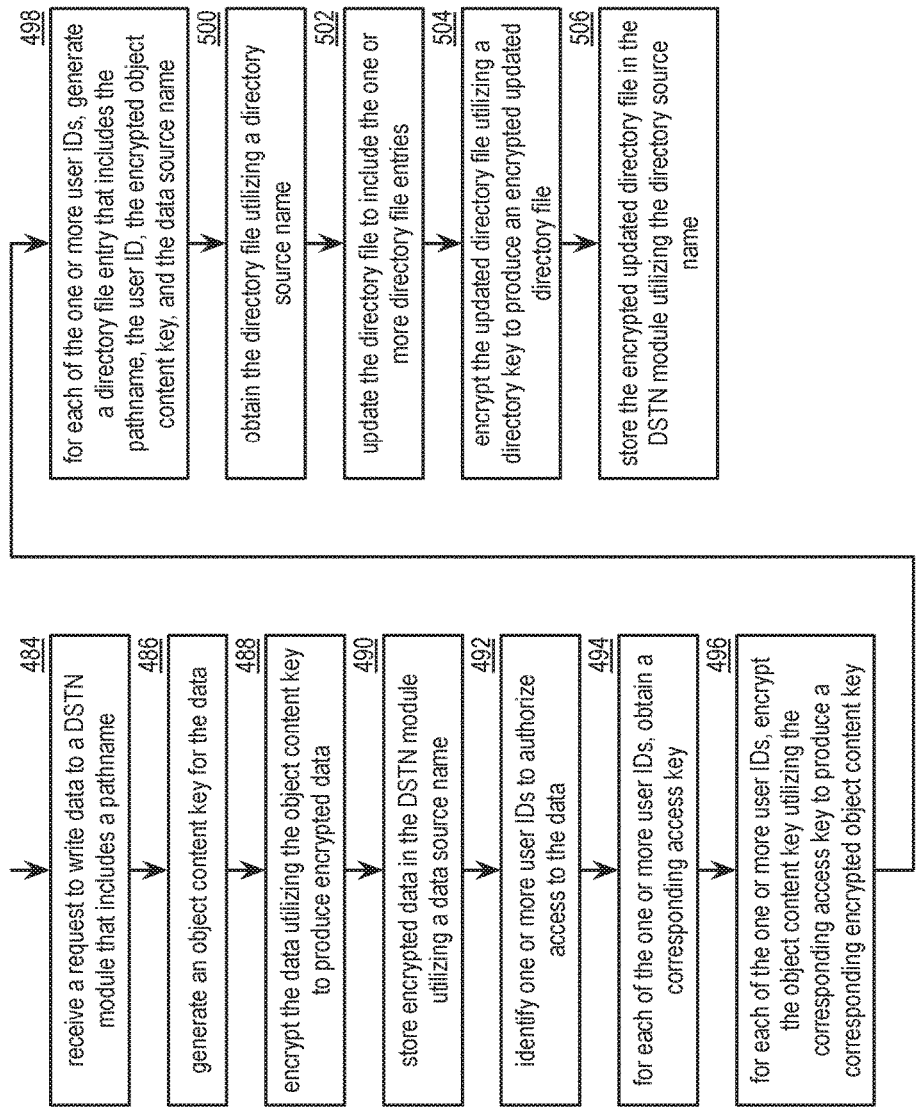
FIG. 42 is a flowchart illustrating an example of storing data in accordance with the present invention.

FIG. 42 is a flowchart illustrating an example of storing data. The method begins at step 484 where a processing module (e.g., of a distributed storage and task (DST) client module) receives a request to write data to a distributed storage and task network (DSTN) module, where the request includes a pathname. The request may include one or more of the pathname, a user identifier (ID), a user device ID, a list of authorized user IDs, a source name, and a filename. The method continues at step 486 where the processing module generates an object content key for the data. The generating may be based on one or more of a key generation policy, identifying an available key, retrieving a key seed, a random number, and generating a random key. The method continues at step 488 where the processing module encrypts the data utilizing the object content key to produce encrypted data.

The method continues at step 490 where the processing module stores the encrypted data in the DSTN module. The storing includes one or more of obtaining a data source name (e.g., assigning a new source name based on a vault ID associated with a user ID of the request), encoding the encrypted data utilizing a dispersed storage error coding function to produce a plurality of sets of encoded data slices, generating a plurality of sets of slice names based on the source name and a pillar width number, generating a plurality of sets of write slice requests that includes the plurality of sets of encoded data slices and the plurality of sets of slice names, and sending the plurality of sets of write slice requests to the DSTN module.

The method continues at step 492 where the processing module identifies one or more user IDs to authorize access to the data. The identifying may be based on one or more of a request, a lookup, a predetermination, a user request, a vault list of user IDs, and receiving the one or more user IDs. The method continues at step 494 where the processing module, for each of the one or more user IDs, obtains a corresponding access key. The obtaining includes at least one of retrieving a public key associated with the user ID, retrieving a private key associated with the user ID, retrieving a common access key, generating the access key, and retrieving an access key from a parent directory. The method continues at step 496 where the processing module, for each of the one or more user IDs, encrypts the object content key utilizing the corresponding access key to produce a corresponding encrypted object content key.

The method continues at step 498 where the processing module, for each of the one or more user IDs, generates a directory file entry that includes the pathname, the user ID, a key fingerprint, the encrypted object content key, and the data source name. The method continues at step 500 where the processing module obtains the directory file utilizing a directory source name. The obtaining may include one or more of obtaining the directory source name (e.g., receive, lookup), generating read slice requests utilizing the directory source name, sending the read slice requests to the DSTN module, receiving slices, decoding the slices utilizing the dispersed storage error coding function to produce a plurality of data segments, aggregating the data segments to reproduce an encrypted directory file, and decrypting the encrypted directory file utilizing a directory key (e.g., a key from a parent directory file) to reproduce the directory file.

The method continues at step 502 where the processing module updates the directory file to include the one or more directory file entries. The method continues at step 504 where the processing module encrypts the updated directory file utilizing the directory key to produce an encrypted updated directory file. The method continues at step 506 where the processing module stores the encrypted updated directory file in the DSTN module utilizing the directory source name (e.g., generate slices, generate write requests utilizing the directory source name, store the slices in the DSTN module).

Figure 43:
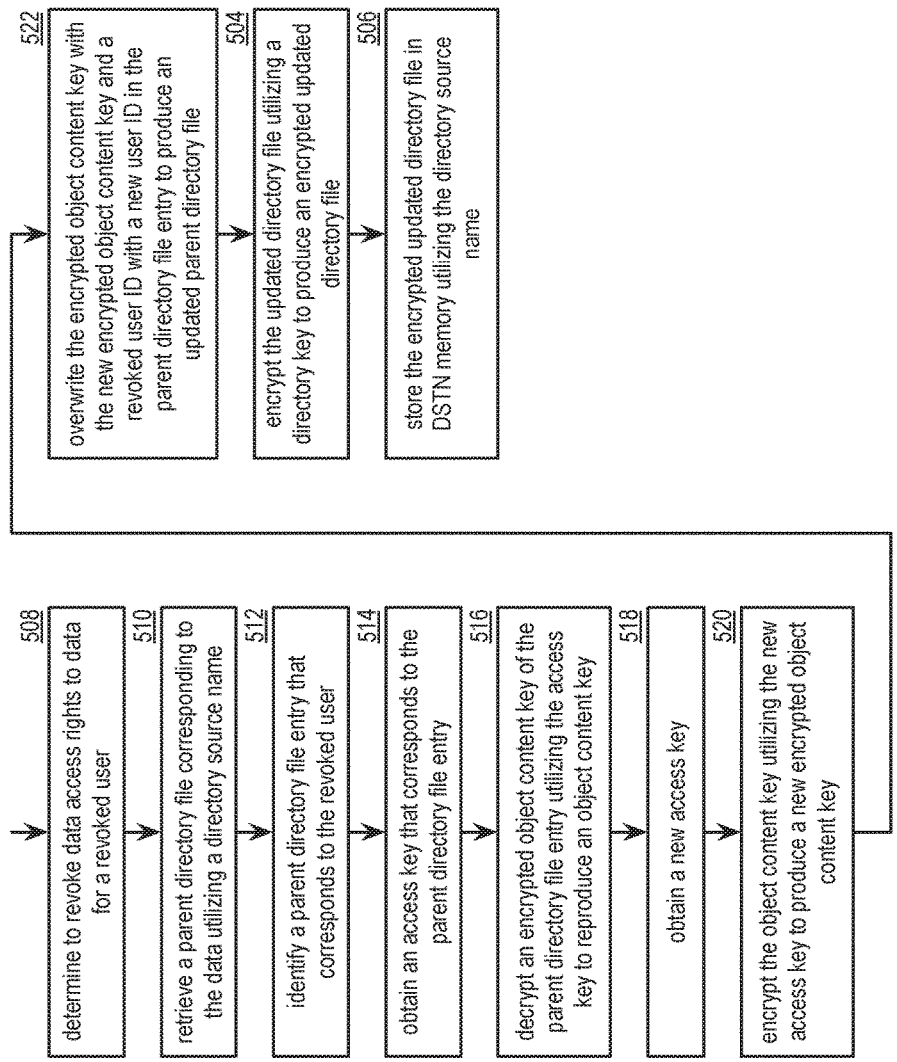
FIG. 43 is a flowchart illustrating an example of revoking data access rights in accordance with the present invention.

FIG. 43 is a flowchart illustrating an example of revoking data access rights, which include similar steps to FIG. 42. The method begins at step 508 where a processing module (e.g., of a distributed storage and task (DST) client module) determines to revoke data access rights to data for a revoked user. The determination may be based on one or more of a user input, receiving an error message, and receiving a revoke request. The method continues at step 510 where the processing module retrieves a parent directory file corresponding to the data utilizing a directory source name. The retrieving includes one or more of obtaining the directory source name (e.g., lookup, retrieving), generating read slice requests utilizing the directory source name, sending the read slice requests to a distributed task and storage network (DSTN) module, receiving slices, decoding the slices utilizing a dispersed storage error coding function to reproduce a plurality of data segments, aggregating the data segments to reproduce an encrypted parent directory file, decrypting the encrypted parent directory file utilizing a parent directory key (e.g., received, from a lookup, from another parent directory) to produce the parent directory file.

The method continues at step 512 where the processing module identifies a parent directory file entry that corresponds to the revoked user. The identifying includes one or more of matching a revoked user identifier (ID) to a user ID entry of the parent directory file entry and matching a data ID of the data to revoke access rights to a pathname entry of the parent directory file entry. The method continues at step 514 where the processing module obtains an access key that corresponds to the parent record file entry. The obtaining includes at least one of retrieving a public key associated with the revoked user, retrieving a common access key, and retrieving the access key from the other parent directory. The method continues at step 516 where the processing module decrypts an encrypted object content key of the parent directory file entry utilizing the access key to reproduce an object content key.

The method continues at step 518 where the processing module obtains a new access key. The obtaining includes at least one of retrieving a public key of an initiating user, generating a random key, retrieving a common access key from a parent record, and retrieving a common access key. The method continues at step 520 where the processing module encrypts the object content key utilizing the new access key to produce a new encrypted object content key. The method continues at step 522 where the processing module overwrites the encrypted object content key with the new encrypted object content key and overwrites a revoked user ID with a new user ID in the parent record file entry to produce an updated parent directory file. As such, the revoked user cannot subsequently access the data. The method continues with steps 504 and 506 of FIG. 42 where the processing module encrypts the updated directory file utilizing a directory key to produce an encrypted updated directory file and stores the encrypted updated directory file in the DSTN module.

Figures 44A, 44B:
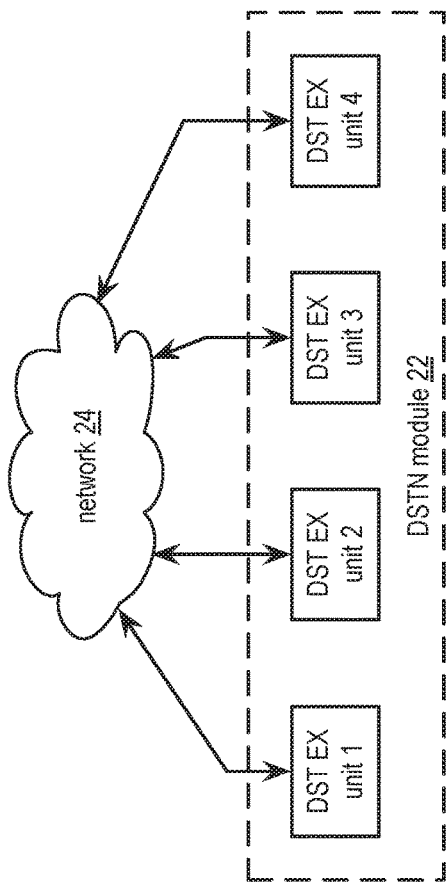
FIG. 44A is a schematic block diagram of a DSTN module in accordance with the present invention.
FIG. 44B is a diagram of an example of a scan cycle table set in accordance with the present invention.

FIG. 44A is a schematic block diagram of a distributed storage and task network (DSTN) module 22 that includes a set of distributed storage and task (DST) execution units 1-4. Alternatively, a dispersed storage network (DSN) may include a set of dispersed storage (DS) units 1-4. The DST execution units 1-4 are operably coupled with each other via a network 24. The DS units 1-4 may henceforth be interchangeably referred to as DST execution units 1-4. As such, the set of DST execution units 1-4 may form a DST execution unit storage set to store a plurality of sets of encoded data slices when a pillar width is 4.

The plurality of sets of encoded data slices is associated with a plurality of sets of slice names since each encoded data slice is associated with a unique slice name. Each DST execution unit of the set of DST execution units 1-4 is associated with a range of slice names such that encoded data slices that are stored in the DST execution unit are associated with a slice name within the range of slice names. As such, encoded data slices may be stored in the DST execution unit storage set that are associated with slice names of a pillar width number of slice name ranges. For example, a data segment is encoded utilizing a dispersed storage error coding function to produce a set of four encoded data slices 1-4. A set of four slice names 10, 1010, 2010, and 3010 are associated with the four encoded data slices 1-4. Encoded data slice 1 is stored at slice name address 10 in DST execution unit 1, encoded data slice 2 is stored at slice name address 1010 in DST execution unit 2, encoded data slice 3 is stored at slice name address 2010 in DST execution unit 3, and encoded data slice 4 is stored at slice name address 3010 in DST execution unit 4.

From time to time, one of more of the DST execution units may determine whether slice errors (e.g., a missing slice, a corrupted slice) exist for one or more of the plurality of sets of encoded data slices. The determining may be based on initiating one of more slice error tests (e.g., integrity tests) in one or more scan cycles for encoded data slices of the DST execution unit storage set. For example, a set of slice error tests may be performed for a set of encoded data slices in a first scan cycle of the one or more slice error tests and a second set of slice error tests may be performed for a second set of encoded data slices in a second scan cycle of the one or more slice error tests, etc.

A DST execution unit may be associated with a responsibility to perform one or more slice error tests associated with a scan cycle on a source name range that includes corresponding slice name ranges associated with each DST execution unit of the DST execution unit storage set. For example, DST execution unit 1 performs slice error tests in a first scan cycle on encoded data slices stored in each DST execution unit of the DST execution unit storage set associated with 1000 data segments. From time to time, responsibility to perform one or more slice error tests on a common set of encoded data slices may change from a DST execution unit to another DST execution unit. For example, DST execution unit 2 performs slice error tests in a second scan cycle on the encoded data slices stored in each DST execution unit of the DST execution unit storage set associated with the 1000 data segments that were previously scanned by DST execution unit 1 in the first scan cycle.

FIG. 44B is a diagram of an example of a scan cycle table that includes a plurality of scan cycle tables 1, 2, etc., where each scan cycle table includes one or more scan cycle table entries and where each scan cycle table entry includes a distributed storage and task (DST) execution unit identifier (ID) field 530, a storage address range field 532, and an error scan address range field 534. The DST execution unit ID field 530 includes an ID entry of a DST execution unit of the scan cycle table entry, where the DST execution unit is associated with a DST execution unit storage set of the scan cycle table. The storage address range field 532 includes an address range entry of a slice name range associated with the DST execution unit, where the DST execution unit stores encoded data slices associated with the slice name range. For example, DST execution unit 1 stores encoded data slices associated with slice names in a storage address range of 0-999, DST execution unit 2 stores encoded data slices associated with slice names in a storage address range of 1000-1999, DST execution unit 3 stores encoded data slices associated with slice names in a storage address range of 2000-2999, and DST execution unit 4 stores encoded data slices associated with slice names in a storage address range of 3000-3999.

The error scan address range field 534 includes an entry that includes a set of address ranges that the DST execution unit is responsible for scanning for slice errors during a scan cycle associated with the scan cycle table. As such, each scan cycle table lists error scan address ranges that each DST execution unit is responsible for scanning for slice errors. During a scan cycle, slices stored within a DST execution unit may be scanned for slice errors by the DST execution unit and any of the other DST execution units of the DST execution unit storage set. For example, in a first scan cycle as indicated by scan cycle table 1, DST execution unit 1 is responsible for scanning potential slice errors associated with slice names 0-249 (e.g., stored in DST EX unit 1), 1000-1249 (e.g., stored in DST EX unit 2), 2000-2249 (e.g., stored in DST EX unit 3), and 3000-3249 (e.g., stored in DST EX unit 4) and DST execution unit 2 is responsible for scanning potential slice errors associated with slice names 250-449 (e.g., stored in DST EX unit 1), 1250-1499 (e.g., stored in DST EX unit 2), 2250-2499 (e.g., stored in DST EX unit 3), and 3250-3499 (e.g., stored in DST EX unit 4), etc. Such responsibilities may change from scan cycle to scan cycle as indicated by changes in corresponding scan cycle tables. For example, in a second scan cycle as indicated by scan cycle table 2, DST execution unit 1 is now responsible for scanning potential slice errors that were the responsibility of DST execution unit 2 in the first scan cycle. A scanning sequence may be in error when a DST execution unit is maliciously scanning for slice errors in address ranges that are not assigned to the DST execution unit.

Figure 44C:
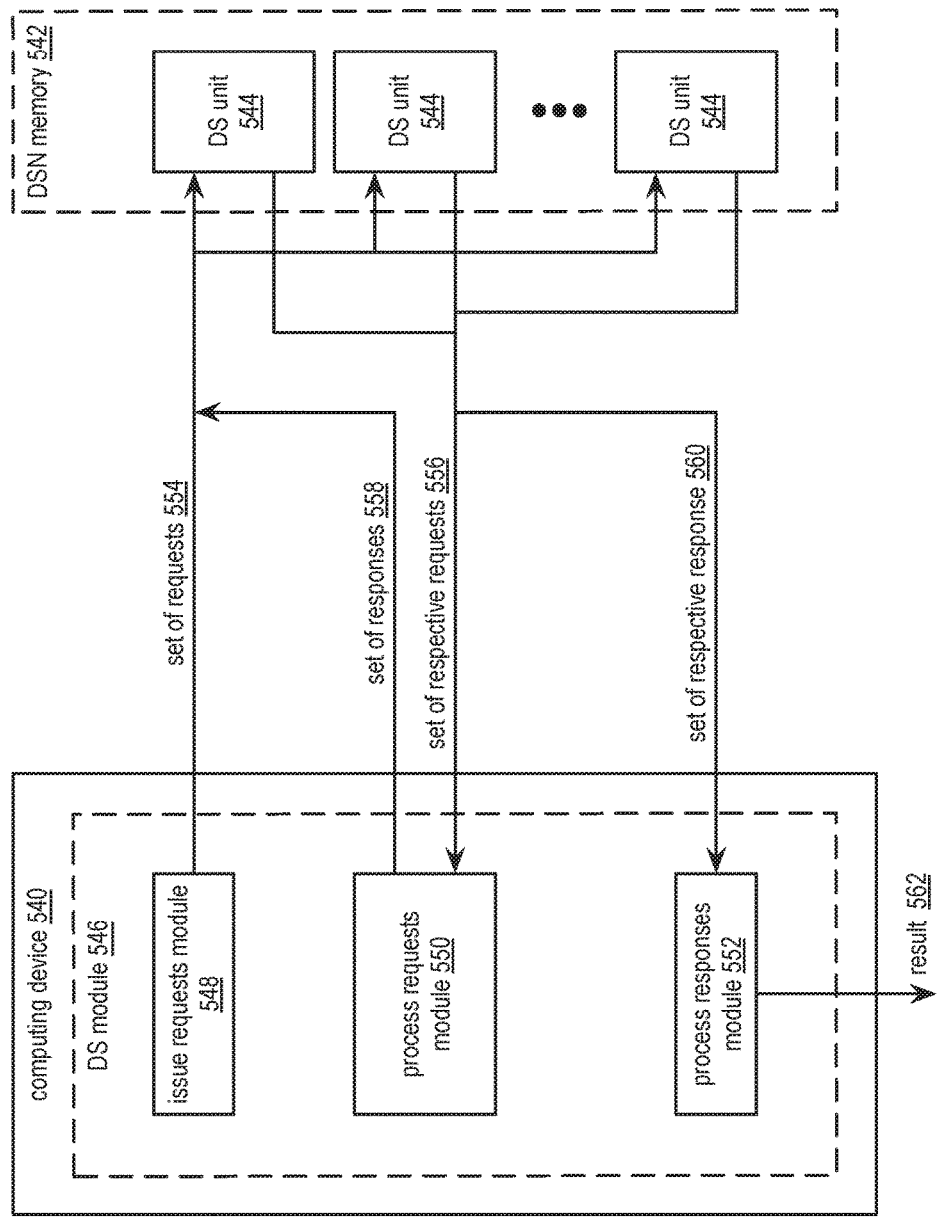
FIG. 44C is a schematic block diagram of another dispersed storage network (DSN) in accordance with the present invention.

FIG. 44C is a schematic block diagram of another dispersed storage network (DSN) that includes a computing device 540 and a dispersed storage network (DSN) memory 542. The DSN memory 542 includes a set of distributed storage (DS) units 544. Each DS unit 544 of the set of DS units 544 may be implemented utilizing one or more of a storage node, a dispersed storage unit, a distributed storage and task (DST) execution unit, a storage server, a storage unit, a storage module, a memory device, a memory, a user device, a DST processing unit, and a DST processing module. The computing device 540 may be implemented utilizing at least one of a server, a computer, and a DS unit. At least one DS unit 544 of the set of DS units 544 may include the computing device 540. For example, the computing device 540 is implemented as a first DS unit 544 of the set of DS units 544. The computing device 540 includes a distributed storage (DS) module 546. The DS module 546 includes an issue requests module 548, a process requests module 550, and a process responses module 552.

The system functions to transmit requests between DS units 544 of the set of DS units 544 to request responses regarding data elements, issue responses for the requests, and process the responses. With regards to the transmitting of the requests, the issue requests module 548 transmits a set of requests 554 to each other DS unit 544 of the set of DS units 544. A request (e.g., a list slice names request, a calculate digest of a slice name list request, a write slice request, a read slice request, a delete slice request, a partial task execution request) of the set of requests 554 includes requesting a response (e.g., the slice name list, the digest of the slice name list, a write slice acknowledgement, a read slice, a delete slice acknowledgement, a partial result) regarding a respective data element (e.g., a stored encoded data slice, a slice name) of a set of data elements from a respective one of the other DS units 544 when the computing device 540 is implemented as part of a DS unit of the set of DS units 544. Collectively, the set of DS units contains a plurality of sets of data elements (e.g., a plurality of sets of encoded data slices).

The set of requests 554 are generated in accordance with a current distributed task/data responsibility allocation period. The current distributed task/data responsibility allocation period includes at least one of a time varying allocation of tasks among the set of DS units, a time varying allocation of data elements to process (e.g., which data elements to process and/or which DS units to process which data elements), a time varying allocation of permissible requests (e.g., time dependent request for certain tasks and/or access to certain data elements), and a time varying allocation of permissible responses (e.g., time dependent available data elements at receiving DS unit, time dependent functions that can be performed on the data elements, etc.). For example, the current distributed task/data responsibility allocation period includes error scan address ranges for the DS units 544 in accordance with a first scan cycle period.

With regards to issuing responses for the requests, the process requests module 550 performs a series of steps. In a first step, the process requests module 550 receives a respective request from each of the other DS units 544 to produce a set of respective requests 556. When each of the set of respective requests 556 is in accordance with the current distributed task/data responsibility allocation period, in a second step, the process requests module 550 generates a response to each respective request of the set of respective requests 556 to produce a set of responses 558. In a third step, the process requests module 550 sends the set of responses 558 to the other DS units 544.

When one of the set of respective requests 556 is not in accordance with the current distributed task/data responsibility allocation period, the process requests module 550 indicates as potentially compromised, a respective one of the other DS units 544 corresponding to the one of the set of respective requests 556 not in accordance with the current distributed task/data responsibility allocation period. The process requests module 550 determines that the one of the set of respective requests is not in accordance with the current distributed task/data responsibility allocation period by a variety of approaches. In a first approach, the process requests module 550 determines that the one of the set of respective requests is not in accordance with the current distributed task/data responsibility allocation period when the one of the other DS units corresponding to the one of the set of respective requests 556 is not an anticipated requesting DS unit in accordance with the current distributed task/data responsibility allocation period (e.g., improper requester). For example, the one of the other DS units is requesting a slice name list for a DSN range assigned to another DS unit.

In a second approach of the variety of approaches, the process requests module 550 determines that the one of the set of respective requests is not in accordance with the current distributed task/data responsibility allocation period when the one of the set of respective requests 556 is not an anticipated request in accordance with the current distributed task/data responsibility allocation period (e.g., improper request). For example, the one of the other DS units is requesting another slice name list for another DSN range that is to be analyzed during another distributed task/data responsibility allocation period. In a third approach, the process requests module 550 determines that the one of the set of respective requests 556 is not in accordance with the current distributed task/data responsibility allocation period when the one of the set of respective requests is a second request by the one of the other DS units (e.g., multiple requests from same requester).

With regards to processing the responses, the process responses module 552 performs a series of steps. In a first step, the process responses module 552 receives a respective response from each of the sets of responses 558 from the other DS units 544 such that each DS unit 544 receives a set of respective responses 560 from the other DS units 544. When the set of respective responses 560 is in accordance with the current distributed task/data responsibility allocation period, the process responses module 552 processes the set of respective responses 560 in accordance with the current distributed task/data responsibility allocation period to produce one (e.g., result 562) of a set of results such that the set of DS units 544 produces the set of results regarding a plurality of sets of data elements.

The process responses module 552 processes the set of respective responses 560 by at least one of a variety of processing approaches. A first processing approach includes the process responses module 552 performing an integrity check on data elements associated with the set of respective responses 560 to produce the one 562 of the set of results, where the set of results provides an integrity indication for the plurality of sets of data elements. For example, the process responses module 552 compares a set of slice name lists when the data elements includes encoded data slices. As another example, the process responses module 552 compares a set of slice names list digests.

A second processing approach includes the process responses module 552 verifying a read request based on the data elements associated with the set of respective responses to produce the one 562 of the set of results, where the set of results provides a validity indication for a read operation regarding the plurality of sets of data elements. For example, the process responses module 552 indicates validity for the read operation when at least a decode threshold number of the set of respective responses 560 indicates that a valid encoded data slice has been retrieved.

A third processing approach of the variety of processing approaches includes the process responses module 552 verifying a write request based on the data elements associated with the set of respective responses 560 to produce the one 562 of the set of results, where the set of results provides a validity indication for a write operation regarding the plurality of sets of data elements. For example, the process responses module 552 indicates validity for the write operation when at least a write threshold number of the set of respective responses indicates that a corresponding encoded data slice has been successfully stored.

When one of the set of respective responses 560 is not in accordance with the current distributed task/data responsibility allocation period, the process responses module 552 indicates as potentially compromised, a respective one of the other DS units 544 corresponding to the one of the set of respective responses 560 not in accordance with the current distributed task/data responsibility allocation period. The process responses module 552 determines that the one of the set of respective responses 560 is not in accordance with the current distributed task/data responsibility allocation period by a variety of determining approaches. In a first determining approach, the process responses module 552 determines that the one of the set of respective responses 560 is not in accordance with the current distributed task/data responsibility allocation period when the one of the other DS units corresponding to the one of the set of respective responses 560 is not an anticipated responding DS unit in accordance with the current distributed task/data responsibility allocation period (e.g., improper requester). In a second determining approach, the process responses module 552 determines that the one of the set of respective responses 560 is not in accordance with the current distributed task/data responsibility allocation period when the one of the set of respective responses 560 is not an anticipated response in accordance with the current distributed task/data responsibility allocation period (e.g., improper response). In a third determining approach, the process responses module 552 determines that the one of the set of respective responses 560 is not in accordance with the current distributed task/data responsibility allocation period when the one of the set of respective responses 560 is a second response by the one of the other DS units (e.g., multiple responses from same requester).

Figure 44D:
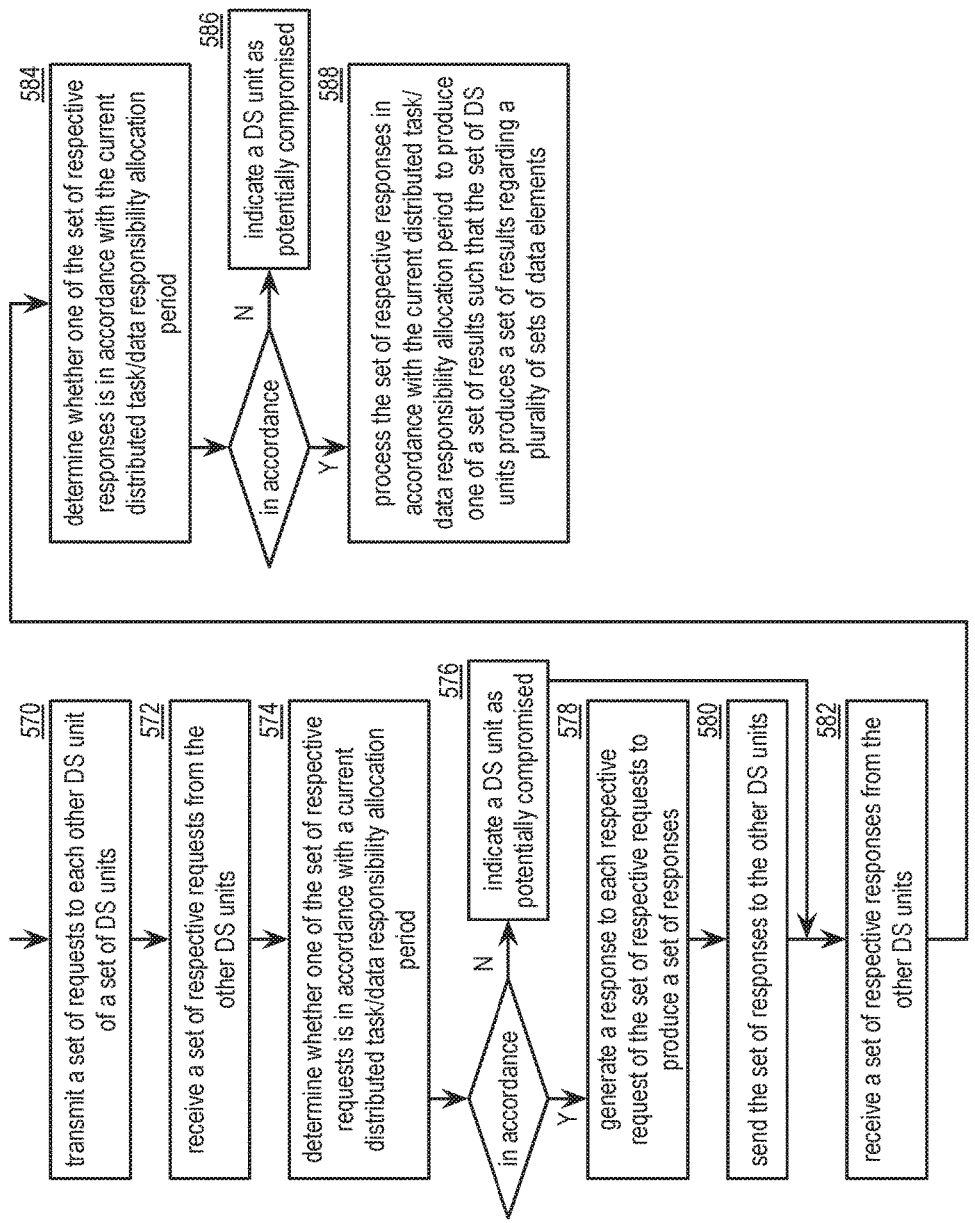
FIG. 44D is a flowchart illustrating an example of distributed task processing in accordance with the present invention.

FIG. 44D is a flowchart illustrating an example of distributed task processing. The method begins at step 570 where a processing module of each distributed storage (DS) unit of a set of DS units transmits a set of requests to each other DS unit of the set of DS units, where a request of the set of requests includes requesting a response regarding a respective data element of a set of data elements from a respective one of the other DS units. The set of requests are generated in accordance with a current distributed task/data responsibility allocation period, where, collectively, the set of DS units contains a plurality of sets of data elements. The current distributed task/data responsibility allocation period includes at least one of a time varying allocation of tasks among the set of DS units, a time varying allocation of data elements to process (e.g., what data elements to process and/or which DS units to process which data elements), a time varying allocation of permissible requests, and (e.g., time dependent request for certain tasks and/or access to certain data elements) a time varying allocation of permissible responses (e.g., time dependent available data elements at receiving DS unit, time dependent functions that can be performed on the data elements, etc.).

The method continues at step 572 where the processing module receives a respective request from each of the other DS units such that each DS unit receives a set of respective requests from the other DS units. The method continues at step 574 where the processing module determines whether the one of the set of respective requests is in accordance with the current distributed task/data responsibility allocation period by at least one of a variety of determining approaches. A first determining approach includes the processing module determining that the one of the set of respective requests is not in accordance with the current distributed task/data responsibility allocation period when the one of the other DS units corresponding to the one of the set of respective requests is not an anticipated requesting DS unit in accordance with the current distributed task/data responsibility allocation period (e.g., wrong requester). A second determining approach includes the processing module determining that the one of the set of respective requests is not in accordance with the current distributed task/data responsibility allocation period when the one of the set of respective requests is not an anticipated request in accordance with the current distributed task/data responsibility allocation period (e.g., wrong request). A third determining approach includes the processing module determining that the one of the set of respective requests is not in accordance with the current distributed task/data responsibility allocation period when the one of the set of respective requests is a second request by the one of the other DS units (e.g., multiple requests from same requester). The method branches to step 578 when each of the set of respective requests is in accordance with the current distributed task/ data responsibility allocation period. The method continues to step 576 when the one of the set of respective requests is not in accordance with the current distributed task/data responsibility allocation period.

When the one of the set of respective requests is not in accordance with the current distributed task/data responsibility allocation period, the method continues at step 576 where the processing module indicates, as potentially compromised, a respective one of the other DS units corresponding to the one of the set of respective requests not in accordance with the current distributed task/data responsibility allocation period. The method branches to step 582.

When each of the set of respective requests is in accordance with the current distributed task/data responsibility allocation period, the method continues at step 578 where the processing module generates a response to each respective request of the set of respective requests to produce a set of responses. The method continues at step 580 where the processing module sends the set of responses to the other DS units.

The method continues at step 582 where the processing module receives a respective response from each of the sets of responses from the other DS units such that each DS unit receives a set of respective responses from the other DS units. The method continues at step 584 where the processing module determines whether the one of the set of respective responses is in accordance with the current distributed task/data responsibility allocation period by at least one of a variety of approaches. A first approach includes the processing module determining that the one of the set of respective responses is not in accordance with the current distributed task/data responsibility allocation period when the one of the other DS units corresponding to the one of the set of respective responses is not an anticipated responding DS unit in accordance with the current distributed task/data responsibility allocation period (e.g., wrong requester). A second approach includes the processing module determining that the one of the set of respective responses is not in accordance with the current distributed task/data responsibility allocation period when the one of the set of respective responses is not an anticipated response in accordance with the current distributed task/data responsibility allocation period (e.g., wrong response).

A third approach of the variety of approaches includes the processing module determining that the one of the set of respective responses is not in accordance with the current distributed task/data responsibility allocation period when the one of the set of respective responses is a second response by the one of the other DS units (e.g., multiple responses from same requester). The method branches to step 588 when the set of respective response is in accordance with the current distributed task/data responsibility allocation period. The method continues to step 586 when the one of the set of respective requests is not in accordance with the current distributed task/data responsibility allocation period.

When the one of the set of respective responses is not in accordance with the current distributed task/data responsibility allocation period, the method continues at step 586 where the processing module indicates, as potentially compromised, a respective one of the other DS units corresponding to the one of the set of respective responses not in accordance with the current distributed task/data responsibility allocation period. When the set of respective responses is in accordance with the current distributed task/data responsibility allocation period, the method continues at step 588 where the processing module processes the set of respective responses in accordance with the current distributed task/data responsibility allocation period to produce one of a set of results such that the set of DS units produces the set of results regarding a plurality of sets of data elements.

The processing the set of respective responses includes at least one of a variety of processing steps. A first processing step includes the processing module performing an integrity check on data elements associated with the set of respective responses to produce the one of the set of results, wherein the set of results provides an integrity indication for the plurality of sets of data elements (e.g., list slice name, slice name list digest). A second processing step includes the processing module verifying a read request based on the data elements associated with the set of respective responses to produce the one of the set of results, where the set of results provides a validity indication for a read operation regarding the plurality of sets of data elements. A third processing step includes the processing module verifying a write request based on the data elements associated with the set of respective responses to produce the one of the set of results, wherein the set of results provides a validity indication for a write operation regarding the plurality of sets of data elements.

Figure 44E:
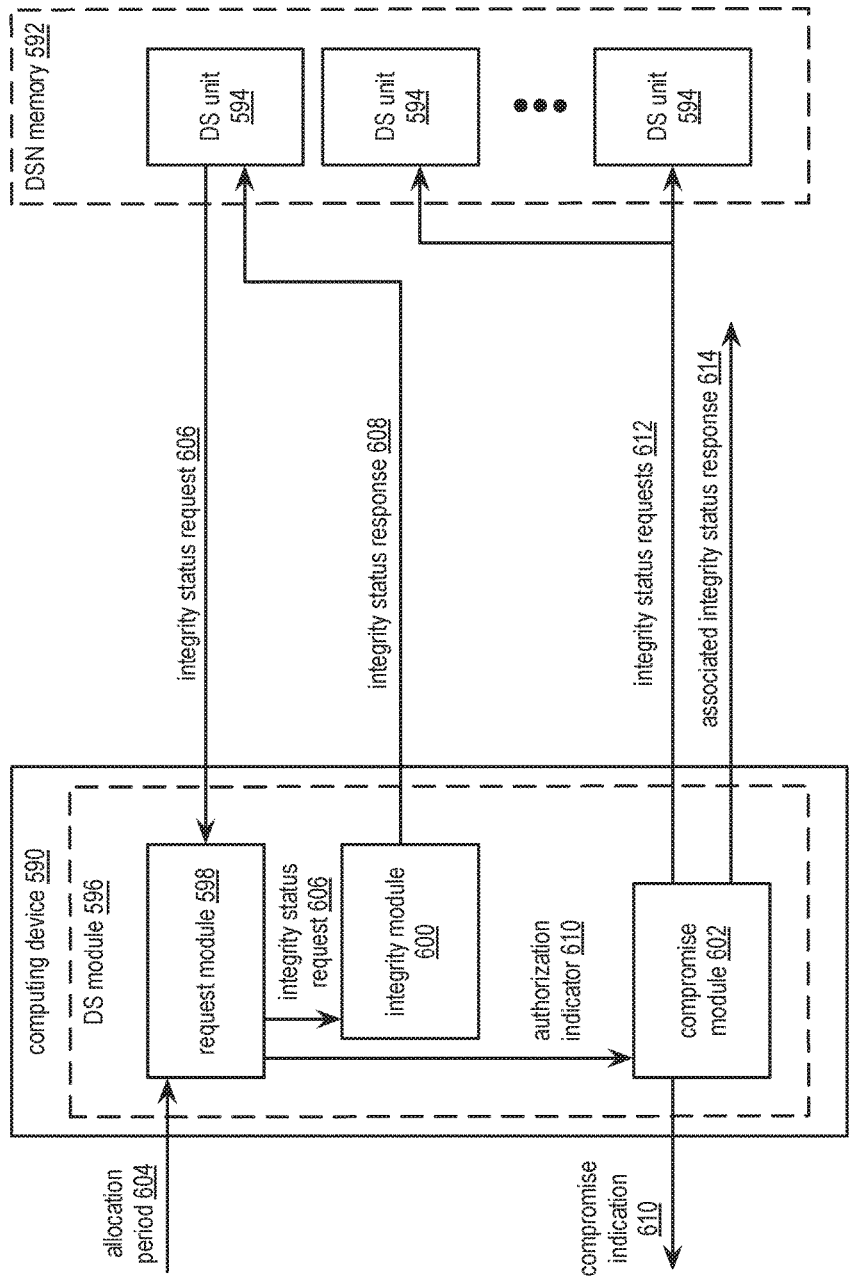
FIG. 44E is a schematic block diagram of another dispersed storage network (DSN) in accordance with the present invention.

FIG. 44E is a schematic block diagram of another dispersed storage network (DSN) that includes a computing device 590 and a dispersed storage network (DSN) memory 592. The DSN memory 592 includes a set of dispersed storage (DS) units 594. Each DS unit 594 of the set of DS units 594 may be implemented utilizing one or more of a storage node, a dispersed storage unit, a distributed storage and task (DST) execution unit, a storage server, a storage unit, a storage module, a memory device, a memory, a user device, a DST processing unit, and a DST processing module. The computing device 590 may be implemented utilizing at least one of a server, a computer, and a DS unit. At least one DS unit 594 of the set of DS units 594 may include the computing device 590. For example, the computing device 590 is implemented as a first DS unit 594 of the set of DS units 594. The computing device 590 includes a dispersed storage (DS) module 596. The DS module 596 includes a request module 598, and integrity module 600, and a compromise module 602.

The system functions to obtain a current authorized data integrity verification allocation period 604, process an encoded data slice integrity status request 606, generate an encoded data slice integrity status response 608, and outputs a compromise indication 610 to indicate a compromised DS unit. With regards to obtaining the current authorized data integrity verification allocation period 604, the request module 598 obtains the current authorized data integrity verification allocation period 604 from a trusted source, where the current authorized data integrity verification allocation period 604 is a currently active version of one of a plurality of authorized data integrity verification allocation scenarios.

With regards to processing the encoded data slice integrity status request 606, the request module 598 performs a series of request processing steps. In a first processing step, the request module 598 receives the encoded data slice integrity status request 606 (e.g., from another DS unit 594), where the encoded data slice integrity status request 606 includes an identifier (ID) of a requesting entity (e.g., a DS unit ID of the other DS unit 594), a DSN address range, and an integrity test type indicator (e.g., list slice names, return a digest of the list of slice names). In a second processing step, the request module 598 determines whether the requesting entity is authorized to send the encoded data slice integrity status request 606 in accordance with the current authorized data integrity verification allocation period 604 (e.g., requesting entity ID matches). In a third processing step, request module 598, when the requesting entity is authorized to send the encoded data slice integrity status request 606, determines whether the requested DSN address range is in accordance with the current authorized data integrity verification allocation period 604 (e.g., DSN address range matches for the allocation period). The request module 598 may output an authorization indicator 610 indicating whether either the requesting entity is not authorized or the requested DSN address range is not in accordance with the current authorized data integrity verification allocation period 604.

With regards to generating the encoded data slice integrity status response 608, the integrity module 600, when the requested DSN address range is in accordance with the current authorized data integrity verification allocation period 604, performs a series of integrity evaluation steps. In a first integrity evaluation step, the integrity module 600 performs an encoded data slice integrity status evaluation operation in accordance with the encoded data slice integrity status request 606 to produce the encoded data slice integrity status response 608 (e.g., generate a slice name list over the DSN address range, calculate a digest over the slice name list, verify integrity of each slice within the DSN address range). When calculating the digest over the slice name list, the integrity module 600 performs a deterministic function on the slice name list where the deterministic function may include at least one of a hashing function, a cyclic redundancy code function, a mask generating function, and a hash based message authentication code function.

The integrity module 600 performs the encoded data slice integrity status evaluation operation in accordance with the encoded data slice integrity status request 606 by at least one of a variety of evaluation approaches. A first evaluation approach includes the integrity module 600, when the encoded data slice integrity status request 606 includes a slice list request, generating a list of slice names associated with the DSN address range to produce the encoded data slice integrity status response 608. A second evaluation approach includes the integrity module 600, when the encoded data slice integrity status request 606 includes a slice list digest request, generating the list of slice names associated with the DSN address range and generating a digest of the list of slice names to produce the encoded data slice integrity status response 608.

A third evaluation approach of the variety of evaluation approaches includes the integrity module 600, when the encoded data slice integrity status request 606 includes a slice integrity request, performing a series of digest steps. A first digest step includes the integrity module 600 generating at least one slice digest for at least one slice associated with the DSN address. A second digest step includes the integrity module 600, for each slice digest of the at least one slice digest, comparing a retrieved slice digest to the slice digest to produce comparing results. A third digest step includes the integrity module 600 generating the encoded data slice integrity status response to include the comparing results. In a second integrity evaluation step of the series of integrity evaluation steps, the integrity module 600 outputs the encoded data slice integrity status response 608 to the requesting entity.

After performing the encoded data slice integrity status evaluation operation, the integrity module 600 indicates that the encoded data slice integrity status evaluation operation was performed on the DSN address range in accordance with the current authorized data integrity verification allocation period such that a second request from the requesting entity while the current authorized data integrity verification allocation period is active would be determined to be unauthorized. For example, the integrity module 600 flags the DSN address range has done for this allocation period.

With regards to indicating the compromised DS unit, the compromise module 602, when either the requesting entity is not authorized or the requested DSN address range is not in accordance with the current authorized data integrity verification allocation period 604 as indicated by the authorization indicator 610, the compromise module 602 indicates that the requesting entity may be compromised. For example, the compromise module 602 outputs the compromise indication 610. The compromise module 602 indicates that the requesting entity may be compromised by facilitating a compromised requesting entity remedy including at least one of initiating an encoded data slice integrity status check process for other DSN address ranges associated with the DSN address range and issuing an associated encoded data slice integrity status response 614. The initiating of the status check process includes identifying the other DSN address ranges and issuing encoded data slice integrity status requests 612 to one or more other DS units 594 of the set of DS units 594. The issuing of the associated encoded data slice integrity status response 614 includes generating the associated encoded data slice integrity status response 614 to include the requesting entity ID of the compromised requesting entity and outputting the associated encoded data slice integrity status response 614 to one or more of the set of DS units, the compromised requesting entity, and a DS managing unit.

The request module 598 may determine whether the current authorized data integrity verification allocation period 604 has been completed and update the current authorized data integrity verification allocation period when the current authorized data integrity verification allocation period has been completed. The determining may be based on detecting that the requested DSN address range is a last DSN address range associated with the current authorized data integrity verification allocation period 604.

Figure 44F:
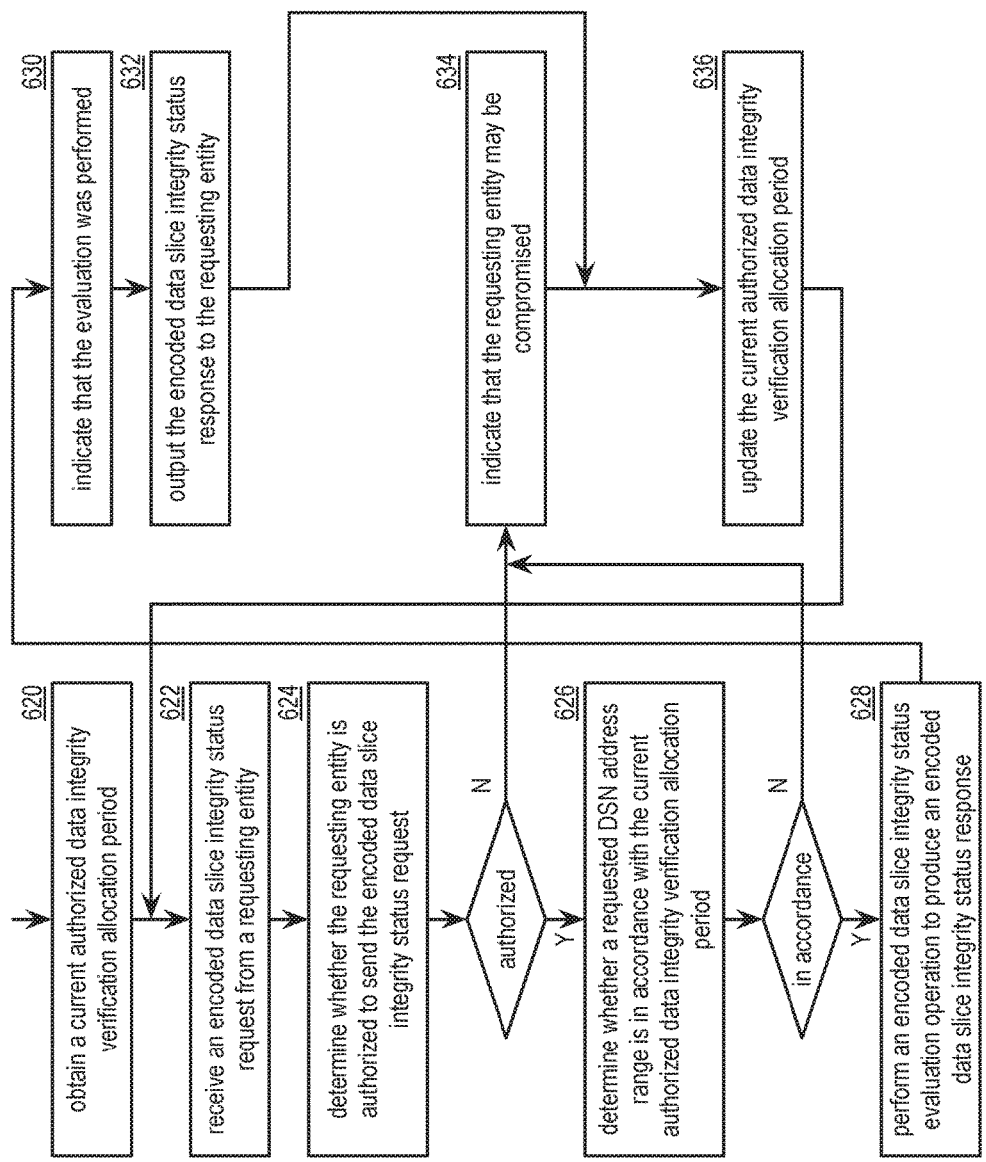
FIG. 44F is a flowchart illustrating an example of authorizing an encoded data slice integrity status request in accordance with the present invention.

FIG. 44F is a flowchart illustrating an example of authorizing an encoded data slice integrity status request. The method begins at step 620 where a processing module of a dispersed storage (DS) unit of a set of DS units obtains a current authorized data integrity verification allocation period from a trusted source, where the current authorized data integrity verification allocation period is a currently active version of one of a plurality of authorized data integrity verification allocation scenarios (e.g., to enable scanning for slice errors).

The method continues at step 622 where the processing module receives an encoded data slice integrity status request, where the encoded data slice integrity status request includes an identifier (ID) of a requesting entity and a dispersed storage network (DSN) address range. The request may further include a request type (e.g., list slice names, provide a digest of the slice names, etc.). The method continues at step 624 where the processing module determines whether the requesting entity is authorized to send the encoded data slice integrity status request in accordance with the current authorized data integrity verification allocation period. For example, the processing module determines that the requesting entity is authorized when the ID of the requesting entity matches a requesting entity ID of the current authorized data integrity verification allocation period. The method branches to step 634 when the processing module determines that the requesting entity is not authorized to send the encoded data slice integrity status request. The method continues to step 626 when the processing module determines that the requesting entity is authorized to send the encoded data slice integrity status request.

When the requesting entity is authorized to send the encoded data slice integrity status request, the method continues at step 626 where the processing module determines whether the requested DSN address range is in accordance with the current authorized data integrity verification allocation period.

For example, the processing module determines that the requested DSN address is in accordance with the current authorized data integrity verification allocation period when the DSN address matches a DSN address of the current authorized data integrity verification allocation period. The method branches to step 634 when the processing module determines that the requested DSN address is not in accordance with the current authorized data integrity verification allocation period. The method continues to step 628 when the processing module determines that the requested DSN address is in accordance with the current authorized data integrity verification allocation period.

When the requested DSN address range is in accordance with the current authorized data integrity verification allocation period, the method continues at step 628 where the processing module performs an encoded data slice integrity status evaluation operation in accordance with the encoded data slice integrity status request to produce an encoded data slice integrity status response (e.g., an evaluation operation over the DSN address range including at least one of a slice name list, calculating a digest over the slice name list, and verify integrity of each slice). The performing the encoded data slice integrity status evaluation operation in accordance with the encoded data slice integrity status request includes at least one of a variety of evaluation approaches. In a first evaluation approach, when the encoded data slice integrity status request includes a slice list request, the processing module generates a list of slice names associated with the DSN address range to produce the encoded data slice integrity status response. In a second evaluation approach, when the encoded data slice integrity status request includes a slice list digest request, the processing module generates the list of slice names associated with the DSN address range and generates a digest of the list of slice names to produce the encoded data slice integrity status response.

In a third evaluation approach of the variety of evaluation approaches, when the encoded data slice integrity status request includes a slice integrity request, the processing module performs a series of generating steps. A first generating step includes the processing module generating at least one slice digest for at least one slice associated with the DSN address. For each slice digest of the at least one slice digest, a second generating step includes the processing module comparing a retrieved slice digest to the slice digest to produce comparing results. A third generating step includes the processing module generating the encoded data slice integrity status response to include the comparing results.

After performing the encoded data slice integrity status evaluation operation, the method continues at step 630 where the processing module indicates that the encoded data slice integrity status evaluation operation was performed on the DSN address range in accordance with the current authorized data integrity verification allocation period such that a second request from the requesting entity while the current authorized data integrity verification allocation period is active would be determined to be unauthorized. For example, the processing module updates the current authorized data integrity verification allocation period to indicate that the encoded data slice integrity status evaluation operation was performed on the DSN address range. The method continues at step 632 where the processing module outputs the encoded data slice integrity status response to the requesting entity.

When either the requesting entity is not authorized or the requested DSN address range is not in accordance with the current authorized data integrity verification allocation period, the method continues at step 634 where the processing module indicates that the requesting entity may be compromised. The indicating that the requesting entity may be compromised includes facilitating a compromised requesting entity remedy including at least one initiating an encoded data slice integrity status check process for other DSN address ranges associated with the DSN address range and issuing an associated encoded data slice integrity status response. The initiating of the status check process includes identifying the other DSN address ranges and issuing encoded data slice integrity status requests to one or more other DS units of a set of DS units. The issuing of the associated encoded data slice integrity status response includes generating the associated encoded data slice integrity status response to include the requesting entity ID of the compromised requesting entity and outputting the associated encoded data slice integrity status response to one or more of the set of DS units, the compromised requesting entity, and a DS managing unit.

The method continues at step 636 where the processing module updates the current authorized data integrity verification allocation period when the processing module determines that the current authorized data integrity verification allocation period has been completed. The determining may be based on detecting that the requested DSN address range is a last DSN address range associated with the current authorized data integrity verification allocation period. The method repeats back to step 622.

Figure 45:
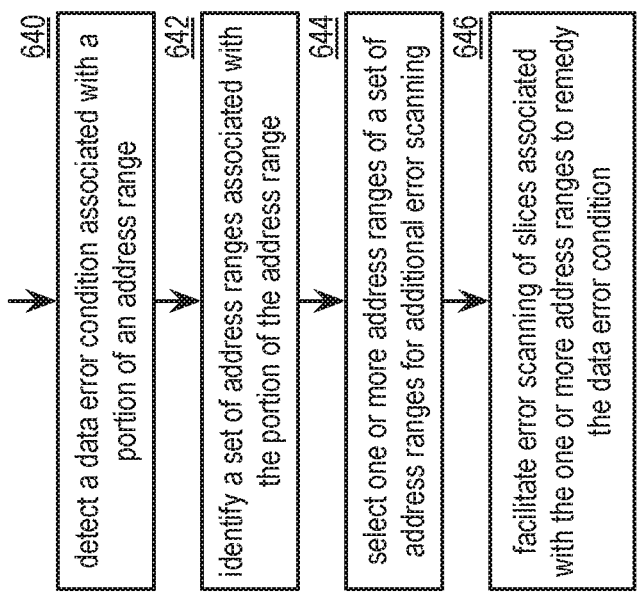
FIG. 45 is a flowchart illustrating an example of facilitating additional slice error scanning in accordance with the present invention.

FIG. 45 is a flowchart illustrating an example of facilitating additional slice error scanning. The method begins at step 640 where a processing module (e.g., of a distributed storage and task (DST) client module of a DST execution unit) detects a data error condition associated with a portion of an address range. The data error condition includes one or more of a memory failure, a slice error, a network outage, and an unavailable DST execution unit. The detecting may be based on one or more of a test, an error message, a desired performance level indicator, a present performance level, a list of predetermined portions of address ranges, and an unfavorable comparison of the present performance level to the desired performance level indicator. For example, the processing module detects the data error condition associated with a predetermined slice name address range of 0-249 when receiving a slice error message for a slice associated with slice name 200.

The method continues at step 642 where the processing module identifies a set of address ranges associated with the portion of the address range. The identifying includes obtaining an address range list for a DST execution unit storage set, accessing the address range list utilizing the portion of the address range, and retrieving a set of associated address ranges. For example, the processing module accesses the address range list utilizing the slice name address range of 0-249 as an index to retrieve associated address ranges of 1000-1249, 2000-2249, and 3000-3249.

The method continues at step 644 where the processing module selects one or more address ranges of a set of address ranges for additional error scanning. The selecting may include utilizing a selection scheme. The selection scheme includes at least one of including the portion of the address range, including corresponding slices above the portion of the address range, including corresponding slices below the portion of the address range, and including corresponding slices stored in other DST execution units. For example, the processing module selects each associated address range including address ranges 1000-1249, 2000-2249, and 3000-3249 when a data error condition is associated with the slice name address range of 0-249 and a selection scheme includes selecting all corresponding slice names for each of the other DST execution units.

The method continues at step 646 where the processing module facilitates error scanning of slices associated with or more address ranges to remedy the data error condition. The facilitating includes at least one of initiating scanning (e.g., generating a list request for each DST execution unit, wherein the request includes a start and an slice name of each of the one more address ranges), sending a request to scan to one or more other DST execution units of the DST execution unit storage set, wherein each request includes a corresponding address range of the one and more address ranges, removing the one or more address ranges from a scanned range list to force scanning sooner, and reprioritizing error scans based on one or more of an error type, and error severity level, and a timestamp associated with a last scan.

Figure 46A:
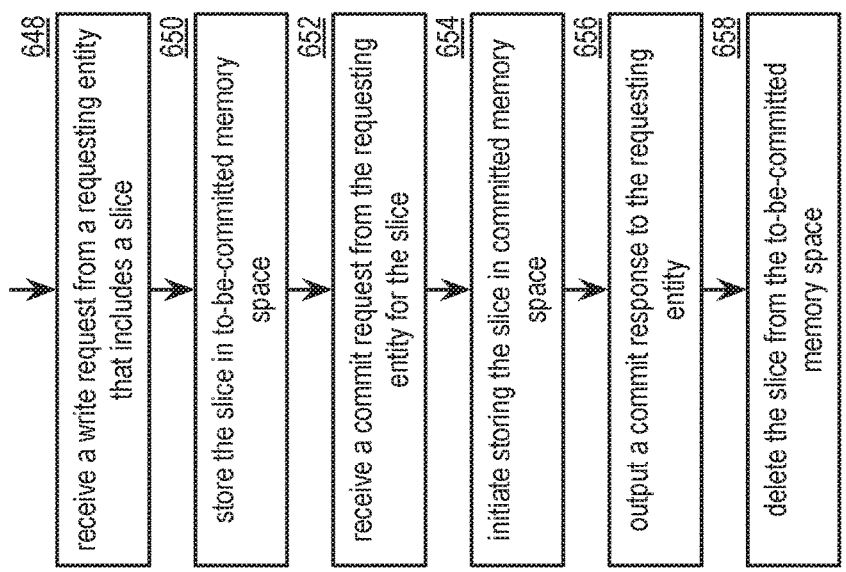
FIG. 46A is a flowchart illustrating another example of storing data in accordance with the present invention.

FIG. 46A is a flowchart illustrating another example of storing data. The method begins at step 648 where a processing module (e.g., of a distributed storage and task (DST) client module of a DST execution unit) receives a write request from a requesting entity that includes a slice. The write request may include one or more of the slice, a requesting unit identifier (ID), a slice name corresponding to the slice, and a transaction number corresponding to a write sequence that includes the write request. The method continues at step 650 where the processing module stores the slice in to-be-committed memory space. Memory of the DST execution unit includes the to-be-committed memory space and committed memory space. The storing includes one or more of storing the slice name, storing the transaction number, storing the requesting unit ID, storing the slice in memory of the to-be-committed memory space, providing an indication of a storage location of the slice, and providing an indication that the slice has not been stored in the committed memory (e.g., setting a dirty flag, outputting a message that includes the indication).

The method continues at step 652 where the processing module receives a commit request from the requesting entity for the slice. The commit request may include one or more of a commit transaction number and a commit request number. The receiving may include extracting the commit transaction number from the commit request, comparing the commit transaction number to the transaction number, and indicating that the commit request is associated with the write sequence when the commit transaction number is substantially the same as the transaction number.

The method continues at step 654 where the processing module initiates storing the slice in the committed memory space. The initiating includes one or more of retrieving the slice from the to-be-committed memory space, storing the slice in the committed memory space, and queuing a task to transfer the slice from the to-be-committed memory space to the committed memory space. The step of storing the slice of the committed memory space may be interrupted if a corresponding DST execution unit resets prior to completion of storing the slice in the committed memory space.

The method continues at step 656 where the processing module outputs a commit response to the requesting entity. The outputting includes generating the commit response to include the commit request number and sending the commit response to the requesting entity. The method continues at step 658 where the processing module deletes the slice from the to-be-committed memory space. The deleting may include providing an indication that the slice has been stored in the committed memory (e.g., resetting a dirty flag, outputting a message that includes the indication).

Figure 46B:
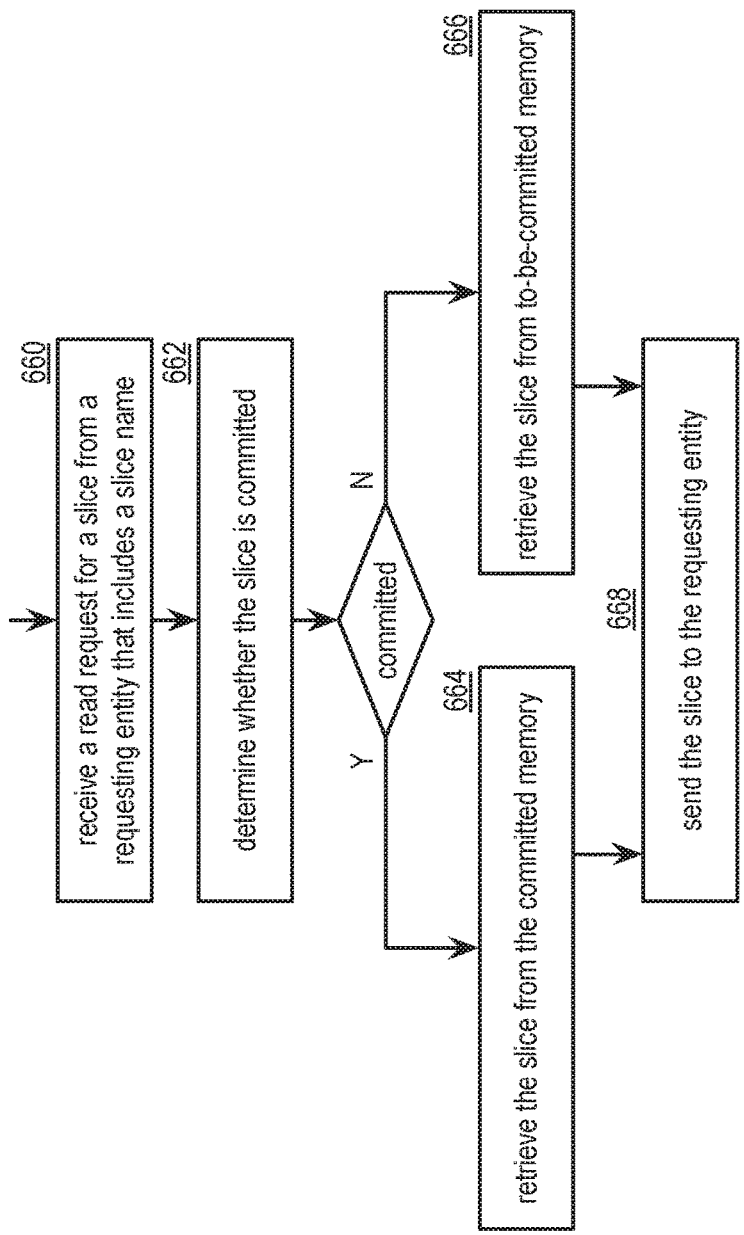
FIG. 46B is a flowchart illustrating another example of retrieving data in accordance with the present invention.

FIG. 46B is a flowchart illustrating another example of retrieving data. The method begins at step 660 where a processing module (e.g., of a distributed storage and task (DST) client module of a DST execution unit) receives a read request for a slice from a requesting entity, wherein the request includes a slice name. The read request may include one or more of the slice name that corresponds to the slice, a read request number, and a transaction number corresponding to a read sequence that includes the read request. The method continues at step 662 where the processing module determines whether the slice is committed. The determining may be based on one or more of a query to committed memory space, a query to to-be-committed memory space, and obtaining a status indicator (e.g., a dirty flag). For example, the processing module determines that the slice is not committed when an obtained dirty flag status indicator is set. The method branches to step 666 when the processing module determines that the slice is not committed. The method continues to step 664 when the processing module determines that the slice is committed.

The method continues at step 664 where the processing module retrieves the slice from the committed memory when the slice is committed. The method continues to step 668. When the slice is not committed, the method continues at step 666 where the processing module retrieves the slice from the to-be-committed memory space. The method continues to step 668. The method continues at step 668 where the processing module sends the slice to the requesting entity. The sending includes one or more of generating a read response that includes the read request number, a slice revision count corresponding to the number of revisions of slices corresponding to the slice name, and for each revision, a slice revision number, a slice length, and a corresponding slice, and outputting the read response to the requesting entity.

Figure 46C:
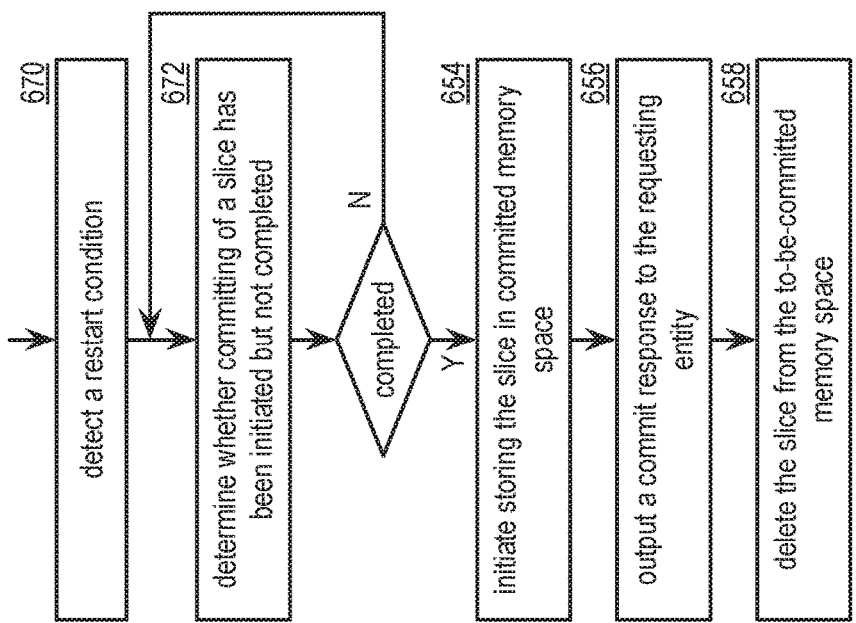
FIG. 46C is a flowchart illustrating another example of storing data in accordance with the present invention.

FIG. 46C is a flowchart illustrating another example of storing data, which includes similar steps to FIG. 46A. The method begins at step 670 where a processing module (e.g., of a distributed storage and task (DST) client module of a DST execution unit) detects a restart condition. The restart condition includes at least one of a power up, a slice storage process restart, a software reset, and an error. The detecting includes one or more of initiating a query, receiving an error message, receiving a restart request, and receiving a restart complete indication. The method continues at step 672 where the processing module determines whether committing of a slice has been initiated but not completed. The determining includes one or more of initiating a query, receiving an error message, checking a storage status indicator (e.g., a dirty flag associated with the slice), accessing a storage lot, retrieving a storage table, and searching a to-be-committed memory space for the slice. The method loops at step 672 when the processing module does not identify such a slice. The method continues with step 654, 656, and 658 of FIG. 46A where the processing module initiates storing the slice in committed memory space, outputs a commit response to the requesting entity, and deletes the slice from the to-be-committed memory space when the processing module identifies the slice where committing of the slice has been initiated but not completed.

Figure 47:
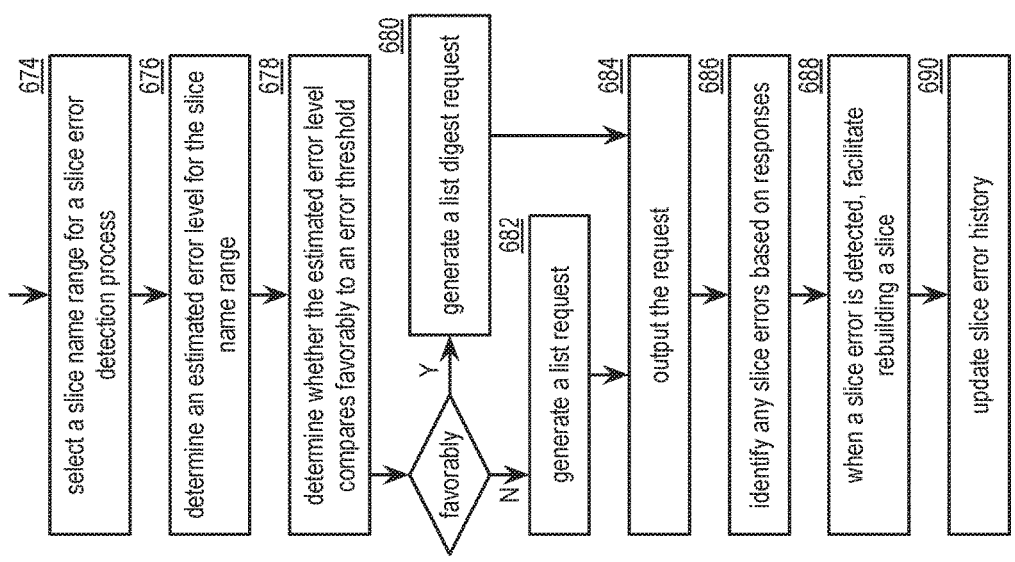
FIG. 47 is a flowchart illustrating an example of selecting a slice error detection method in accordance with the present invention.

FIG. 47 is a flowchart illustrating an example of selecting a slice error detection method. The method begins at step 674 where a processing module (e.g., of a distributed storage and task (DST) client module) selects a slice name range for a slice error detection process. The selecting may be based on one or more of a previous slice name range, a round-robin approach, an error message, receiving a scan request, a new memory installation indicator, and a slice error history. The method continues at step 676 where the processing module determines an estimated error level for the slice and range. The determining may be based on one or more of slice error history, a number of consecutive list request cycles without errors compared to a request cycle threshold, and an error message. For example, the processing module determines the estimated error level as above-average when slice error history indicates an above-average number of errors for the slice name range. As another example, the processing module determines the estimated error level as below average when 10 consecutive list request cycles for the slice name range was without errors.

The method continues at step 678 where the processing module determines whether the estimated error level compares favorably to an error threshold. For example, the processing module determines that the comparison is favorable when the estimated error level is less than the error threshold. For instance, the processing module determines that the comparison is favorable when the estimated error level is below average. The method branches to step 682 when the processing module determines that the estimated error level compares unfavorably to the error threshold. The method continues to step 680 when the processing module determines that the estimated error level compares favorably to the error threshold. The method continues at step 680 where the processing module generates a list digest request when the processing module determines that the estimated error level compares favorably to the error threshold. The generating includes generating the list digest request to include one or more of a list digest opcode, a start slice name, an end slice name, a maximum response count, and a request number. The method branches to step 684.

When the estimated error level compares unfavorably to the error threshold, the method continues at step 682 where the processing module generates a list request. The generating includes generating the list request to include one or more of a list opcode, a start slice name, an end slice name, a maximum response count, and a request number. The method continues to step 684. The method continues at step 684 where the processing module outputs the request. For example, the processing module generates a list request or list digest request for each DST execution unit of a set of DST execution units corresponding to the slice name range and sends the set of requests to the set of DST execution units.

The method continues at step 686 where the processing module identifies any slice errors based on responses. The identifying includes one or more of receiving list responses receiving list digest responses, comparing a response from a first DST execution unit of the set of DST execution units to corresponding responses from the other DST execution units, and identifying a slice error of the first DST execution unit when the response is not substantially the same as the corresponding responses from the other DST execution units. When a slice error is detected, the method continues at step 688 where the processing module facilitates rebuilding a slice associated with the detected slice error. The facilitating includes at least one of initiating a rebuilding process utilizing a slice name associated with the slice to be rebuilt and sending a rebuild request to another entity to initiate rebuilding the slice, wherein the request includes the slice name. The method continues at step 690 where the processing module updates slice error history to include one or more of the slice name, and error type, a timestamp, and a DST execution unit ID associated with the slice error. The method may loop back to step 674 to search for more slice errors.

Figure 48A:
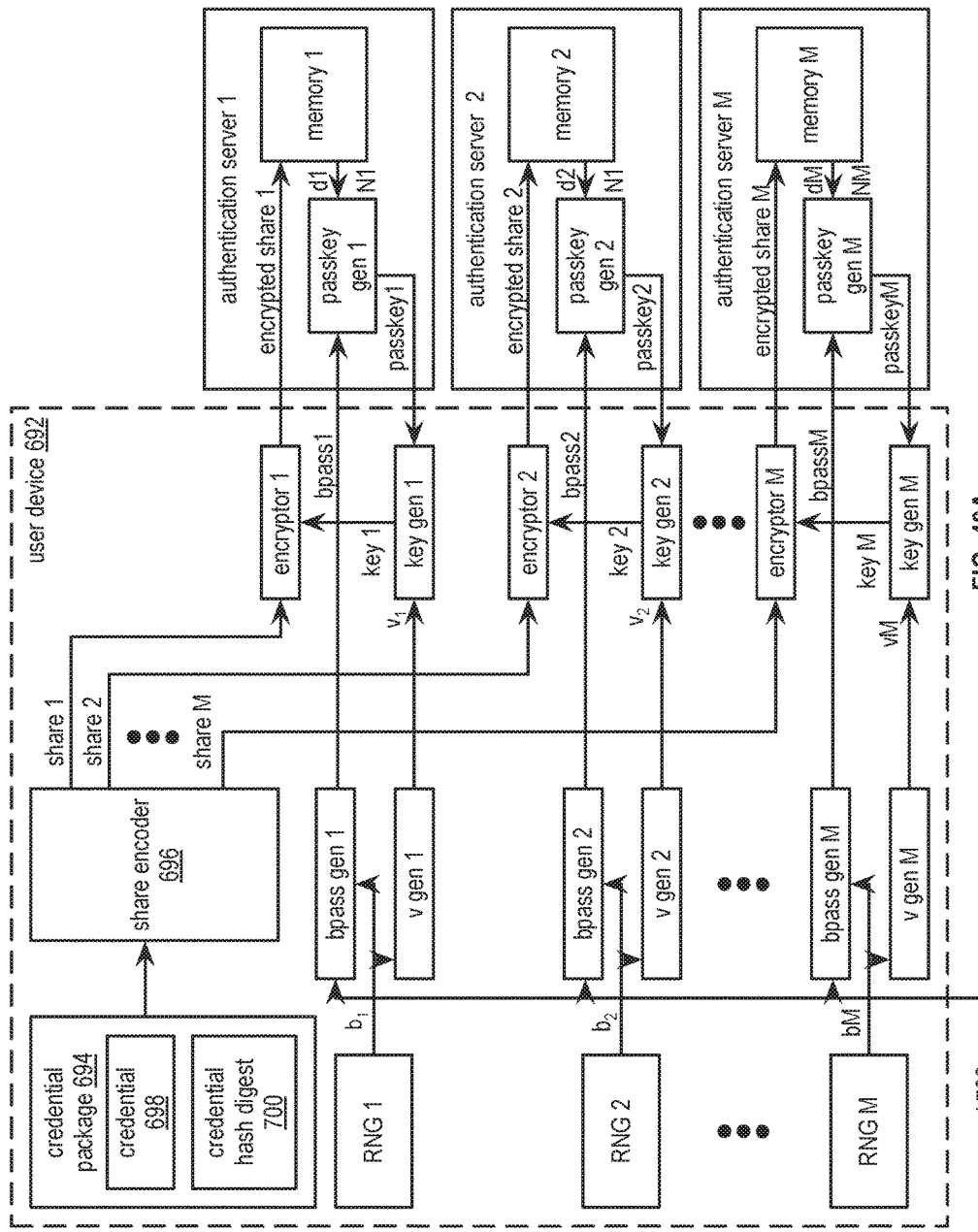
FIG. 48A is a schematic block diagram of an embodiment of a credential storage system in accordance with the present invention.

FIG. 48A is a schematic block diagram of an embodiment of a credential storage system that includes a user device 692 and a set of authentication servers 1-M. Alternatively, the user device 692 may be implemented as at least one of a computing device, a dispersed storage (DS) processing unit, a DS unit, and a DS managing unit. One or more authentication servers of the set of authentication servers 1-M may be implemented as one of a computing device, a dispersed storage (DS) processing unit, a DS unit, a DS managing unit, and a user device. The credential storage system functions to securely store data (e.g., a credential package 694) as a set of encrypted shares 1-M in the set of authentication servers 1-M. The secure storing includes obtaining a password 702, encoding the data 694 to produce a set of shares 1-M, generating a set of keys 1-M utilizing the password 702 and security parameters associated with the set of authentication servers 1-M, encrypting the set of shares 1-M utilizing the set of keys 1-M to produce a set of encrypted shares 1-M, and storing the set of encrypted shares 1-M in the set of authentication servers 1-M. Alternatively, the set of encrypted shares 1-M may be stored in less than the full set of authentication servers 1-M. For example, the set of encrypted shares 1-M is stored in one authentication server.

The user device 692 includes the credential package 694, a share encoder 696, a plurality of random number generators (RNG) 1-M, a plurality of blinded password generators 1-M, a plurality of variable v generators 1-M, a plurality of key generators 1-M, and a plurality of encryptors 1-M. The credential package 694 may include a credential 698 and a credential hash digest 700. Each authentication server of the set of authentication servers 1-M includes a memory of a set of memories 1-M and a passkey generator of a set of passkey generators 1-M.

Each authentication server of the set of authentication servers 1-M obtains (e.g., generates, receives, retrieves) a public-private key pair, stores a private key of the public-private key pair in a corresponding memory of the authentication server, and facilitates obtaining (e.g., sends) a public key of the public-private key pair by the user device. For example, authentication server 1 generates a public-private key pair 1 to include a public key e1,N1 and a private key d1,N1, where $1 = (d1*e1) \mod ((P1-1)*(Q1-1))$ and $N1 = P1*Q1$.

The set of random number generators 1-M generate a set of random numbers b1-bM. The set of random number generators 1-M output the set of random numbers b1-bM to the set of blinded password generators 1-M and the set of variable v generators 1-M. The user device 692 obtains the password 702 by at least one of receiving a user input, a lookup, retrieving a key, combining the key with a user input, and receiving the password 702. For example, the user device 692 receives a user input of ten alphanumeric characters via a user interface input. Alternatively, the user device 692 obtains as many as a set of M passwords. The set of blinded password generators 1-M obfuscates the password 702 utilizing the set of random numbers b1-bM to produce a set of blinded passwords 1-M. For example, blinded password generator 1 generates a blinded password 1 in accordance with a function: $bpass1 = (password)*b1^{e1} \mod N1$, where e1, N1 is the public key of authentication server 1. The set of blinded password generators 1-M outputs the set of blinded passwords 1-M to the set of authentication servers 1-M. The set of variable v generators 1-M transforms the set of random numbers b1-bM to produce a set of variables v1-vM. For example, variable v generator 1 transforms random number b1 in accordance with a function such that $1 = b1*v1 \mod N1$. The set of variable v generators 1-M outputs the set of variables v1-vM to the set of key generators 1-M.

The set of passkey generators 1-M generates a set of passkeys 1-M utilizing the set of blinded passwords 1-M and based on a set of private keys d1,N1 through dM, NM associated with the set of authentication servers 1-M. For example, passkey generator 1 generates a passkey 1 in accordance with a function: $passkey1 = bpass1^{d1} \mod N1$, where d1,N1 is a private key of authentication server 1. The set of passkey generators 1-M outputs the set of passkeys 1-M to the set of key generators 1-M.

The credential 698 may include sensitive data including one or more of a user device private key, a user device public key, another public key, a signed certificate, system access information, an interne protocol address, confidential user information, a password, and any other sensitive confidential information. The credential hash digest 700 may be generated by utilizing a hashing function on the credential 698. The credential hash digest 700 may be utilized in a subsequent integrity verification step to verify that the credential 698 has not been corrupted. The share encoder 696 encodes the credential package 694 to produce the shares 1-M in accordance with a share encoding function (e.g., a Shamir secret sharing algorithm, a dispersed storage error coding function). The share encoder outputs the set of shares 1-M to the set of encryptors 1-M.

The set of key generators 1-M generates the set of keys 1-M utilizing the set of variables v1-vM and the set of passkeys 1-M. For example, key generator 1 generates key 1 in accordance with a function: $key1 = ((passkey1)*(v1)) \mod N1$. As such, key 1 represents a signature of the password signed by authentication server 1. In addition, the user device may verify key 1 by calculating a recovered password $= (key1)^{e1} \mod N1$ and verifying that key 1 is valid when the recovered password is substantially the same as the password 702.

The set of encryptors 1-M encrypts the set of shares 1-M in accordance with an encryption algorithm utilizing the set of keys 1-M to produce the set of encrypted shares 1-M. For example, encryptor 1 encrypts share 1 utilizing key 1 to produce encrypted share 1. The encryption algorithm may be in accordance with dispersed storage error coding parameters associated with the user device. For example, each of the encryptors 1-M utilize a common encryption algorithm in accordance with the dispersed storage error coding parameters. As another example, at least two encryptors of the encryptors 1-M utilize different encryption algorithms in accordance with the dispersed storage error coding parameters. The set of encryptors 1-M sends the set of encrypted shares 1-M to the set of authentication servers 1-M for storage in the set of memories 1-M. Alternatively, an authentication server of the set of authentication servers 1-M may store at least one encrypted share of the set of encrypted shares 1-M as a set of encoded share slices in one or more DS units when the authentication server is implemented as a DS processing unit.

In an example of operation, authentication server 1 generates the public-private key pair 1 as follows:

let P1=29 and Q1=31 so, $N1 = P1*Q1 = 29*31 = 899$ a totient $(N1) = (P1-1)*(Q1-1) = (29-1)*(31-1) = 840$, which is a number of integers in the range (1,N1) that are co-prime to N1.

e1 is a randomly chosen integer that is co-prime to N1, for example, let e1=11 to find d1, a multiplicative inverse of e1 mod N1 is calculated as:

d1=e1^(totient (N1)-1) mod totient (N1)=11; ^(840-1) mod 840=611.

so, the public key is 11, 899 and the private key is 611, 899

In the example of operation continued, blinded password generator 1 generates the blinded password 1 as follows:

let random number $b1 = 12$ let password $= 50$ $bpass1 = (password) * b1 \wedge e1 \bmod N1$
$= ((b1 \wedge e1 \bmod N1) * (password) \bmod N1$
$= ((12 \wedge 11 \bmod 899) * 50) \bmod 899$
$= (858 * 50) \bmod 899$
$= 647$ In the example of operation continued, passkey generator 1 generates passkey 1 as follows:
passkey 1=bpass1^d1 mod N1=647^611 mod 899=151

In the example of operation continued, the user device may verify passkey 1 as follows:
recovered blinded password=(passkey1)^e1 mod N1=151^11 mod 899=647

647 verified as blinded password 647, so passkey 1 is verified.

In the example of operation continued, variable v generator 1 generates v1 as follows:
multiplicative inverse of b1 mod N1 (e.g., using an extended euclidean algorithm)
v1=multiplicative inverse of 12 mod 899=75

In the example of operation continued, key generator 1 generates key 1 as follows:
key 1=((passkey1)*(v1)) mod N1=151*75 mod 899=537

In the example of operation continued, the user device verifies key 1 as follows:
recovered password=(key1)^e1 mod N1=537^11 mod 899=50

50 verified as password 50, so key 1 is verified.

Figure 48B:
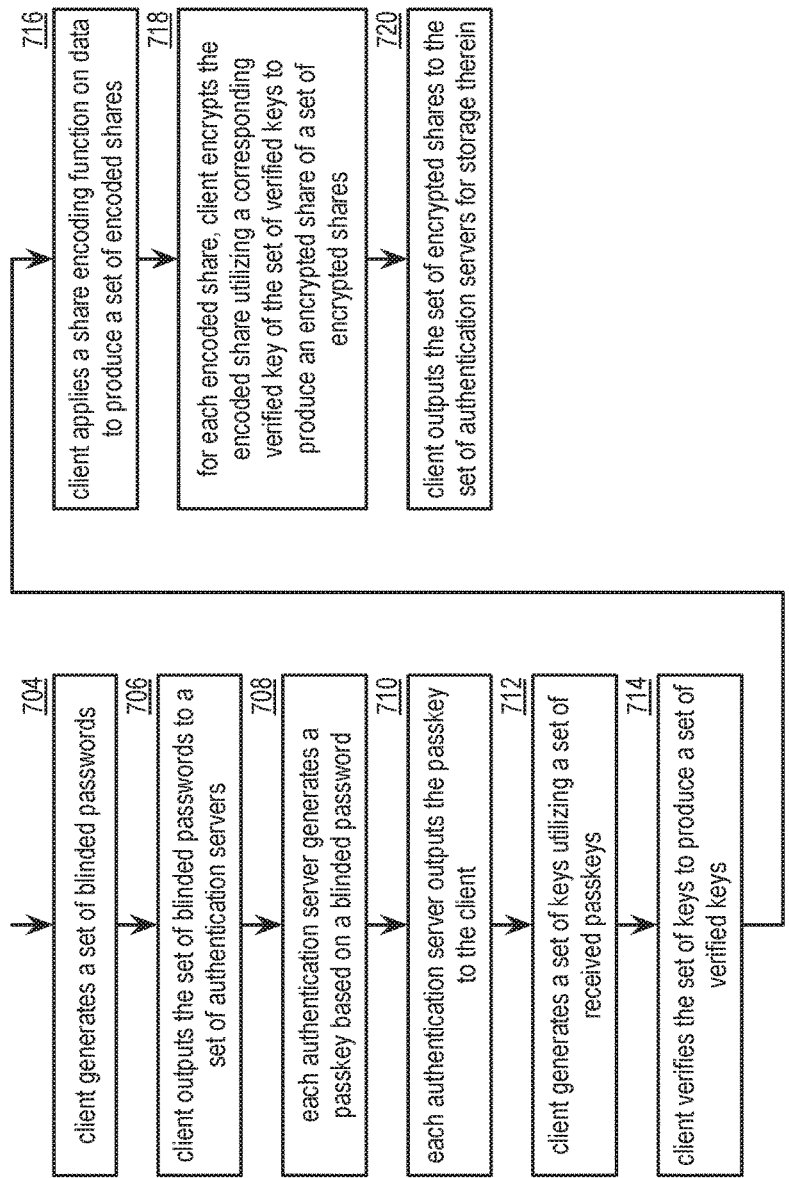
FIG. 48B is a flowchart illustrating an example of storing a credential in accordance with the present invention.

FIG. 48B is a flowchart illustrating an example of storing a credential. The method begins at step 704 where a client (e.g., a processing module of a distributed storage and task (DST) client module of a user device) generates a set of blinded passwords. The generating includes obtaining a password, obtaining a set of random numbers, obtaining a set of public keys associated with a set of authentication servers, and generating the set of blinded passwords utilizing the password, the set of random numbers, and the set of public keys. For example, the client generates a first blinded password of the set of blinded passwords utilizing a function: blinded password 1=(password)*b1^e1 mod N1, wherein b1 is a first random number of the set of random numbers, and e1, N1 is a first public key of the set of public keys. The obtaining the set of public keys may include verifying the set of public keys, wherein the verifying includes comparing a calculated hash of one or more of the public keys to a corresponding retrieved hash of the one or more public keys.

The method continues at step 706 where the client outputs the set of blinded passwords to the set of authentication servers. The method continues at step 708 where each authentication server of the set of authentication servers generates a passkey based on a corresponding blinded password of the set of blinded passwords such that a set of passkeys are generated by the set of authentication servers. For example, a first authentication server generates a first passkey of the set of passkeys in accordance with a function: passkey1=blinded password 1^d1 mod N1, wherein d1, N1 is a first private key of a set of private keys associated with the set of authentication servers, wherein the set of private keys and the set of public keys comprise a set of public-private key pairs. The method continues at step 710 where each authentication server of the set of authentication servers outputs a corresponding passkey of the set of passkeys to the client.

The method continues at step 712 where the client generates a set of keys utilizing a set of received passkeys. The set of received passkeys includes at least a decode threshold number of passkeys. The generating the set of keys may include verifying the set of received passkeys. For example, the client verifies a first received passkey by verifying that a recovered blinded password is substantially the same as the blinded password. For instance, the client verifies that recovered blinded password=(passkey1)^e1 mod N1 is substantially the same as the blinded password. The generating the set of keys further includes generating a set of variables v1-vM. For example, the client generates variable v1 such that b1*v1 mod N1=1. The generating a set of keys further includes generating the set of keys utilizing the set of received passkeys and the set of variables v1-vM. For example, the client generates a first key of the set of keys in accordance with a function: key 1=((passkey1)*(v1)) mod N1.

The method continues at step 714 where the client verifies the set of keys to produce a set of verified keys. For example, the client verifies that a recovered password is substantially the same as the password. For instance, the client verifies that recovered password=(key 1)^e1 mod N1=the password. When the key is verified, the method continues at step 716 where the processing module applies a share encoding function (e.g., Shamir shared secret function, dispersed storage error coding function) on data to produce a set of encoded shares. The data may include a credential package and a credential hash digest. The method continues at step 718 where, for each encoded share, the client encrypts the encoded share utilizing a corresponding verified key of the set of verified keys to produce an encrypted share of a set of encrypted shares. The method continues at step 720 where the client outputs the set of encrypted shares to the set of authentication servers for storage therein.

Figure 48C:
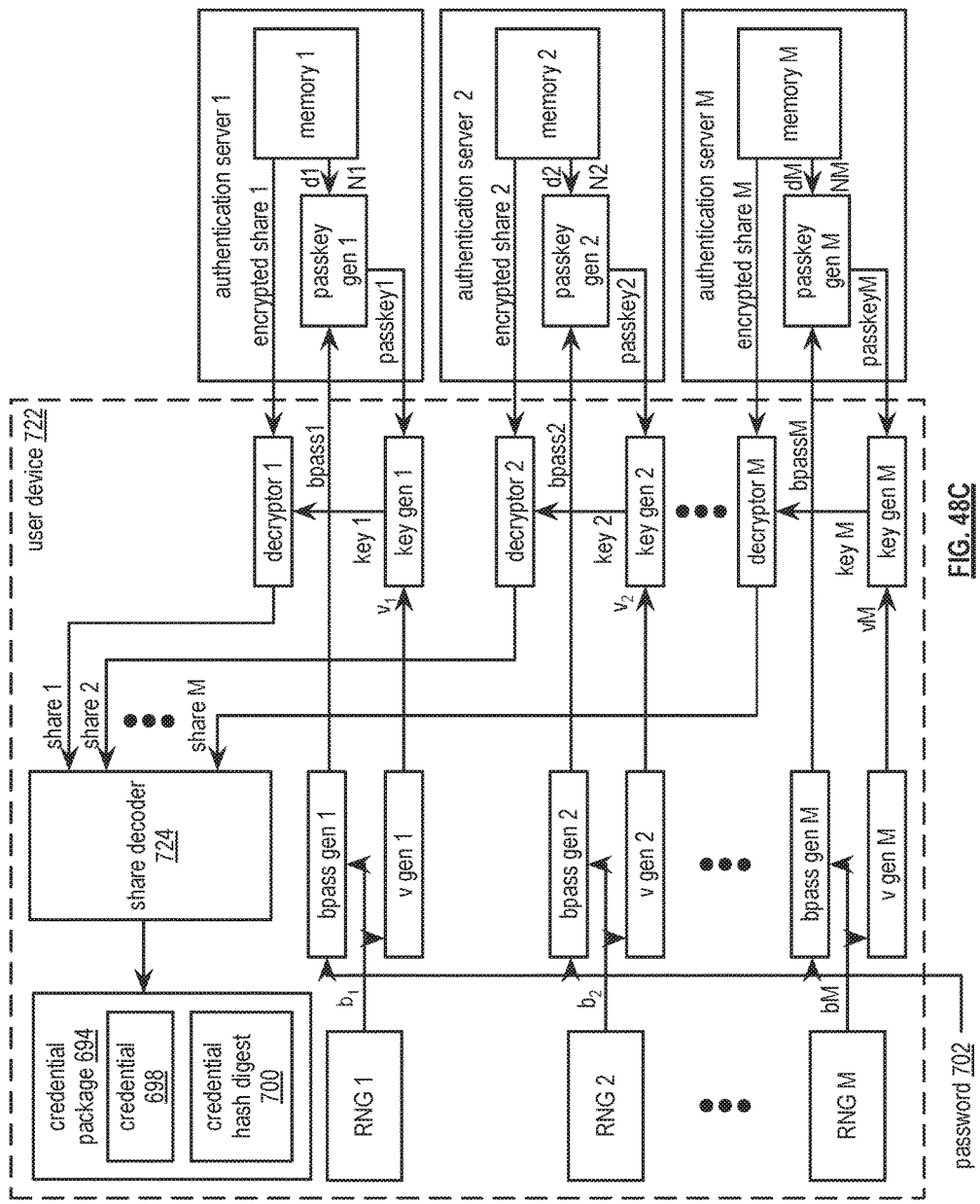
FIG. 48C is a schematic block diagram of an embodiment of a credential retrieval system in accordance with the present invention.

FIG. 48C is a schematic block diagram of an embodiment of a credential retrieval system that includes a user device 722 and a set of authentication servers 1-M. Alternatively, the user device 722 may be implemented as at least one of a computing device, a dispersed storage (DS) processing unit, a DS unit, and a DS managing unit. One or more authentication servers of the set of authentication servers 1-M may be implemented as one of a computing device, a dispersed storage (DS) processing unit, a DS unit, a DS managing unit, and a user device. The credential retrieval system functions to securely retrieve securely stored data (e.g., a credential package 694) from a set of encrypted shares 1-M retrieved from the set of authentication servers 1-M. The secure retrieving includes obtaining a password 702, generating a set of keys 1-M utilizing the password 702 and security parameters associated with the set of authentication servers 1-M, retrieving the set of encrypted shares 1-M from the set of authentication servers 1-M, decrypting the set of encrypted shares 1-M utilizing the set of keys 1-M to reproduce a set of shares 1-M, and decoding the set of shares 1-M to reproduce the data. Alternatively, the set of encrypted shares 1-M may be retrieved from less than the full set of authentication servers 1-M. For example, the set of encrypted shares 1-M is retrieved from one authentication server.

The user device 722 includes a plurality of random number generators (RNG) 1-M, a plurality of blinded password generators 1-M, a plurality of variable v generators 1-M, a plurality of key generators 1-M, a plurality of decryptors 1-M, a share decoder 724, and the credential package 694 (e.g., when reproduced). Each authentication server of the set of authentication servers 1-M includes a memory of a set of memories 1-M and a passkey generator of a set of passkey generators 1-M.

Each authentication server of the set of authentication servers 1-M obtains (e.g., generates, receives, retrieves) a public-private key pair, stores a private key of the public-private key pair in a corresponding memory of the authentication server, and facilitates obtaining (e.g., sends) a public key of the public-private key pair by the user device. For example, authentication server 1 generates a public-private key pair 1 to include a public key e1,N1 and a private key d1,N1, where $1=(d1*e1) \mod ((P1-1)*(Q1-1))$ and $N1=P1*Q1$.

The set of random number generators 1-M generate a set of random numbers b1-bM. The set of random number generators 1-M output the set of random numbers b1-bM to the set of blinded password generators 1-M and the set of variable v generators 1-M. The user device 722 obtains the password 702 by at least one of receiving a user input, a lookup, retrieving a key, combining the key with a user input, and receiving the password 702. For example, the user device 722 receives a user input of ten alphanumeric characters via a user interface input. The password 702 substantially matches the password 702 discussed with reference to FIG. 48A. Alternatively, the user device 722 obtains as many as a set of M passwords. The set of blinded password generators 1-M obfuscates the password 702 utilizing the set of random numbers b1-bM to produce a set of blinded passwords 1-M. For example, blinded password generator 1 generates a blinded password 1 in accordance with a function: $bpass1=(password)*b1\hat{}e1$ modulo N1, where e1, N1 is the public key of authentication server 1. The set of blinded password generators 1-M outputs the set of blinded passwords 1-M to the set of authentication servers 1-M. The set of variable v generators 1-M transforms the set of random numbers b1-bM to produce a set of variables v1-vM. For example, variable v generator 1 transforms random number b1 in accordance with a function such that $1=b1*v1 \mod N1$. The set of variable v generators 1-M outputs the set of variables v1-vM to the set of key generators 1-M.

The set of passkey generators 1-M generates a set of passkeys 1-M utilizing the set of blinded passwords 1-M and based on a set of private keys d1,N1 through dM, NM associated with the set of authentication servers 1-M. For example, passkey generator 1 generates a passkey 1 in accordance with a function: $passkey 1=bpass\hat{}d1 \mod N1$, where d1,N1 is a private key of authentication server 1. The set of passkey generators 1-M outputs the set of passkeys 1-M to the set of key generators 1-M.

The set of key generators 1-M generates the set of keys 1-M utilizing the set of variables v1-vM and the set of passkeys 1-M. For example, key generator 1 generates key 1 in accordance with a function: $key 1=((passkey1)*(v1)) \mod N1$. As such, key 1 represents a signature of the password signed by authentication server 1. In addition, the user device may verify key 1 by calculating a recovered password=$(key1)\hat{}e1 \mod N1$ and verifying that key 1 is valid when the recovered password is substantially the same as the password 702.

The set of decryptors 1-M retrieves the set of encrypted shares 1-M from the set of memories 1-M of the set of authentication servers 1-M. Alternatively, an authentication server of the set of authentication servers 1-M may retrieve at least one encrypted share of the set of encrypted shares 1-M as a set of encoded share slices from one or more DS units when the authentication server is implemented as a DS processing unit. The set of decryptors 1-M decrypts the set of encrypted shares 1-M in accordance with an encryption algorithm utilizing the set of keys 1-M to reproduce the set of shares 1-M. For example, decryptor 1 decrypts encrypted share 1 utilizing key 1 to reproduce share 1. The encryption algorithm may be in accordance with dispersed storage error coding parameters associated with the user device. For example, each of the decryptors 1-M utilize a common encryption algorithm in accordance with the dispersed storage error coding parameters. As another example, at least two decryptors of the decryptors 1-M utilize different encryption algorithms in accordance with the dispersed storage error coding parameters.

The share decoder 724 decodes the set of shares 1-M to reproduce the credential package 694 in accordance with a share encoding function (e.g., a Shamir secret sharing algorithm, a dispersed storage error coding function). The credential package 694 may include a recovered credential 698 and a recovered credential hash digest 700. The share decoder 724 outputs the credential package 694. The recovered credential 698 may include sensitive data including one or more of a user device private key, a user device public key, another public key, a signed certificate, system access information, an interne protocol address, confidential user information, a password, and any other sensitive confidential information. The user device 722 may verify the credential package 694 by comparing a calculated hash of the recovered credential to the recovered credential hash digest. For example, the user device indicates that the credential package 694 is verified when the calculated hash of the recovered credential is substantially the same as the recovered credential hash digest.

In an example of operation, authentication server 1 generates the public-private key pair 1 as follows:
let P1=29 and Q1=31
so, $N1=P1*Q1=29*31=899$
a totient $(N1)=(P1-1)*(Q1-1)=(29-1)*(31-1)=840$, which is a number of integers in the range (1,N1) that are co-prime to N1.

e1 is a randomly chosen integer that is co-prime to N1, for example, let e1=11
to find d1, a multiplicative inverse of e1 mod N1 is calculated as:
$d1=e1\hat{}(totient (N1)-1) \mod totient (N1)=11\hat{}(840-1) \mod 840=611$.
so, the public key is 11, 899 and the private key is 611, 899

In the example of operation continued, blinded password generator 1 generates the blinded password 1 as follows:

let random number $b1 = 12$ let password = 50

-continued $$bpass1 = (password) * b1 \wedge e1 \mod N1$$
$$= ((b1 \wedge e1 \text{ modulo } N1) * (password)) \mod N1$$
$$= ((12 \wedge 11 \mod 899) * 50) \mod 899$$
$$= (858 * 50) \mod 899$$
$$= 647$$

In the example of operation continued, passkey generator 1 generates passkey 1 as follows:

passkey 1=bpass1^d1 mod N1=647^611 mod 899=151

In the example of operation continued, the user device may verify passkey 1 as follows:

recovered blinded password=(passkey1)^e1 mod N1=151^11 mod 899=647

647 verified as blinded password 647, so passkey 1 is verified.

In the example of operation continued, variable v generator 1 generates v1 as follows:

multiplicative inverse of b1 mod N1 (e.g., using an extended euclidean algorithm)

v1=multiplicative inverse of 12 mod 899=75

In the example of operation continued, key generator 1 generates key 1 as follows:

key 1=((passkey1)*(v1)) mod N1=151*75 mod 899=537

In the example of operation continued, the user device verifies key 1 as follows:

recovered password=(key1)^e1 mod N1=537^11 mod 899=50

50 verified as password 50, so key 1 is verified.

Figure 48D:
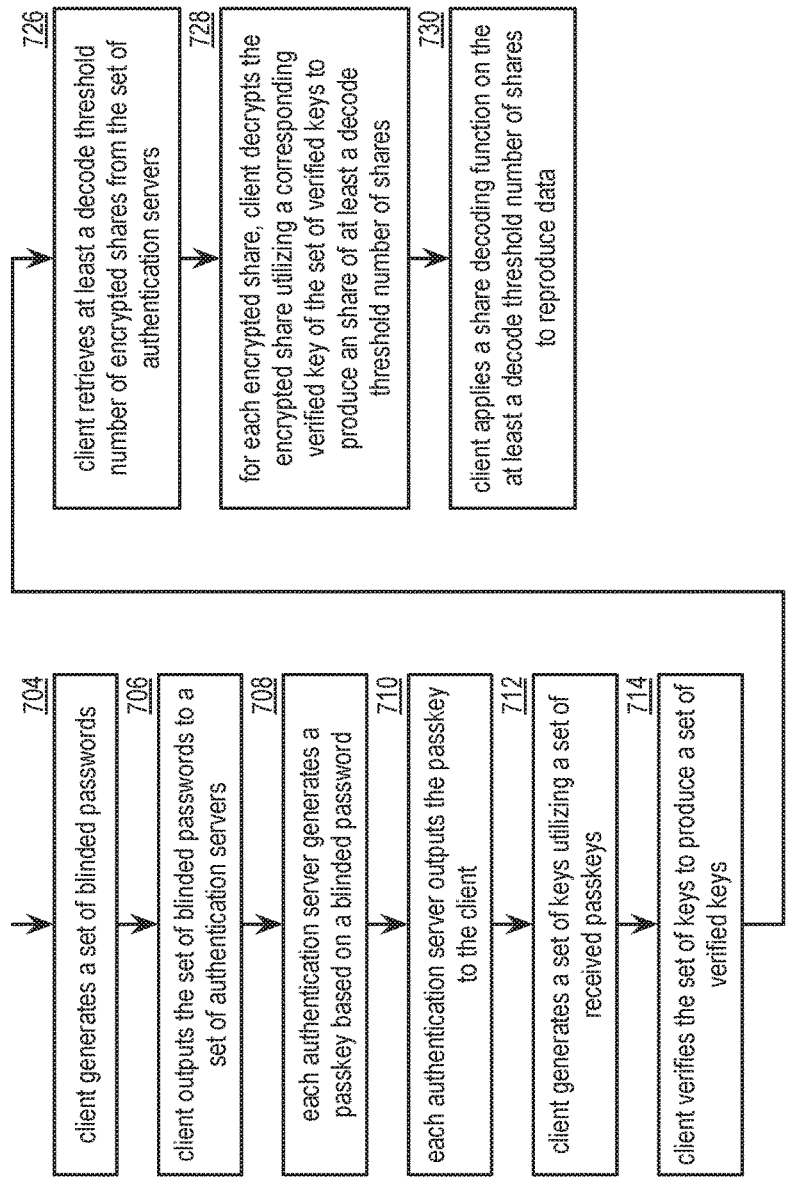
FIG. 48D is a flowchart illustrating an example of retrieving a credential in accordance with the present invention.

FIG. 48D is a flowchart illustrating an example of retrieving a credential, which include similar steps to FIG. 48B. The method begins with steps 704 and 706 of FIG. 48B where a client (e.g., a processing module of a distributed storage and task (DST) client module of a user device) generates a set of blinded passwords and outputs the set of blinded passwords to a set of authentication servers. The method continues with step 708 and 710 of FIG. 48B where each authentication server of the set of authentication servers generates a passkey based on a corresponding blinded password of the set of blinded passwords such that a set of passkeys are generated by the set of authentication servers and each authentication server outputs a corresponding passkey of the set of passkeys to the client. The method continues with step 712 and 714 of FIG. 48B where the client generates a set of keys utilizing a set of received passkeys and verifies the set of keys to produce a set of verified keys.

The method continues at step 726 where the client retrieves at least a decode threshold number of encrypted shares from the set of authentication servers. The retrieving includes at least one of sending at least a decode threshold number of encrypted share retrieval requests to the set of authentication servers and receiving the at least a decode threshold number of encrypted shares from the set of authentication servers. The method continues at step 728 where, for each encrypted share, the client decrypts the encrypted share utilizing a corresponding verified key of the set of verified keys to produce a share of at least a decode threshold number of shares. The method continues at step 730 where the client applies a share decoding function on the at least a decode threshold number of shares to reproduce the data. In addition, the client may verify the data when the data includes a credential and a credential hash digest.

Figure 49:
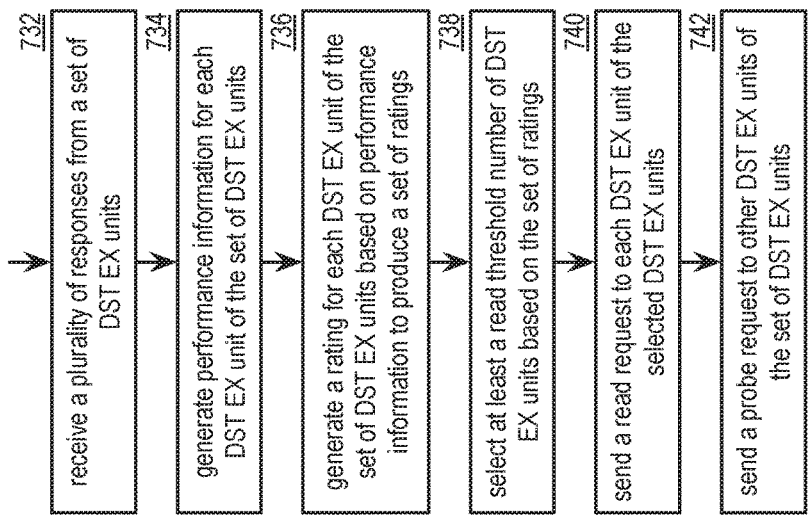
FIG. 49 is a flowchart illustrating an example of selecting DST execution units in accordance with the present invention.

FIG. 49 is a flowchart illustrating an example of selecting DST execution units. The method begins at step 732 where a processing module (e.g., of a distributed storage and task (DST) client module) receives a plurality of responses from a set of DST execution units. The responses may include a read slice response, a probe response (e.g., an acknowledgment and response to a send acknowledgment request), and any other response message from a DST execution unit.

The method continues at step 734 where the processing module generates performance information for each DST execution unit of the set of DST execution units. The performance information may include one or more of a number of slices with a different revision, number of slices with too many revisions, number of slices not found, number of slices with invalid integrity check values, number of slices that do not contribute to a successful decoding of a data segment, a read response time, a read bandwidth level, a write response time, and a write bandwidth level. The performance information may be associated with a system error condition. The system error condition may include one or more of a network link error, a memory error, a storage error, a slice rebuilding error, a maliciously controlled DST execution unit, and a task execution error. The generating may be based on one or more of retrieving performance history information, performing a test, initiating a query, and performing a mathematical function on the performance history information.

The method continues at step 736 where the processing module generates a rating for each DST execution unit of the set of DST execution units based on the performance information to produce a set of ratings. The generating includes at least one of comparing performance information between two or more DST execution units of the set of DST execution units, and comparing performance information to one or more performance thresholds. The method continues at step 738 where the processing module selects at least a read threshold number of DST execution units based on the set of ratings. The selecting may include one or more of identifying a DST execution unit associated with a best rating of the set of ratings and identifying a DST execution unit associated with a rating above a minimum rating threshold. The method continues at step 740 where the processing module sends a read request to each DST execution unit of the selected DST execution units. The sending includes generating a read request in response to receiving a request to retrieve the data segment.

The method continues at step 742 where the processing module sends a probe request to other DST execution units of the set of DST execution units. The sending includes generating a probe request for a DST execution unit not selected for the read requests. The selection and initiating of the probe request may provide a system enhancement by gathering more performance information from more DST execution units. The method may loop back to step 732.

Figure 50A:
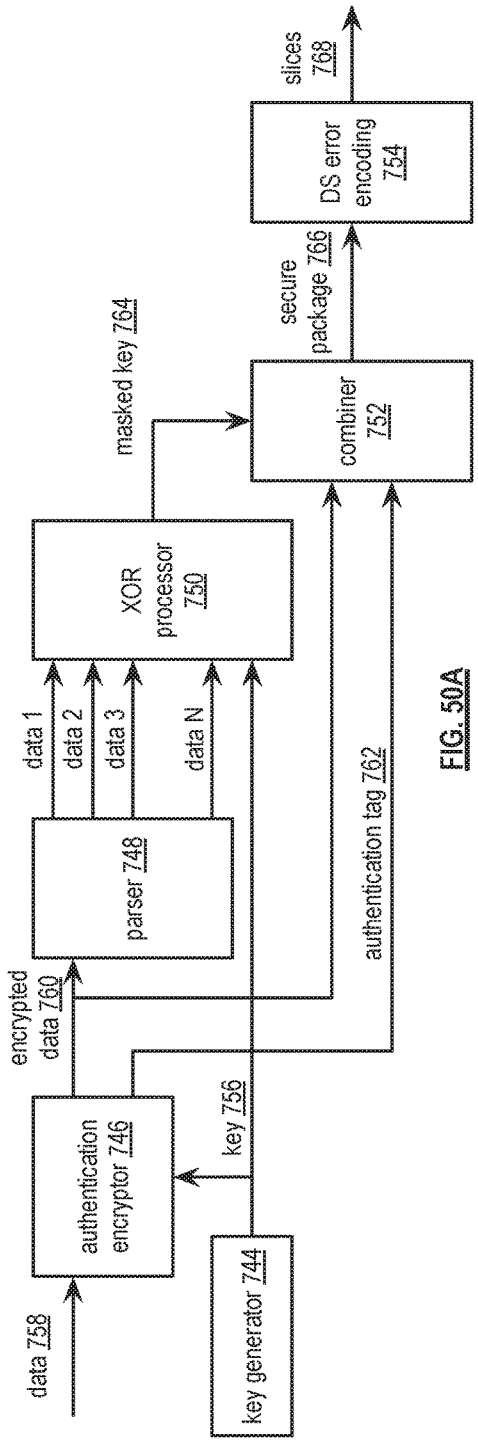
FIG. 50A is a schematic block diagram of an embodiment of a data encoding system in accordance with the present invention.

FIG. 50A is a schematic block diagram of an embodiment of a data encoding system that includes an authentication encryptor 746, a key generator 744, a parser 748, an exclusive OR (XOR) processor 750, a combiner 752, and a distributed storage error coding module 754. The key generator 744 functions to generate an encryption key 756 based on at least one of a random number, a random key generation function, a key lookup, receiving a key, a key seed, and a pseudorandom key generation function. For example, the key generator generates a 20 byte wide random key utilizing the pseudorandom key generation function. The authentication encryptor 746 performs an authentication encryption algorithm on data 758 to produce encrypted data 760 and an authentication tag 762. The data 758 includes at least one of a data file, a data object, a data segment, a data slice, and additional authenticated data including at least one of a user identifier (ID), a data version level, a sequence number, and storage metadata. The authentication encryption algorithm includes at least one of a Galois counter Mode (GCM), a counter with cipher block chaining message authentication code (CCM), and an offset codebook mode (OCB).

The parser 748 functions to parse the encrypted data 760 into a set of data elements 1-N. A number of data elements (e.g., N) may be obtained based on at least one of a lookup, a predetermination, receiving a value for N, and dividing a number of bytes of the encrypted data by a number of bytes of the key 756. For example, the parser functions to parse the encrypted data 760 into 5,000 data elements (e.g., N=5,000) when a size of the encrypted data size is 100,000 bytes, a size of the key 756 is 20 bytes, and the number of data elements is to be obtained by dividing the number of bytes of encrypted data 760 by the number of bytes of key 756 to provide data elements with a width (e.g., 20 bytes) that is substantially the same as the width of the key 756 (e.g., 20 bytes).

The XOR processor 750 functions to perform a XOR logical function on each data element of the set of data elements 1-N and the key to produce a masked key 764. For example, the XOR processor performs the XOR logical function in accordance with an expression of: masked key=data 1 XOR data 2 XOR data 3 XOR data 4 XOR data N XOR key. The combiner 752 functions to combine the encrypted data 760, the masked key 764, and the authentication tag 762 to produce a secure package 766. For example, the combiner appends the masked key 764 and the authentication tag 762 to the encrypted data 760 to produce the secure package 766. The DS error encoding module encodes the secure package 766 utilizing a dispersed storage error coding function to produce at least one set of slices 768 for storage in a distributed storage and task network (DSTN) module. The method of operation of the data encoding system is discussed in greater detail with reference to FIG. 50C.

Figure 50B:
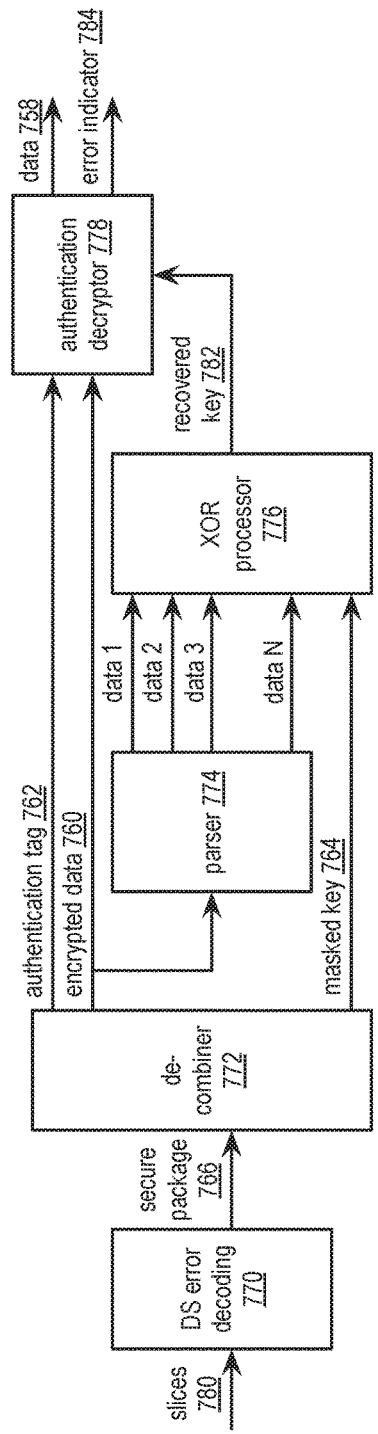
FIG. 50B is a schematic block diagram of an embodiment of a data decoding system in accordance with the present invention.

FIG. 50B is a schematic block diagram of an embodiment of a data decoding system that includes a distributed storage error decoding module 770, a de-combiner 772, a parser 774, an exclusive OR (XOR) processor 776, and an authentication decryptor 778. The DS error decoding module 770 receives at least a decode threshold number of slices 780 of at least one set of slices from a distributed storage and task network (DSTN) module and decodes at least one set of slices 780 utilizing a dispersed storage error coding function to produce a secure package 766. The de-combiner 772 functions to de-combine (e.g., partition) the secure package 766 to produce encrypted data 760, a masked key 764, and an authentication tag 762. For example, the de-combiner 772 de-appends the masked key 764 and the authentication tag 762 from the encrypted data 760 of the secure package 766 to produce the encrypted data 760, the masked key 764, and the authentication tag 762.

The parser 774 functions to parse the encrypted data 760 into a set of data elements 1-N. A number of data elements (e.g., N) may be obtained based on at least one of a lookup, a predetermination, receiving a value for N, and dividing a number of bytes of the encrypted data 760 by a number of bytes of the masked key 764. For example, the parser 774 functions to parse the encrypted data into 5,000 data elements (e.g., N=5,000) when a size of the encrypted data 760 size is 100,000 bytes, a size of the masked key 764 is 20 bytes, and the number of data elements is to be obtained by dividing the number of bytes of encrypted data 760 by the number of bytes of masked key 764 to provide data elements with a width (e.g., 20 bytes) that is substantially the same as the width of the masked key 764 (e.g., 20 bytes).

The XOR processor 776 functions to perform a XOR logical function on each data element of the set of data elements 1-N and the masked key to produce a recovered key 782 (e.g., an unmasked key). For example, the XOR processor 776 performs the XOR logical function in accordance with an expression of: recovered key=data 1 XOR data 2 XOR data 3 XOR data 4 XOR data N XOR masked key.

The authentication decryptor 778 performs an authentication decryption algorithm on the encrypted data 760 and the authentication tag 762 to reproduce data 758 and produce an error indicator 784. The data 758 includes at least one of a data file, a data object, a data segment, a data slice, and additional authenticated data including at least one of a user identifier (ID), a data version level, a sequence number, and storage metadata. The error indicator 784 provides an integrity error indication with regards to decryption of the encrypted data 760. The authentication decryption algorithm includes at least one of a Galois counter Mode (GCM), a counter with cipher block chaining message authentication code (CCM), and an offset codebook mode (OCB). The method of operation of the data decoding system is discussed in greater detail with reference to FIG. 50D.

FIG. 50C is a flowchart illustrating an example of encoding data. The method begins at step 786 where a processing module (e.g., of a distributed storage and task (DST) client module) receives data for storage. The data includes at least one of a data file, a data object, a data segment, a data slice, and additional authenticated data including at least one of a user identifier (ID), a data version level, a sequence number, and storage metadata. The method continues at step 788 where the processing module obtains a key. The obtaining includes at least one of generating a random key utilizing a pseudorandom key generation function, generating a random key utilizing a random key generation function, generating the random key based on a random number, generating the key based on a key seed, retrieving the key, and receiving the key.

The method continues at step 790 where the processing module encrypts the data utilizing an authentication encryption function and the key to produce encrypted data and an authentication tag. The authentication encryption algorithm includes at least one of a Galois counter Mode (GCM), a counter with cipher block chaining message authentication code (CCM), and an offset codebook mode (OCB). The method continues at step 792 where the processing module parses the encrypted data utilizing a parser function to produce a plurality of data elements. The parser functions to parse the encrypted data into a set of data elements 1-N. A number of data elements (e.g., N) may be obtained based on at least one of a lookup, a predetermination, receiving a value for N, and dividing a number of bytes of the encrypted data by a number of bytes of the key. For example, the parser functions to parse the encrypted data into 5,000 data elements (e.g., N=5,000) when a size of the encrypted data size is 100,000 bytes, a size of the key is 20 bytes, and the number of data elements is to be obtained by dividing the number of bytes of encrypted data by the number of bytes of key to provide data elements with a width (e.g., 20 bytes) that is substantially the same as the width of the key (e.g., 20 bytes).

The method continues at step 794 where the processing module applies an exclusive OR (XOR) function to the plurality of data elements (e.g., data 1 through data N) and the key to produce a masked key. For example, the processing module performs the XOR logical function in accordance with an expression of: masked key=data 1 XOR data 2 XOR data 3 XOR data 4 XOR data N XOR key. The method continues at step 796 where the processing module combines the encrypted data, the authentication tag, and the masked key to produce a secure package. The method continues at step 798 where the processing module encodes the secure package utilizing a dispersed storage error coding function to produce at least one set of encoded data slices for storage in a distributed storage and task network (DSTN) module.

FIG. 50D is a flowchart illustrating an example of decoding data, which includes similar steps to FIG. 50C. The method begins at step 800 where a processing module (e.g., of a distributed storage and task (DST) client module) decodes at least one set of encoded data slices utilizing a dispersed storage error coding function to reproduce a secure package. The decoding may include receiving the at least one set of encoded data slices from a distributed storage and task network (DSTN) module.

The method continues at step 802 where the processing module de-combines the secure package to produce encrypted data, an authentication tag, and a masked key. The method continues with step 792 of FIG. 50C where the processing module parses the encrypted data to produce a plurality of data elements. The method continues at step 806 where the processing module applies an exclusive OR (XOR) function to the plurality of data elements (e.g., data 1 through data N) and the masked key to produce a recovered key. For example, the XOR processor performs the XOR logical function in accordance with an expression of: recovered key=data 1 XOR data 2 XOR data 3 XOR data 4 XOR data N XOR masked key.

The method continues at step 808 where the processing module decrypts the encrypted data utilizing an authentication decryption function, the recovered key, and the authentication tag to reproduce data and produce an error indicator. The data includes at least one of a data file, a data object, a data segment, a data slice, and additional authenticated data including at least one of a user identifier (ID), a data version level, a sequence number, and storage metadata. The error indicator provides an integrity error indication with regards to decryption of the encrypted data. The authentication decryption algorithm includes at least one of a Galois counter Mode (GCM), a counter with cipher block chaining message authentication code (CCM), and an offset codebook mode (OCB).

Figure 51:
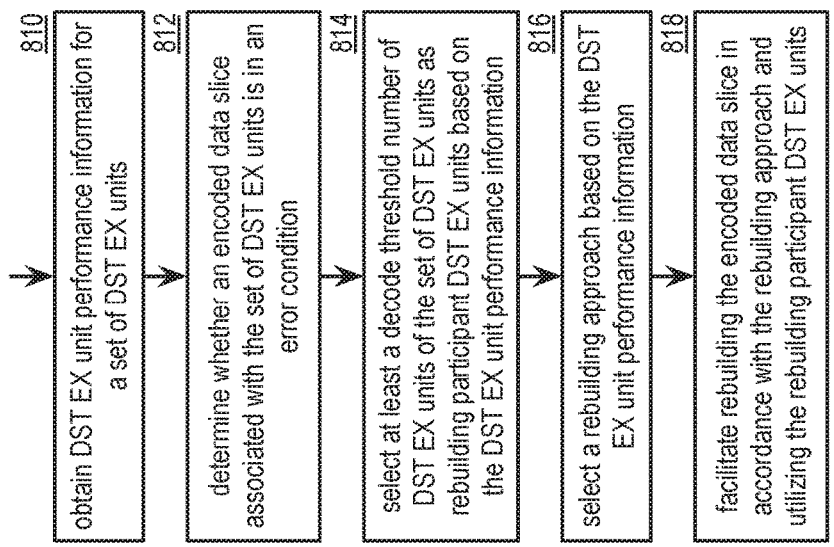
FIG. 51 is a flowchart illustrating an example of facilitating slice rebuilding in accordance with the present invention.

FIG. 51 is a flowchart illustrating an example of facilitating slice rebuilding. The method begins at step 810 where a processing module (e.g., of a distributed storage and task (DST) client module) obtains DST execution unit performance information for a set of DST execution units. The set of DST execution units may comprise a common storage set of DST execution units utilized to store a plurality of sets of encoded data slices of data. The performance information may include one or more of access time, response time, storage throughput, retrieval throughput, write throughput, ping time, input activity level, output activity level, central processing unit utilization level, memory utilization level, average disk seek time, and memory access latency. The obtaining includes at least one of initiating a query, initializing a test, receiving a test result, a lookup, accessing performance history, and receiving performance information.

The method continues at step 812 where the processing module determines whether an encoded data slice associated with the set of DST execution units is in an error condition. The error condition may include at least one of a missing slice condition, a corrupted slice, a missing slice revision, and an unfavorable integrity value. The determining may be based on one or more of receiving an error message, initiating a query (e.g., sending a list request, sending its list digest request), receiving a query response, performing a test, and receiving a slice rebuilding request.

The method continues at step 814 where the processing module selects at least a decode threshold number of DST execution units of the set of DST execution units as rebuilding participant DST execution units based on the DST execution unit performance information. The selecting includes one or more of ranking DST execution units by associated DST execution unit performance information to priority selected units that have more favorable performance (e.g., lowest access latency) and ranking DST execution units by a utilization level indicator of associated DST execution unit performance information that have a more favorable utilization level (e.g., less utilized).

The method continues at step 816 where the processing module selects a rebuilding approach based on the DST execution unit performance information. The rebuilding approach includes at least one of selecting a delegate approach, a direct rebuilding approach, and a zero information gain (ZIG) rebuilding approach. For example, the processing module selects the delegate approach when less than a decode threshold number of DST execution units have a favorable performance level (e.g., the units are too busy to support rebuilding). As another example, the processing module selects the direct rebuilding approach when a DST execution unit of the at least the decode threshold number of DST execution units associated with a slice to be rebuilt has a favorable performance level (e.g., the DST execution unit associated with the slice to be rebuilt has sufficient processing capacity to execute a full rebuilding function). As yet another example, the processing module selects the ZIG rebuilding approach when the DST execution unit of the at least the decode threshold number of DST execution units associated with the slice to be rebuilt has an unfavorable performance level (e.g., the DST execution unit associated with the slice to be rebuilt has sufficient processing capacity to execute just a ZIG rebuilding function) and/or other DST execution units of the at least the decode threshold number of DST execution units each have a favorable performance level to support ZIG rebuilding.

The method continues at step 818 where the processing module facilitates rebuilding the encoded data slice to be rebuilt in accordance with the rebuilding approach and utilizing the rebuilding participant DST execution units. For example, when the rebuilding approach is the delegate approach, the processing module sends a rebuilding request to a rebuilding entity that includes a slice name corresponding to the encoded data slice to be rebuilt. As another example, when the rebuilding approach is the direct rebuilding approach, the processing module generates at least a decode threshold number of reads slice requests, sends the requests to the rebuilding participant DST execution units, receives at least a decode threshold number of slices from the participants, decodes the at least the decode threshold number of slices utilizing a dispersed storage error coding function to produce a data segment, encodes the data segment utilizing the dispersed storage error coding function to produce a set of rebuilt slices, extracts the encoded data slice to be rebuilt as the rebuilt encoded data slice from the rebuilt slices, and stores the rebuilt encoded data slice in a corresponding DST execution unit associated with the encoded data slice. As yet another example, when the rebuilding approach is the ZIG rebuilding approach, the processing module generates at least a decode threshold number of ZIG partial slice requests, sends the requests to the rebuilding participant DST execution units, receives at least a decode threshold number of ZIG partial slices from the participants, decodes the at least the decode threshold number of ZIG partial slices utilizing a ZIG decoding function (e.g., an exclusive OR (XOR) function across the at least the decode threshold number of ZIG partial slices) to reproduce the encoded data slice to be rebuilt as the rebuilt encoded data slice, and stores the rebuilt encoded data slice in the corresponding DST execution unit associated with the encoded data slice.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a processing module to generate a secure hierarchical file directory system, the method comprises:
    creating a file directory entry in a directory file of the secure hierarchical file directory system for a file, wherein the file directory entry includes a path name for the file, an encryption access control list, and a source name of the file, wherein the file is encrypted with a key, wherein the key is encrypted with each public key of a set of user devices that is authorized to access the file to produce a set of object content keys, and wherein the encryption access control list includes identities of the set of user devices and the set of object content keys;
    encrypting the directory file using a second key to produce an encrypted directory file;
    generating a second set of object content keys based on the second key and public keys of a second set of user devices authorized to access the directory file; and
    creating a next level directory file entry in a next higher directory file of the secure hierarchical file directory system for the directory file, wherein the next level file directory entry includes a next level path name for the file directory, a second encryption access control list, and a second source name of the file directory, and wherein the second encryption access control list includes the second set of object content keys and identities of the second set of user devices, wherein the second set of user devices includes the first set of user devices.

2. The method of claim 1 further comprises:
    dispersed storage error encoding the encrypted file to produce a plurality of sets of encoded data slices;
    generating a plurality of sets of slice names for the plurality of sets of encoded data slices based on the source name of the file; and
    sending, based on the plurality of sets of slice names, the plurality of sets of encoded data slices to storage units for storage therein.

3. The method of claim 1 further comprises:
    dispersed storage error encoding the encrypted directory file to produce a set of encoded data slices;
    generating a sets of slice names for the set of encoded data slices based on the source name of the directory file; and
    sending, based on the set of slice names, the set of encoded data slices to storage units for storage therein.

4. The method of claim 1 further comprises:
    encrypting the next level directory file using a third key to produce a second encrypted directory file;
    generating a third set of object content keys based on the third key and public keys of a third set of user devices authorized to access the next level directory file; and
    creating a subsequent next level directory file entry in a subsequent next higher directory file of the secure hierarchical file directory system for the next level directory file, wherein the subsequent next level file directory entry includes a subsequent next level path name for the next level file directory, a third encryption access control list, and a third source name of the next level file directory, and wherein the third encryption access control list includes identities of the third set of user devices and the third set of object content keys, wherein the third set of user devices includes the second set of user devices.

5. A dispersed storage (DS) module comprises:
    a processing system including a processing module and a memory, wherein the processing system is configured to:
        create a file directory entry in a directory file of the secure hierarchical file directory system for a file, wherein the file directory entry includes a path name for the file, an encryption access control list, and a source name of the file, wherein the file is encrypted with a key, wherein the key is encrypted with each public key of a set of user devices that is authorized to access the file to produce a set of object content keys, and wherein the encryption access control list includes identities of the set of user devices and the set of object content keys;
        encrypt the directory file using a second key to produce an encrypted directory file;
        generate a second set of object content keys based on the second key and public keys of a second set of user devices authorized to access the directory file; and
        create a next level directory file entry in a next higher directory file of the secure hierarchical file directory system for the directory file, wherein the next level file directory entry includes a next level path name for the file directory, a second encryption access control list, and a second source name of the file directory, and wherein the second encryption access control list includes the second set of object content keys and identities of the second set of user devices, wherein the second set of user devices includes the first set of user devices.

6. The DS module of claim 5, wherein the processing system functions to:
    dispersed storage error encode the encrypted file to produce a plurality of sets of encoded data slices;
    generate a plurality of sets of slice names for the plurality of sets of encoded data slices based on the source name of the file; and
    send, based on the plurality of sets of slice names, the plurality of sets of encoded data slices to storage units for storage therein.

7. The DS module of claim 5, wherein the processing system functions to:
dispersed storage error encode the encrypted directory file to produce a set of encoded data slices;
generate a sets of slice names for the set of encoded data slices based on the source name of the directory file; and
send, based on the set of slice names, the set of encoded data slices to storage units for storage therein.

8. The DS module of claim 5 wherein the processing system is further configured to:
encrypt the next level directory file using a third key to produce a second encrypted directory file;
generate a third set of object content keys based on the third key and public keys of a third set of user devices authorized to access the next level directory file; and
create a subsequent next level directory file entry in a subsequent next higher directory file of the secure hierarchical file directory system for the next level directory file, wherein the subsequent next level file directory entry includes a subsequent next level path name for the next level file directory, a third encryption access control list, and a third source name of the next level file directory, and wherein the third encryption access control list includes identities of the third set of user devices and the third set of object content keys, wherein the third set of user devices includes the second set of user devices.

* * * * *